Dec. 22, 1959   G. W. CRAMPTON ET AL   2,918,657
DATA REDUCTION SYSTEM
Filed Dec. 1, 1954   13 Sheets-Sheet 1
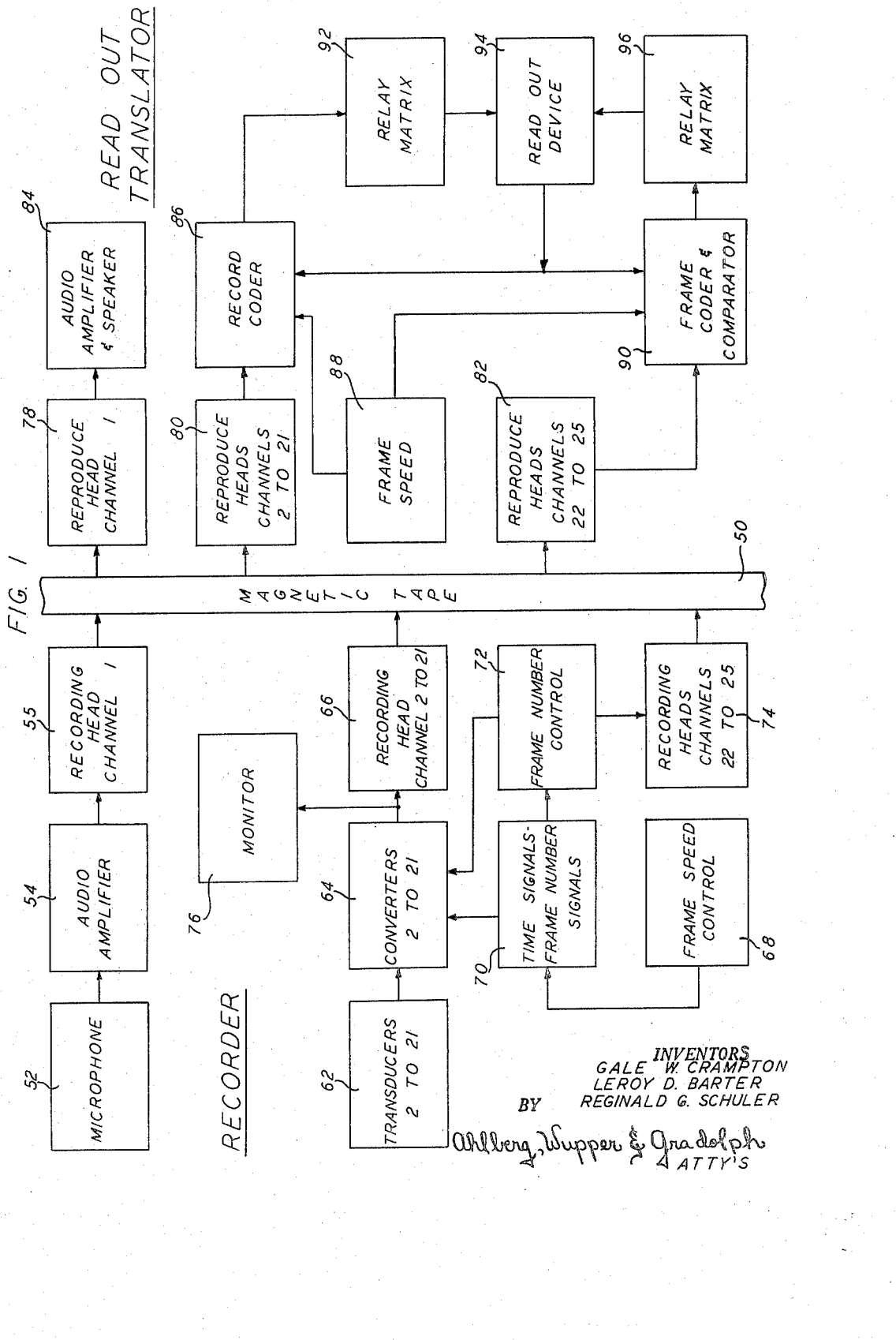
INVENTORS
GALE W. CRAMPTON
LEROY D. BARTER
REGINALD G. SCHULER
BY
Ahlberg, Wupper & Gradolph
ATTY'S Dec. 22, 1959   G. W. CRAMPTON ET AL   2,918,657
DATA REDUCTION SYSTEM
Filed Dec. 1, 1954   13 Sheets-Sheet 2
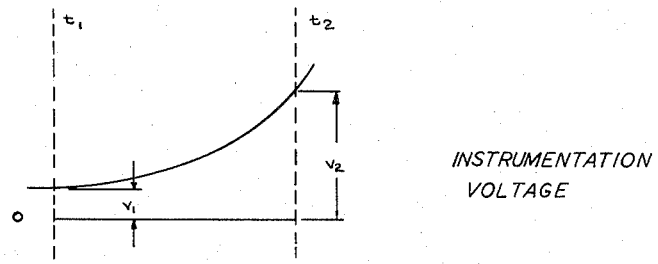
FIG. 2    INSTRUMENTATION VOLTAGE
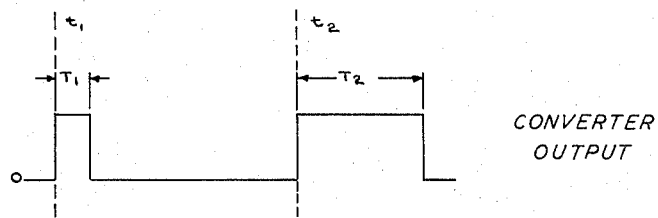
FIG. 3    CONVERTER OUTPUT
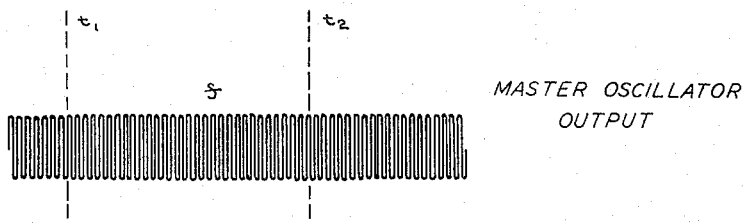
FIG. 4    MASTER OSCILLATOR OUTPUT
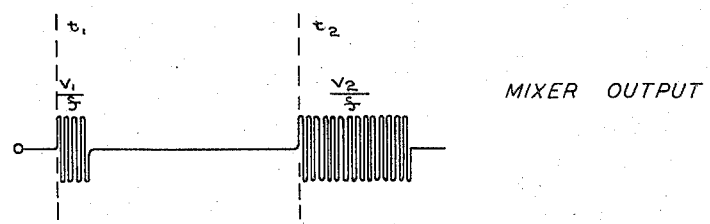
FIG. 5    MIXER OUTPUT
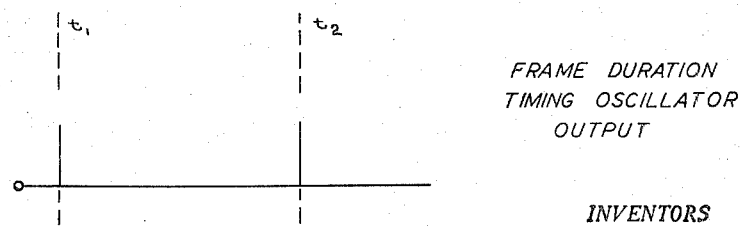
FIG. 6    FRAME DURATION TIMING OSCILLATOR OUTPUT
INVENTORS
GALE W. CRAMPTON
LEROY D. BARTER
BY REGINALD G. SCHULER
Ahlberg, Wupper & Gradolph
ATTY'S Dec. 22, 1959    G. W. CRAMPTON ET AL    2,918,657
DATA REDUCTION SYSTEM
Filed Dec. 1, 1954    13 Sheets-Sheet 3
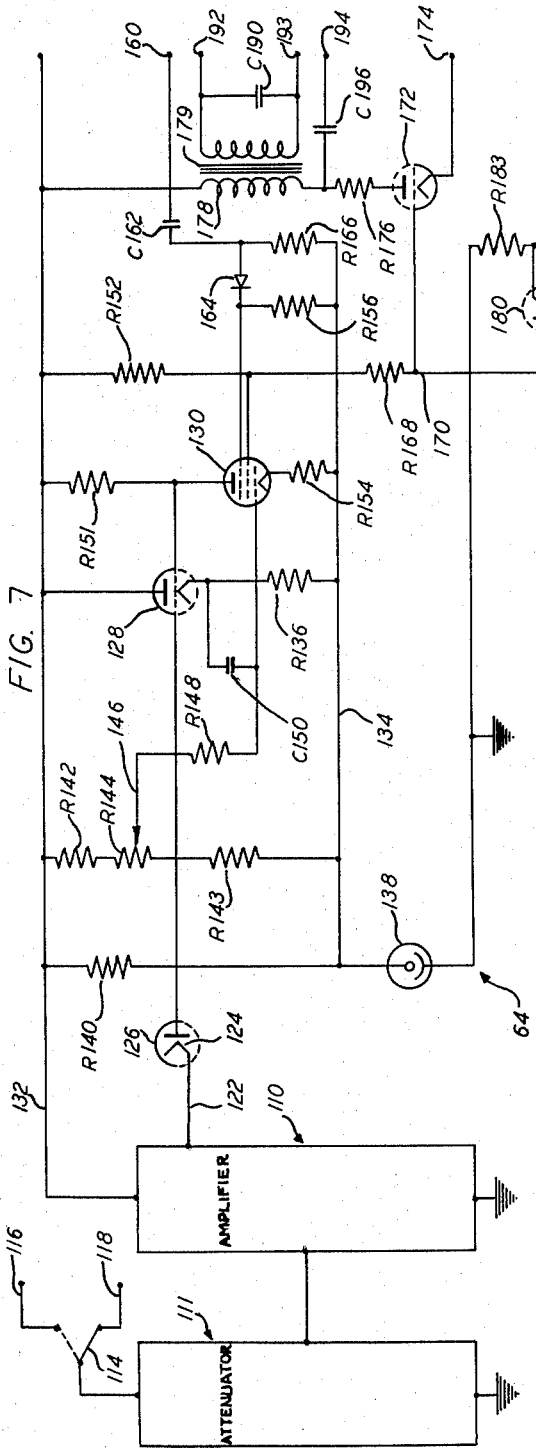
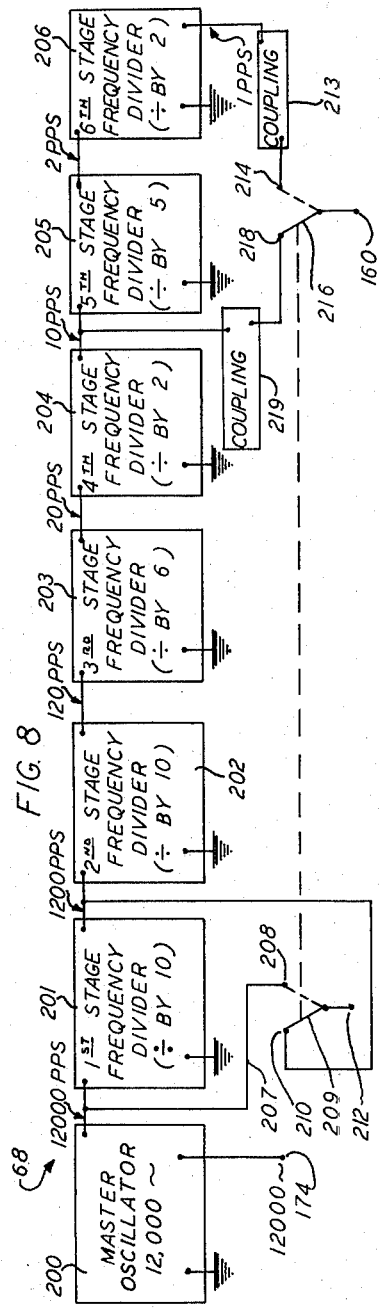
INVENTORS
GALE W. CRAMPTON
LEROY D. BARTER
BY REGINALD G. SCHULER
Ahlberg, Wupper & Gradolph
ATTY'S Dec. 22, 1959    G. W. CRAMPTON ET AL    2,918,657
DATA REDUCTION SYSTEM
Filed Dec. 1, 1954    13 Sheets-Sheet 4
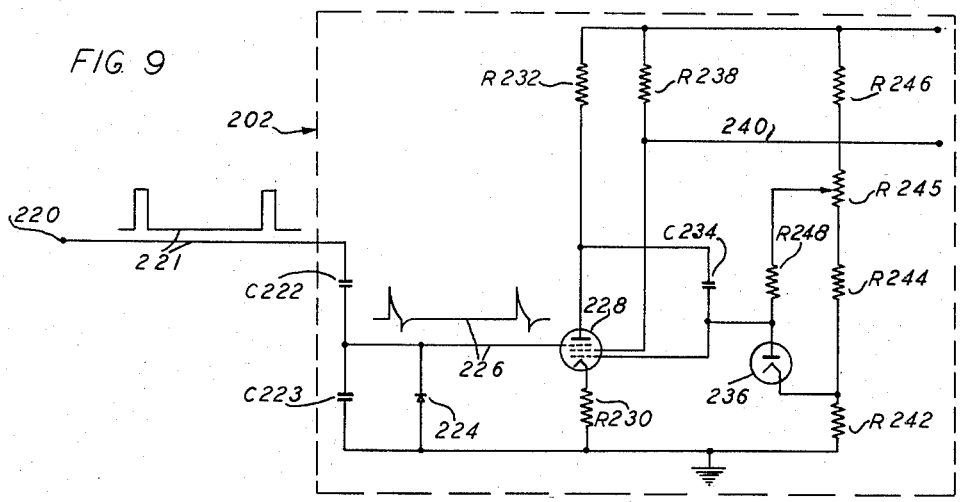
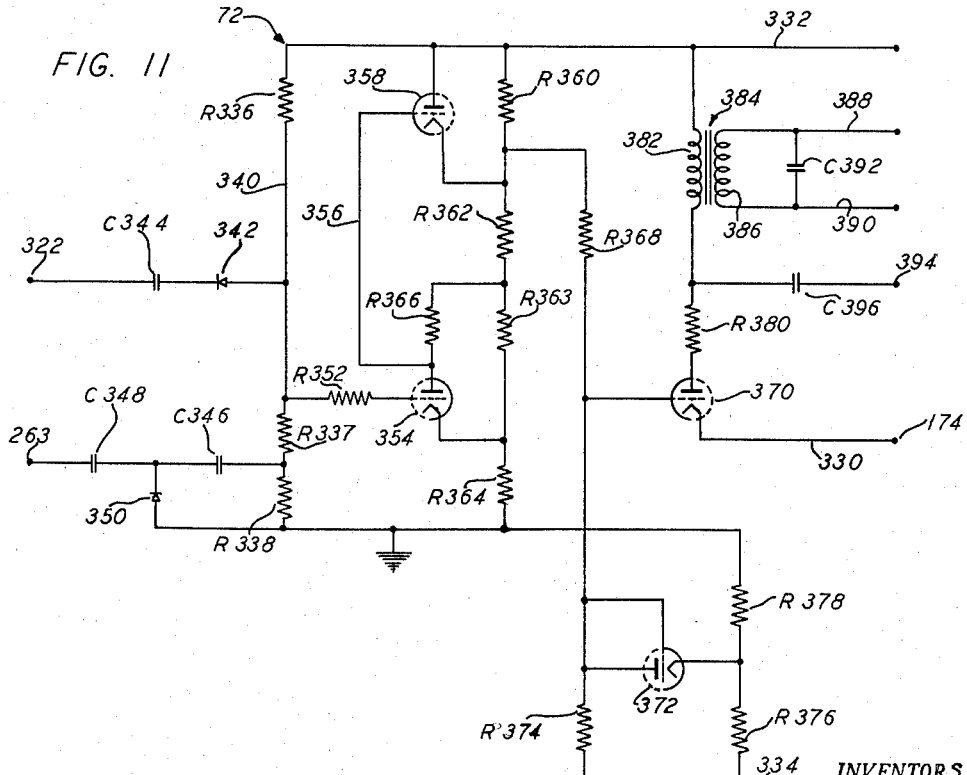
INVENTORS
GALE W. CRAMPTON
LEROY D. BARTER
BY  REGINALD G. SCHULER
Ahlberg, Wupper & Gradolph
ATTY'S Dec. 22, 1959  G. W. CRAMPTON ET AL  2,918,657
DATA REDUCTION SYSTEM
Filed Dec. 1, 1954  13 Sheets-Sheet 5
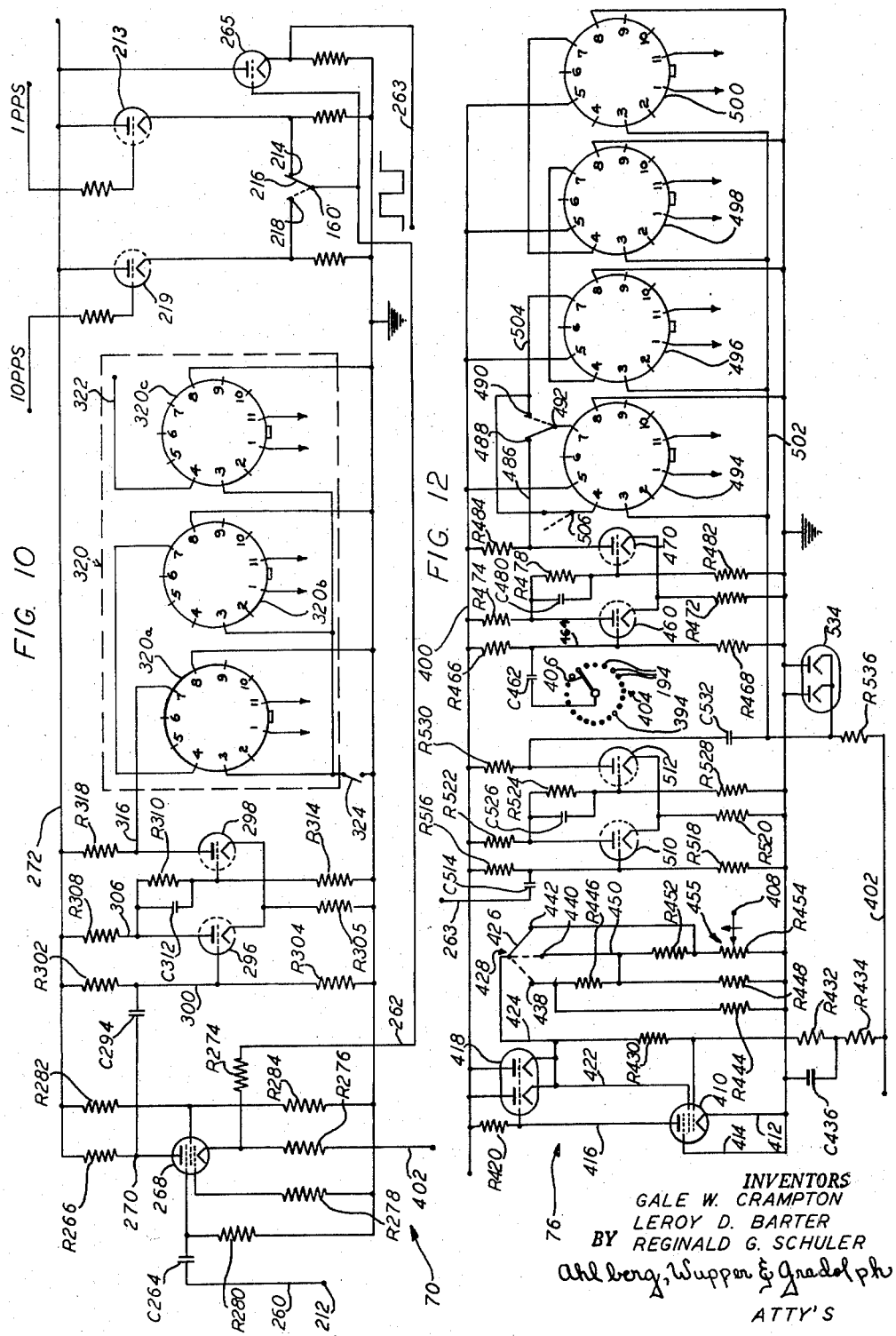
INVENTORS
GALE W. CRAMPTON
LEROY D. BARTER
BY REGINALD G. SCHULER
Ahlberg, Wupper & Gradolph
ATTY'S

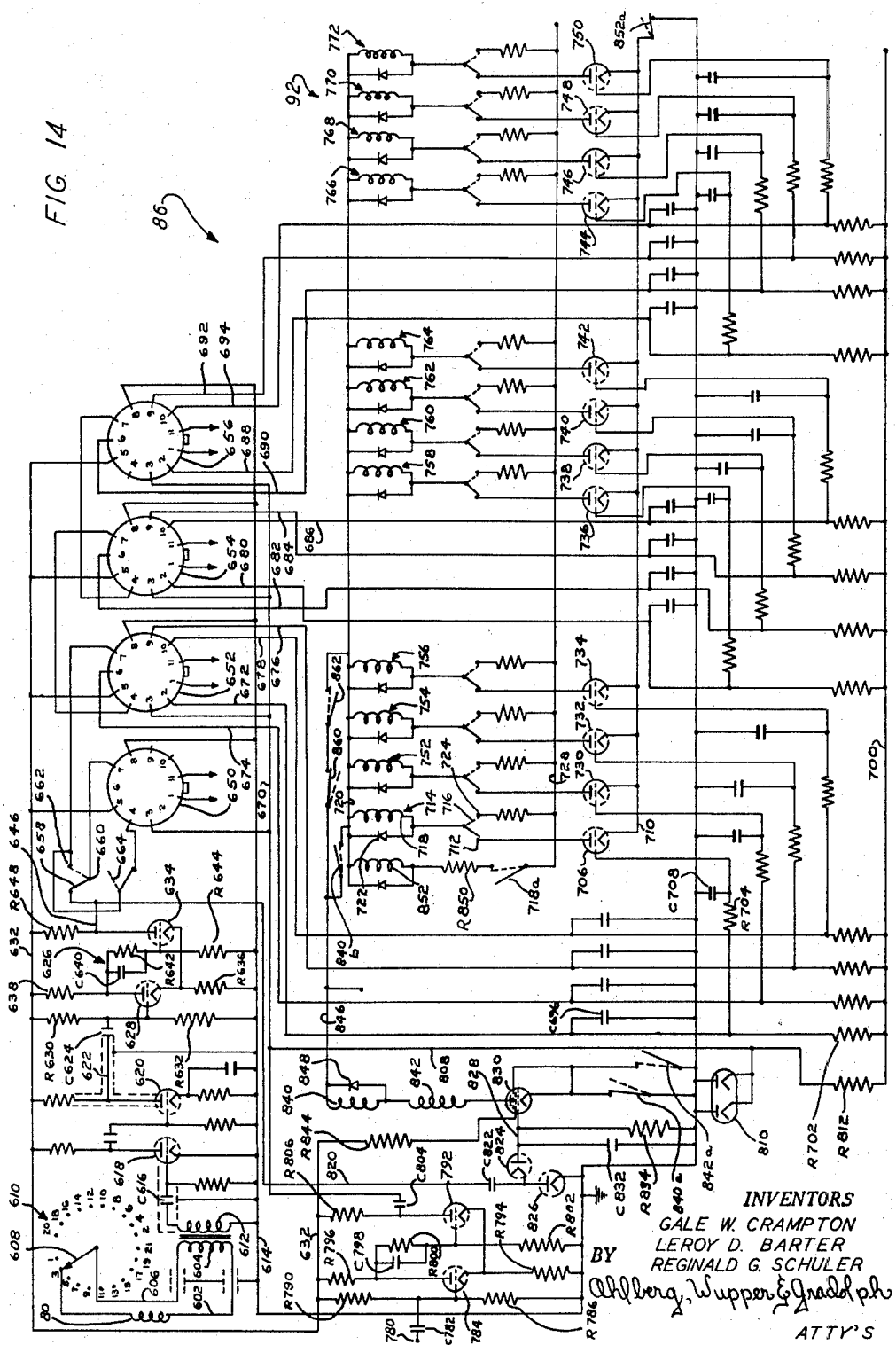

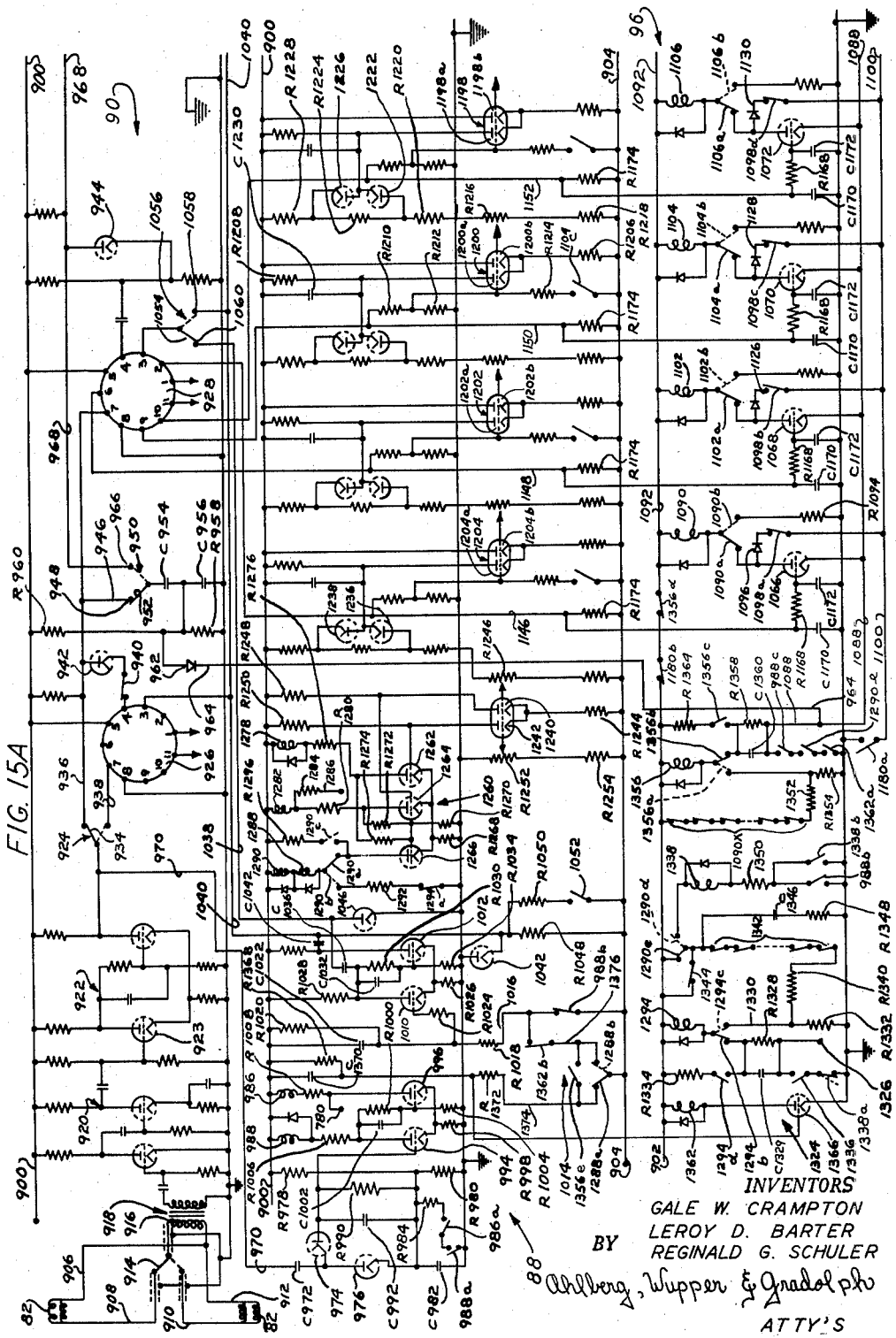

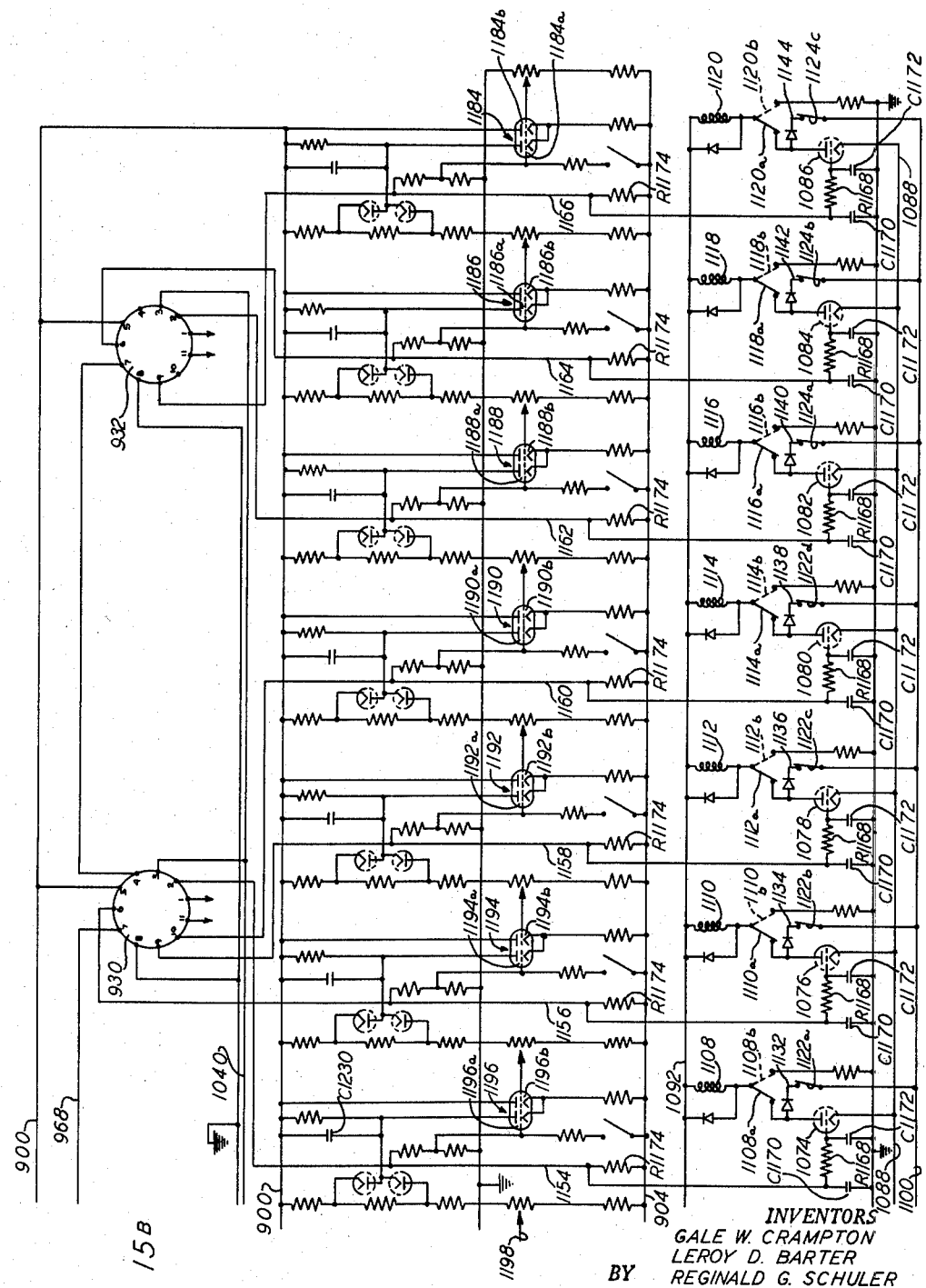

Dec. 22, 1959     G. W. CRAMPTON ET AL     2,918,657
DATA REDUCTION SYSTEM
Filed Dec. 1, 1954     13 Sheets-Sheet 9

INVENTORS
GALE W. CRAMPTON
LEROY D. BARTER
REGINALD G. SCHULER
BY
Ahlberg, Wupper & Gradolph
ATTY'S

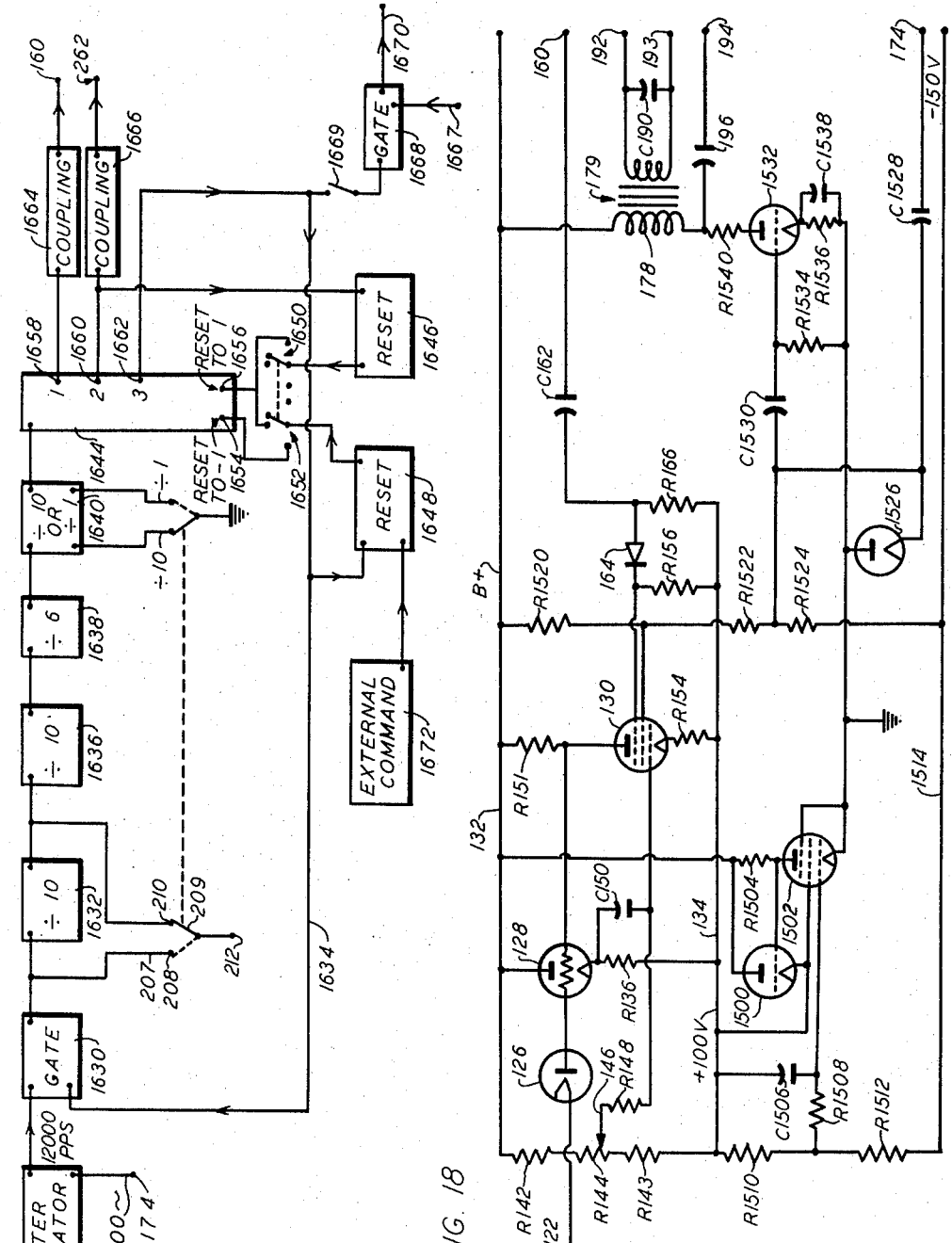

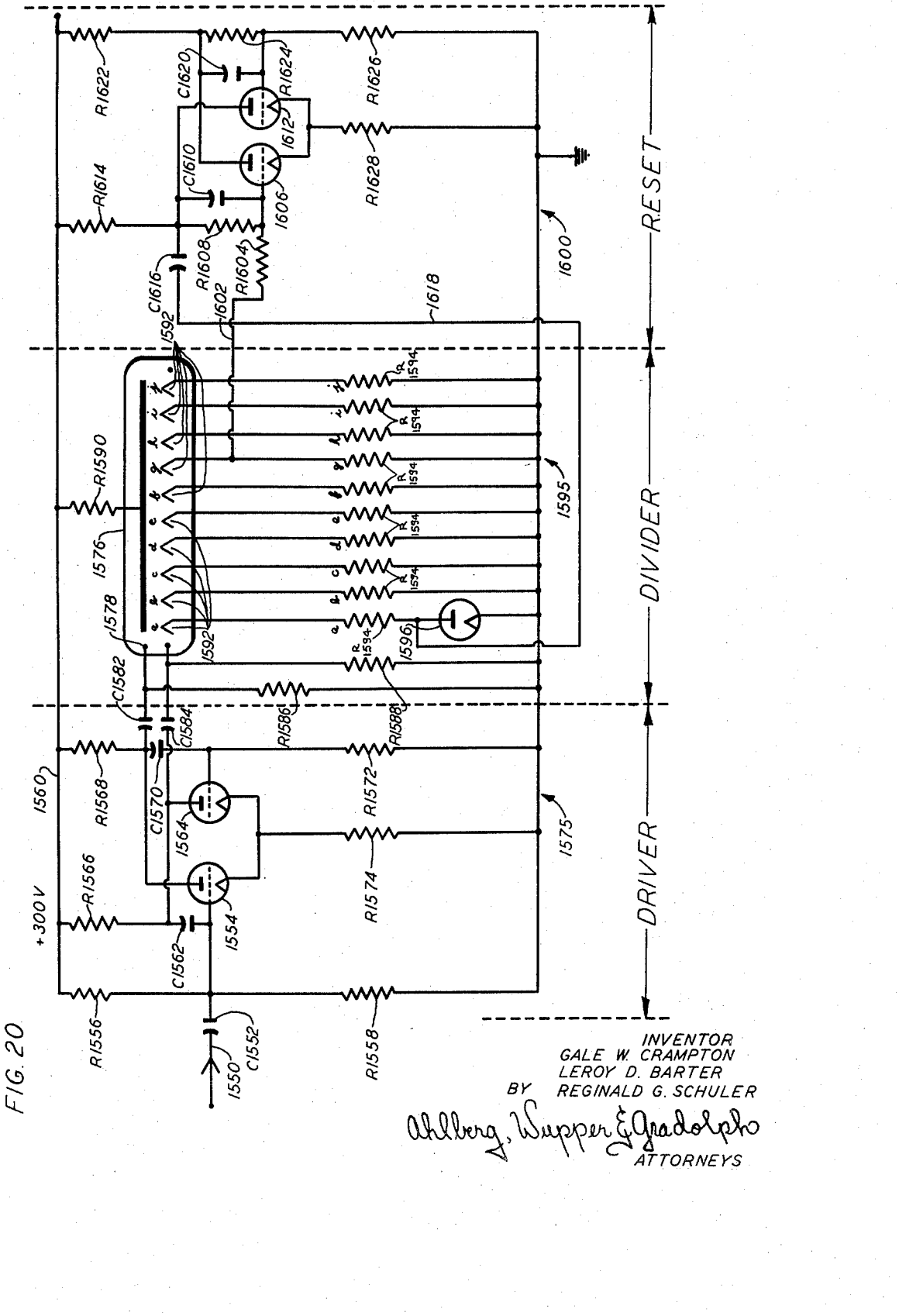

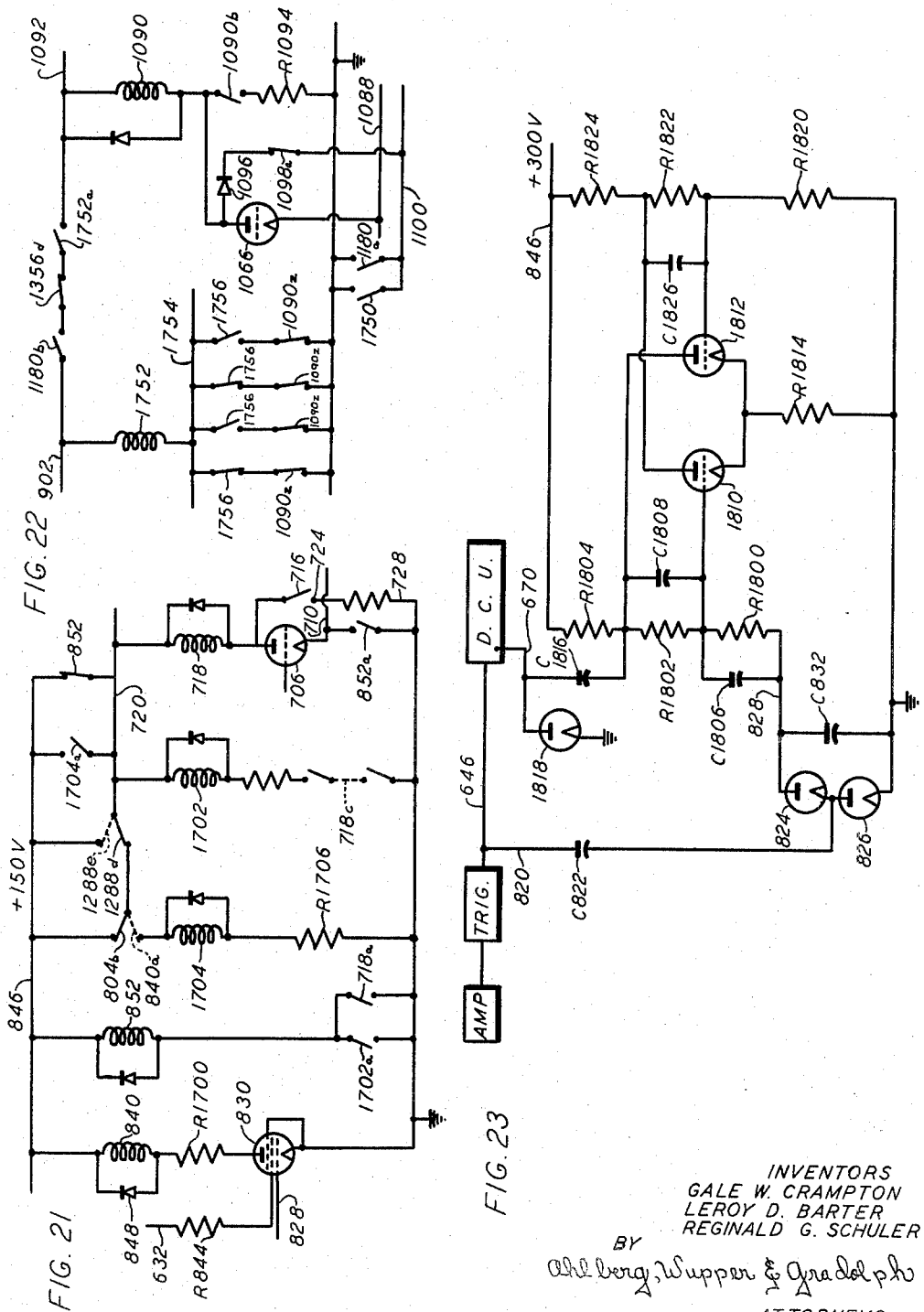

INVENTORS
GALE W. CRAMPTON
LEROY D. BARTER
REGINALD G. SCHULER
BY
Ahlberg, Wupper & Gradolph
ATTORNEYS

United States Patent Office 2,918,657
Patented Dec. 22, 1959

2,918,657

DATA REDUCTION SYSTEM

Gale W. Crampton, Chicago, Le Roy D. Barter, Lake Zurich, and Reginald G. Schuler, Barrington, Ill., assignors to Victor Adding Machine Company, Chicago, Ill., a corporation of Illinois Application December 1, 1954, Serial No. 472,436

9 Claims. (Cl. 340—174)

The invention relates generally to electronic and mechanical means and a method for converting a plurality of simultaneous variable voltages which may be representative of any variable quantities, such as weight, temperature, velocity, phase, barometric pressure, cosmic ray intensity, etc., into a record such as punched cards or a printed record, in which digital values are recorded for the variables at discrete intervals.

Much testing is now being conducted with equipment which produces a variable voltage which is a function of a quantity being measured. Furthermore, during such tests, which frequently may be completed in a matter of a minute or so, great quantities of this type information may be accumulating simultaneously. An example of a typical problem is involved in rocket testing. The rocket usually is in flight for only a short while, but during this brief period much information is telemetered back to the test site and appears at the output of the telemeter receiver in the form of a plurality of voltages which may vary as the temperature changes at several locations on or in the rocket, or as the barometric pressure changes, or as acceleration rate changes, or as cosmic ray irradiation changes or as angularity changes, and so on.

Before this information is of much value it must be translated into digital data which for further use is frequently recorded in punched card form. The labor involved in this operation (reducing the data from photographed oscilloscope traces for instance to digitally punched cards) is frequently extremely great and as a rule the error involved is 10% or more.

The device of the present invention, in the embodiment illustrated and described, takes in such raw data in the form of variable voltages over twenty channels simultaneously and directly controls a standard read out device (a card punching machine for instance). It does this with very little operator intervention, does it quickly and with far greater accuracy (to one-tenth of one percent of full scale) than has heretofore been possible so far as we know. Furthermore, the equipment is organized in two units, one for making an intermediate record of the data arriving over several channels simultaneously, and a second which uses the intermediate record to control the read out device. Thus, it is not necessary to use twenty of the second devices and twenty card punches, for instance to take care of the informaion arriving over twenty channels simultaneously.

It is thus the primary object of the invention to provide novel equipment for performing the above described functions.

An additional object is to provide a system of the type described with novel means for preventing the occurrence of errors in the final product even though malfunctioning occurs.

Yet another object is to provide mechanism for digitalizing analogue variables with a higher order of accuracy than is possible by known methods.

Still another object is to provide a novel system and mechanism of the type described which has a binary type output readily adaptable for the control of standard read out devices such for instance as card punching machines and listers, and which is also adaptable to be connected to the input mechanisms of known types of calculating equipment.

An additional object is to provide for monitoring and standardizing equipment of the type described above.

Yet another object is to provide for automatic preselection of channels and frames to be translated.

Still another object is to provide a system of the type described which is adaptable to a wide variety of controls and which has great flexibility in use thereby making the system of rather universal application.

An additional object is to provide novel and improved circuits for incorporation in this and similar systems and for accomplishing diverse purposes in a novel and improved manner.

Other objects and advantages will become apparent from the following description of a preferred embodiment of our invention which is illustrated in the accompanying drawings.

In the drawings, in which similar characters of reference refer to similar elements throughout the several views:

Figure 1 is a somewhat simplified block diagram showing the general organization of one form the apparatus for practicing this invention may take;

Fig. 2 is a graphic representation of a typical analogue voltage variation over a short time interval;

Fig. 3 is a graphic representation of the output of the converter in response to the voltage variation of Fig. 2;

Fig. 4 is a representation of the output of the master oscillator;

Fig. 5 is a representation of the mixer output;

Fig. 6 is a graphic representation of the timing impulses which determine the frame duration;

Fig. 7 is a circuit diagram of one of the converters and mixers;

Fig. 8 is a block diagram of the master oscillator and frequency divider organization;

Fig. 9 is a circuit diagram of one of the frequency divider stages of Fig. 8;

Fig. 10 is a diagram of the frame number circuit;

Fig. 11 is a diagram of the frame control circuit;

Fig. 12 is a diagram of the recorder calibration and monitoring circuit;

Fig. 14 is a diagram illustrating the record number portion of the read-out translator circuit;

Figure 13:
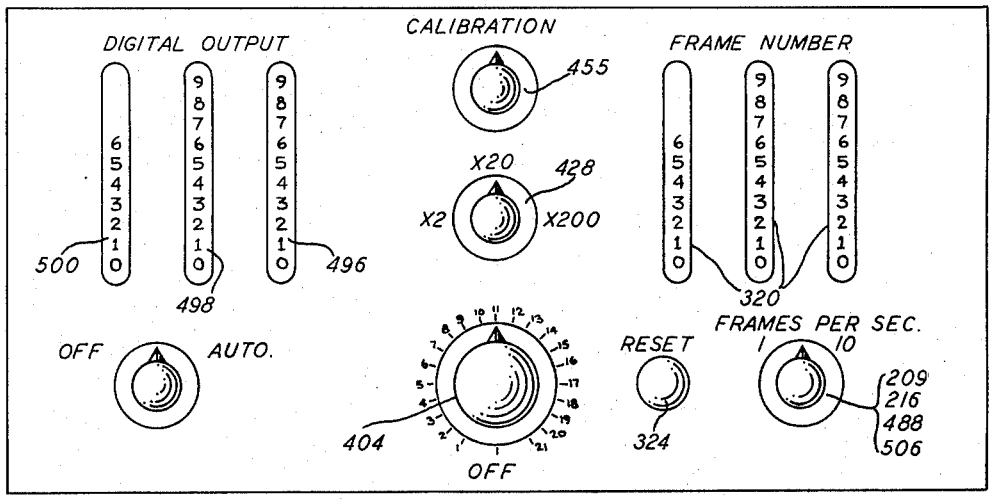
Fig. 13 is a front view of the panel which has the recorder monitoring and calibrating controls thereon.
Figure 17:
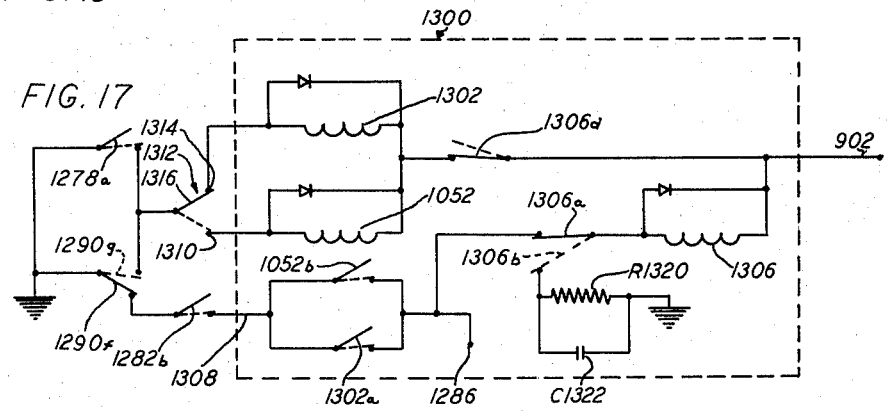
Figure 16:
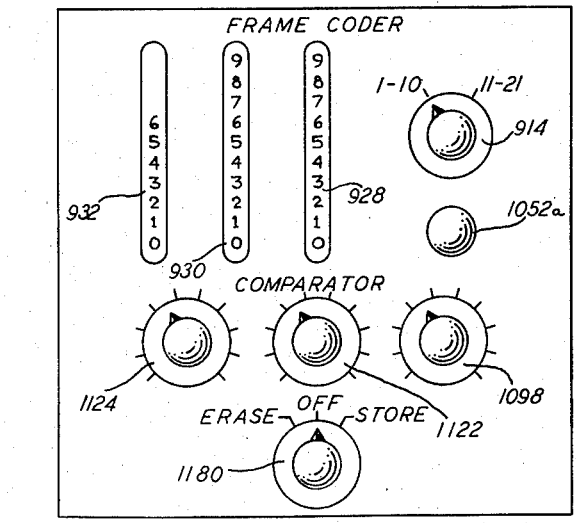
Figure 24:
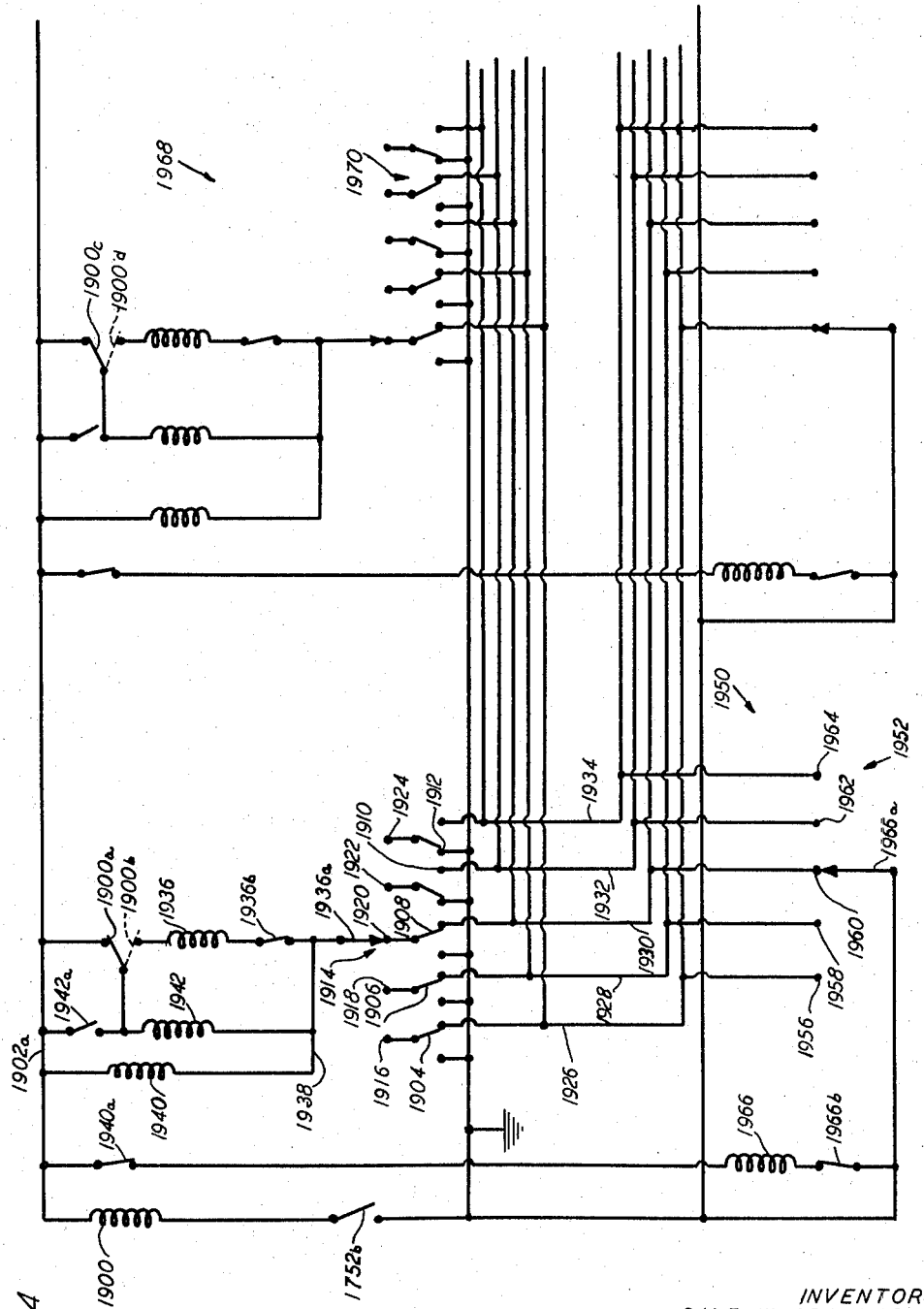

Figs. 15a and 15b together are a single diagram illustrating the frame number circuit and the control circuit portions of the read-out translator;

Fig. 16 is a view of the controls for the read-out translator;

Fig. 17 is a circuit diagram of the motor transport control mechanism;

Fig. 18 is a circuit diagram illustrating an alternative converter and mixer which may be used in place of the circuit of Fig. 7;

Fig. 19 is a block diagram of an alternative master oscillator and frequency division system with controls therefor which may be substituted in place of the circuit of Fig. 8;

Fig. 20 is a diagram of an alternative frequency division and resetting system which forms a portion of the circuit of Fig. 19;

Fig. 21 is a diagram of an alternative record number transfer system which may be incorporated in the circuit of Fig. 14;

Fig. 22 is a diagram of an alternative frame number matrix and control system which may be substituted in Fig. 15;

Fig. 23 is a diagram of an alternative resetting system which may be substituted in Fig. 14; and Fig. 24 is a diagram of an automatic channel selector for operating the read out translator.

GENERAL DESCRIPTION

In general, the nature of the invention may be comprehended by considering a specific embodiment thereof which for purpose of illustration is set forth in somewhat simplified block form in Fig. 1.

Generally speaking, the method employed in this embodiment is immediately to convert each variable voltage at selected intervals, say, for example, at one second intervals, into a series of equally spaced pulse groups in which the number of pulses in any group is a function of the voltage at the particular sampling instant. These pulse groups are then recorded serially as an intermediate record on magnetic tape 50 which, in the particular embodiment herein described, has 25 tracks. Each of these tracks has its own recording head. Pickup heads responsive to this intermediate record subsequently operate a read-out translator which controls the read-out device.

One of these channels or tracks, for instance number 1, is a sound channel and is used for audibly monitoring the tests. It comprises a microphone 52 which feeds through an audio amplifier 54 to the first recording head 55 so that the audio signal is magnetically recorded on the tape 50. Any information regarding the test data may be recorded by the test supervisor on this channel so that this information will be available during the read-out translating process.

As an example, in some instances a transducer which produces an input variable does not have a linear characteristic, and it is desirable to record a calibration of the transducer along with its track. If a nonlinear transducer is assumed which changes variable weight into a variable voltage, this may be calibrated with weights covering the range of nonlinearity. For instance, weights from 5 to 100 pounds at five-pound increments may be successively imposed thereon and a record made on the sound track of the calibrating weights used, together with a record on a channel (say channel 2) of the corresponding output voltages of the transducer.

After a calibrating operation, channel 2 along with the others is utilized to digitize and record a variable voltage resulting from a test run, and this is indicated in Fig. 1 by showing transducers for channels 2 to 21, represented collectively by a block 62, supplying voltage signals to separate attenuators and converters for channels 2 to 21, shown by block 64, and the latter supplying pulse signals to the separate recording heads 66 for channels 2 to 21.

The sampling intervals are timed by a frame speed control circuit 68 which in the present instance comprises a master oscillator of accurately regulated frequency, followed by a number of stages of frequency division. For example, the oscillator in this embodiment has a frequency of 12 kc., controlling a cascaded series of six frequency dividing stages successively dividing by 10, 10, 6, 2, 5 and 2, so that the last stage will produce output pulses at the rate of one per second.

The output of the frequency divider system is supplied to an amplifier 70 from which output time signals are derived to be used as one of the controls for the converters 64 to initiate their operation at the beginning of each frame. A "frame," as used herein, is the interval between successive voltage samplings.

The amplifier 70 also supplies a frame number signal to a frame number control apparatus 72 which supplies a pulse to the converters to initiate a frame and also supplies pulses to the recording heads 74 for channels 22, 23, 24 and 25. The reason for using four heads in parallel will appear subsequently. For purpose of description at present, however, it will be assumed that only one head, for the 22nd channel, is used. The pulses supplied to this recording head form a numerical series such that the number of pulses increase with an increase in frame number. For instance, they can be ten for the first frame, twenty for the second frame, etc., up to 5,990 for the 599th frame. In one optional setting of the device of the present invention, the frames are thirty inches long on a one-inch wide magnetic tape moving at a speed of thirty inches per second. It will be understood that these values are illustrative only and are not in any sense limitative. In fact the practical embodiment of the invention herein described is also adapted to be set so as to record shorter frames at a lower tape speed if desired.

In order to monitor the recording of the digital pulses during a run, a channel monitor 76 may be selectively connected to any one of the 20 attenuators and converters 64 by a multi-contact switch. This channel monitor comprises an electronic counter which will display the frame number and the number of voltage pulses being recorded at any instant.

The foregoing apparatus constitutes the digital data recording unit and will be located at the site of the test. The magnetic tape may, at the site of the test or at a computing center, then have its data reduced and recorded in the form of a punched card for each frame, or a printing operation for each frame, or the digital data can be fed directly to any of several computing mechanisms. Usually to reduce the cost, the digital data recorded on the channels will be reduced to permanent record form by taking off the information from the separate channels in sequence, rather than simultaneously taking the information from all channels.

In the data reducing or read-out control apparatus, there are 25 reproduce heads 78, 80, and 82, which cooperate with the 25 channels on the magnetic tape. The output of the reproduce head 78 is supplied to an audio amplifier and speaker 84 to provide information to the operator of the read-out control apparatus. The outputs of the reproduce heads 80 for the channels 2 to 21 are supplied successively to a record coder 86 which comprises an electronic counter and is sequentially connected to the recording heads for the channels 2 to 21. During the operation of reading out the data on a certain channel, the full length of the magnetic tape is advanced beneath the pickup head. As an example, assume that the coder 86 is connected to the second channel. After all the signals from this channel have been picked up, the magnetic tape is rewound and re-run with the record coder switched to the pickup head which is sensitive to the next channel to be decoded.

The record coder 86 can have its time constants changed by means of a manually preset frame speed control 88 which conditions the record coder 86 for the reception of signals having various frame lengths as, for example, one second, one-tenth of a second, or one-hundredth of a second.

The signal from the pickup head 82 for channel 22 (actually pickup heads 22 to 25 as previously mentioned) is supplied to a frame coder 90 which is effective to provide a pulse at the beginning of each frame, and a pulse group proportional in number to the frame serial number. If at any time the pulse groups thus supplied are not proportional in number to the appropriate frame serial number, the mechanism attempts to correct this error and if it cannot it refuses to print the error and signals the malfunctioning to the operator. The frame coder is conditioned for operation at the various sampling intervals by the frame speed control 88.

The output of the record coder 86 is supplied to a relay matrix 92. This matrix in the present embodiment consists of twelve relays and operates as a storage or memory device.

The relay matrix controls the operation of a read-out apparatus 94 which, as before stated, may be in the form of a tabulating card punching machine or a printer or lister similar to the printing mechanism of an adding machine. Such devices are well known and need no description since the specific device used for this purpose forms no part of the present invention. After the read-out apparatus 94 has operated, it returns a clearing signal which clears the relay matrix 92, and similarly, when the relay matrix has been cleared, it sends a clearing signal to the record coder 86 and frame coder 90.

The frame coder 90 supplies its signal to a relay matrix 96 which is generally similar to the relay matrix 92. The relay matrix 96 in turn supplies the amount registered therein to the read-out apparatus 94 so that the frame serial number will be punched or printed simultaneously with the digital information.

The above constitutes merely an outline of the apparatus as a whole, it being understood that there are a number of electrical interlocks which render the operation automatic, and that there are several safety devices and circuits which prevent errors from being recorded by the read-out apparatus 94. These will be described in detail in connection with the description of the individual units which are combined to form the system as a whole.

To summarize, the apparatus in the form described is capable, with twenty simultaneous varying input voltages, of producing a digitally punched card for each voltage for each sampling interval, each card also being punched with the frame serial number. Thus, the interval at which the sampling took place during the test is recorded on each card. In addition, fixed data relative to the nature of the test, the date, the personnel conducting the test, etc., may also be recorded if desired by numbers punched in the cards. In lieu of making the record on punched cards, it may be printed or used directly in other calculating mechanisms.

Thus, it is seen that the system comprises two units, the first unit being provided for simultaneously recording successive pulse groups with the pulse quantity of each group being proportional to one of 20 variable voltages, while at the same time recording a monitoring audio-frequency signal and also recording pulses in number representing the serial numbers of successive frames. This information is placed by the first unit upon magnetic tape. The magnetic tape is then transferred to a second unit by which the recorded pulses from the 21 channels are picked up and ultimately recorded as numbers directly proportional to the varying voltages at particular time intervals along with a number representing the time at which the sample was taken. In theory, the magnetic tape is not essential, but it provides an extremely reliable intermediate record from which the information may be taken several times, if necessary. This intermediate record can also serve for the correction of any errors which may possibly be made in the punching or printing mechanism. Furthermore, it makes it possible to use only one read-out mechanism, since information is printed from only one channel at a time.

It will be readily apparent that while the apparatus has been described as having 25 channels, the number may be increased or decreased as may be desirable for any particular installation.

Previously it was mentioned that in the embodiment of the invention herein described, four recording heads for channels 22, 23, 24 and 25 are used for the frame number control mechanism, whereas it might appear that only one channel and head would be needed. The reason why four heads, all connected in parallel, are used is as follows. Occasionally a small section of the magnetic tape may not be properly coated and therefore may give an inaccurate record of the pulses applied thereto. If two separate records are made by two heads connected in parallel and these records are picked off by two heads in parallel, it will be seen that since the two separate signals are in phase, no fidelity will be lost in the translation unless both tracks are faulty at the same place. The use of two heads and tracks therefore gives greater reliability in performance.

As has been mentioned, the present system uses 25 traces on a one inch wide tape. So far as is known, no multiple heads are commercially available with spacing this close. Multiple heads are commercially available, however, which will produce 13 traces upon a one inch tape. The arrangement used by us is to supply one of these multiple heads to produce 13 traces and then to use an identical multiple head in an advance or trailing relationship to the first head but displaced transversely of the tape by an amount equal to one-half the distance between adjacent traces produced by the first head. Thus, the second head makes 12 traces interlaced between the 13 produced by the first head for a total of 25. It will be appreciated that if the tape is centered with respect to the first group of 13 heads and the second group of 13 heads is shifted off center to the left, then the leftmost head of the second group will be off the recording area of the tape and therefore should not be used.

Inasmuch as the arrangement just described will displace 12 of the traces longitudinally of the tape with respect to the other 13, a frame number signal recorded by a head in one group will be incorrectly positioned with respect to the heads in the other group. For this reason, and for the reason previously discussed, two heads in one group are used to record frame number information for the remaining heads in that group, while two heads in the second group simultaneously record the identical frame number information for the remaining heads in the second group.

In the interest of definiteness, it will be assumed that one multiple head will produce 13 traces designated by odd numbers from 1 to 25, while the other produces 12 traces indicated by even numbers from 2 to 24. Number 1 is the audio channel while numbers 22 to 25 in parallel are the frame number channels.

Incidentally, as will be pointed out in greater detail presently, an occasional "hole" (a bad spot) in the tape where one of the transducer inputs is recorded does not appreciably affect the information read out from that trace. Only one recording and one reproduce head are therefore used in this embodiment for each of the record channels.

*Analogue to digital converter*

As previously mentioned, means are provided to change a varying voltage into pulse groups, proportional in number to the voltage at successive sampling intervals. The general nature of this converter may best be understood by reference to Figs. 2 to 6. One of these converters is provided for each voltage input channel, so in the exemplary device twenty are used.

A typical analog or varying voltage curve is illustrated in Fig. 2. This curve represents a voltage varying from a value v1 at time t1, to a value of v2 at t2. The apparatus and circuits presently to be described convert this voltage magnitude at sampling intervals of $t1$ and $t2$ into time intervals T1 and T2 of Fig. 3. These time intervals T1 and T2 operate valving or gating circuit means to pass groups of oscillations derived from a master oscillator 200 which in the particular apparatus disclosed herein, operates at a frequency of 12 kc. within ten parts in one million. The output of this oscillator is indicated in Fig. 4. This oscillator may be of conventional construction, but if the sampling rate is to be closely held, the frequency of this oscillator should be closely controlled, as by a piezoelectric crystal for instance.

The converter is so constructed that for the time intervals T1 and T2 of Fig. 3 the high frequency oscillator signal will be conducted as shown, so that the converter mixer will have an output as indicated in Fig. 5, from which it will be apparent that the number of cycles per frame is directly proportional to the voltage, as at *v*1 and *v*2 of Fig. 2.

This statement is not strictly accurate, because the circuits introduce a constant threshold count at all voltages as will be explained presently. Its acceptance at this juncture, however, will avoid unnecessary confusion. The master oscillator and a frequency divider system also produce square wave pulses at a rate of 12,000 p.p.s. (pulses per second), 1,200 p.p.s., 10 p.p.s. and 1 p.p.s. These square wave pulses determine the frame duration and are used for other control purposes as will appear. The frame duration pulses are represented in Fig. 6.

The signal shown in Fig. 5 constitutes the output of one of the analog to digital converters, and is recorded on the magnetic tape 50.

More specifically, a varying input voltage, as shown in Fig. 7, is impressed across the input of a direct current amplifier indicated by the block 110 in Fig. 7, through a precision step attenuator 111. The input end terminal of this attenuator is connected to the movable contact of a single pole double throw switch 114 which may be thrown to connect the amplifier to either of two input terminals 116 or 118. The terminal 116 is connected to the transducer, the varying voltage output of which is to be converted into digital values. The terminal 118 is adapted to be connected to a known fixed, or a variable voltage which is provided for calibrating the apparatus as a whole.

The other end terminal of the attenuator 111 is connected to a point of fixed potential, ground in the present instance. An intermediate terminal 120 of the attenuator is connected to the input of the direct current amplifier 110 and a conventional tap switch is provided for adjusting the attenuator so that a voltage variation between zero and no more than one volt will appear between the amplifier terminal 120 and ground when transducer input analogues at levels from less than one volt up to 500 volts are connected between ground and terminal 116.

The direct current amplifier used in the present embodiment is not unusual, but is of precision construction and has a gain of approximately 50, so that the voltage between ground and its output terminal 122 will vary throughout a fifty volt range. The amplifier used is linear within one part in one thousand so as to obtain the accuracy previously mentioned.

The amplifier output terminal 122 is connected to the cathode 124 of a diode 126 and the plate of this diode is connected to the control grid of a triode 128 and to the plate of a pentode 130 which operates in a phantastron circuit. More specifically, the triode 128 is connected in a cathode follower circuit, the plate being connected to a 250 v. positive line 132 leading from the power supply. The cathode of triode 128 is connected to a conductor 134 through a resistor R136. The potential on the conductor 134 is maintained at a value of approximately 105 volts by means of a voltage regulator tube 138 which is connected between ground and the conductor 134, and by means of a resistor R140 connected between conductors 132 and 134.

A voltage divider connected between conductors 132 and 134 is made up of fixed resistors R142 and R143 between which is connected, in series, the resistor element of a potentiometer R144. The sliding contactor 146 of the potentiometer is connected through a resistor R148 to the control grid of pentode 130. This control grid is also connected through a capacitor C150 to the cathode of triode 128. The plate of pentode 130 is connected to conductor 132 through a plate resistor R151, while the screen grid of this tube is connected to the conductor 132 by a resistor R152. The cathode of pentode 130 is connected to conductor 134 by a resistor R154.

During the rundown portion of the cycle of the phantastron 130, there will be no current drawn through its control grid. During this period current is being drawn through the plate circuit, developing a potential across resistor R151. This potential, by means of the cathode follower triode 128, provides charging current for C150 and the rate of charge of C150 will depend upon the value of R148 and the potential thereacross. During the resting time of the pentode 130, cathode current of pentode 130 is drawn through the screen grid resistor R152. Consequently, during the rundown period there will be a small potential across R152, and during the resting period of pentode 130 there will be a large potential across R152. The duration of the rundown period will be governed by the charging time of capacitor C150.

The rundown cycle of pentode 130 is initiated by a positive pulse developed across resistor R156. With the impression of this positive pulse, the normally negative suppressor grid is brought positive with respect to the cathode, thereby shifting the current from the screen grid to the plate circuit. When the plate potential of pentode 130 subsequently becomes sufficiently low, current again shifts to the screen circuit, ending the rundown period, and the pentode 130 returns to the at rest condition.

In general, the operation of this and similar phantastron circuits is described in "Waveforms," vol. 19 of Radiation Laboratory Series, published by McGraw-Hill Book Company, first edition of 1949, secs. 5–15 through 5–18.

The ultimate result of the operation of this phantastron circuit is that the voltage on the screen grid of pentode 130 is high during the rundown period and low during the rest period. This change in potential as will be explained presently is utilized to control the number of cycles from the high frequency oscillator which are transmitted to the output circuit of the converter indicated in Fig. 5.

The control pulse which is impressed upon the suppressor grid of pentode 130 at the beginning of a frame to start run-down operation is derived from a square wave pulse obtained from an output terminal 160 of the frequency dividing system. These pulses occur, in the particular form of the invention herein described, at intervals of one second or optionally at 1/10 second. They can of course occur at other desired rates, and it will be understood throughout this description that any appropriate rate can be used, although to avoid confusion the description will usually explain the operation upon the assumption that a one second interval has been chosen. These square wave pulses are transmitted through a capacitor C162 to a diode 164 and a resistor R166 which is connected between the diode 164 and the conductor 134. This circuit changes the square waveform received from terminal 160 into sharp wave front positive pulses which are impressed upon the suppressor grid of pentode 130. The waveform appearing on the screen grid of pentode 130 is illustrated in Fig. 3.

The screen grid of pentode 130 is connected to a minus 150 v. terminal of the power supply through series resistors R168 and R169, and the junction 170 between these resistors is connected to the grid of a valving or gating triode 172. The cathode of triode 172 is connected through a terminal 174 to the output of the master oscillator 200 and thus has a 12 kc. signal impressed thereon, as shown in Fig. 4.

The plate of triode 172 is connected to the 250 v. power conductor 132 through a current limiting resistor R176 and the primary 178 of an output transformer 179 in series.

The junction 170 is connected to the plate of a diode 180, the cathode of which is connected to the junction of a pair of voltage dividing resistors R182 and R183 connected in series between the minus 150 v. terminal and ground.

During the rundown period of the pentode 130, when there is a high potential on the screen thereof, current is drawn through resistor 168 and diode 180, establishing a bias potential for the triode 172. This bias potential is held at a fixed maximum by the diode 180 and is at a level somewhat below the normal voltage maximum of the square wave output of the pentode 130 screen. This bias stabilization by the diode 180 is advisable because the output potential of different pentode tubes of the same type will vary to some extent, and the diode acts to clip the square wave output of the pentode at a level safely within the capability of different pentodes which may be used in this circuit.

During the resting period of the pentode 130, when there is a low potential at the screen thereof and at conductor 170, the triode 172 will be biased beyond cutoff condition. During the rundown period of the pentode, this voltage will be high and the triode will pass the 12 kc. signal from the master oscillator. The resultant signal in the plate circuit will be substantially as indicated in Fig. 5.

The secondary of transformer 179 has a filtering capacitor C190 connected across its terminals 192 and 193 and these terminals are connected to one of the previously mentioned magnetic tape recording heads.

Occasionally it is desirable to monitor the output of the converter, as previously mentioned, in order to check its operation or to obtain information during the recording of a test. The signal from the converter for monitoring is derived from a terminal 194 which is connected by a capacitor C196 to the junction between resistor R176 and transformer primary winding 178.

In order to achieve precision operation of the converter, it is necessary that the power supply voltages be carefully regulated and this can be accomplished by any well known means. So far as the heaters are concerned, this is also necessary for the tubes of the direct current amplifier 110, the diode 124, and the pentode 130.

*Master oscillator and frequency divider*

The master oscillator and frequency divider stages (Fig. 1) will be understood upon reference to the block diagram of Fig. 8, in which the master oscillator 200 illustrated has two outputs. One of these is in the form of square wave pulses at a frequency of 12,000 p.p.s. which is transmitted to the first frequency divider stage 201, in which the frequency is divided by ten, producing 1200 p.p.s. The output of stage 201 is supplied to the second frequency divider stage 202, wherein the frequency is again divided by ten, with the resultant output of 120 p.p.s., which is supplied to the third stage 203, wherein the frequency is divided by six so as to produce an output of 20 p.p.s.

Similarly, in the fourth, fifth, and sixth frequency divider stages 204, 205, and 206, the frequency is successively divided by 2, 5, and 2, respectively, so that the outputs of these stages are 10, 2, and 1 pulses per second, respectively.

The second output signal from the master oscillator 200 is in the form of a 12 kc. sine wave, which is supplied to the output terminal 174. The square wave output of the master oscillator 200 is also supplied through a conductor 207 leading to a pole 208 of single pole double throw switch 209. The other pole 210 of this switch is connected to the output of the first frequency divider stage 201, and thus receives 1200 p.p.s. The blade of the switch 209 is connected to a terminal 212. The output of the sixth frequency divider stage 206 at 1 p.p.s. is connected through a conventional cathode follower coupling stage 213 to a pole 214 of a single pole double throw switch 216, the blade of which is connected to the terminal 160 previously mentioned. The other pole 218 of this switch is cathode follower coupled, as at 219 to the output of the fourth frequency divider stage 204, and thus the pulse signal impressed upon the switch at this terminal is at the rate of 10 p.p.s. The blades of switches 209 and 216 are mechanically intercoupled so as to be thrown together.

The circuits employed in the master oscillator and divider stages may be of any suitable well known type.

One such circuit which has been found to be particularly reliable for frequency division in the present application is shown in Fig. 9, which illustrates the second frequency divider stage 202.

In this stage, the input from the stage 201 is applied to a terminal 220 in the form of positive pulses, in which the pulse width is approximately one-tenth of the space between successive pulses as is indicated in the drawing adjacent the input terminal 220. These pulses are supplied through an attenuating and wave shaping network comprising capacitors C222 and C223, and a germanium diode 224.

By means of this mesh, the rectangular pulses 221 are attenuated and shaped into the sharp front positive pulse wave form indicated at 226. This pulse wave is impressed upon the suppressor grid of a phantastron connected pentode 228, the cathode of which is connected to ground through resistor R230 and the plate of which is connected to the plus 250 v. terminal of the power supply through a resistor R232.

The control grid of pentode 228 is connected to its plate by a timing capacitor C234 and is also connected to the plate of a diode 236. The screen grid of pentode 228 is connected to the plus 250 v. terminal through a resistor R238. The output signal is derived from the screen grid through a conductor 240. The cathode of the diode 236 is connected to ground through resistor R242 and is connected to the plus 250 v. terminal through resistor R244, the resistor element of a potentiometer R245, and resistor R246 in series. The movable contactor of the potentiometer 245 is connected to the plate of diode 236 through a timing resistor R248.

With phantastron pentode 228 in its at rest condition, the rundown is started by the positive pulse on the suppressor grid, causing the current to shift from the screen grid to the plate circuit. The change in potential at the plate of pentode 228 causes capacitor 234 to discharge through resistor R248. The rate of discharge is then controlled by the potential across R248 and the value of this resistor. When the plate of pentode 228 is near its bottoming potential, the next slight negative pulse on the suppressor is then sufficiently large to return the pentode to its at rest condition, shifting the current from the plate circuit back to the screen grid circuit. The resulting potential variation developed on the conductor 240 is used as an input signal for the succeeding divider and is in the form of a rectangular wave similar to wave form 221, except that the values of capacitor 234 and R248 and the other parameters of pentode 228 are such that the pulses occur at a frequency of 120 p.p.s. at the output conductor 240.

The frequency dividing stages 201, 203, and 205, may be substantially identical with that shown in Fig. 9, except that the values of certain of the circuit components differ so as to obtain frequency division by the appropriate amount. The stages 204 and 206 which divide by two may be more simple and are in this instance of the well known Eccles-Jordan flip flop type, modified to operate with a positive going pulse.

*Frame number circuit*

Referring now to the frame number circuit illustrated in Fig. 10, the signal inputs to this circuit are a lead 260 from switch terminal 212 and a lead 262 connected to switch terminal 160. When these ganged switches are thrown in one direction the leads 260 and 262 will supply square wave pulses, respectively, at 12,000 p.p.s. and 10 p.p.s. so as to give a frame length of one-tenth second as will appear. With these two switches thrown to the other position, the leads 260 and 262 will supply pulses respectively at the rate of 1200 p.p.s. and one p.p.s. to give a frame length of one second.

The signal input from the lead 260 is fed through a capacitor C264 to the suppressor grid of a pentode 268. The plate of this tube is connected to an output lead 270, connected in turn through a resistor R266 to a power supply line 272 maintained at a potential of plus 300 volts. The signal from the input 262 is applied by way of resistor R274 to the cathode of this tube, this cathode also being connected through resistor R276 to a line 402 maintained at a potential of minus 150 v. The pentode 268 control grid and suppressor are connected to ground through resistors R278 and R280 respectively, while the pentode screen is connected by a resistor R282 to line 272 and by resistor 284 to ground.

The values of the resistors in the tube circuit are such that the tube does not normally conduct. When a negative pulse arrives at the cathode, however, the potential of the cathode drops sufficiently to place conduction through the tube under the control of the suppressor. The signal applied to the suppressor therefore appears at the plate until the tube is again cut off by the next positive going pulse. The signal thus developed at the plate is taken off through a coupling capacitor C294 connected to the lead 270. Since the pulses applied to the suppressor of pentode 268 are just 600 times the changes in voltage applied to the cathode thereof, the output through the capacitor C294 will contain a D.C. transient and a train of 600 pulses for each negative going pulse applied to the cathode of pentode 268.

The train of 600 pulses, plus the D.C. transient, are fed from the capacitor C294 to a trigger circuit comprised of the triodes 296 and 298. In this circuit the grid of triode 296 is connected by a lead 300 to the output of a capacitor C294 and also to a junction between the ends of a pair of resistors R302 and R304, leading respectively to the 300 volt power supply lead 272 and to ground. The cathodes of the two tubes are connected together and to ground through a resistor R305. The plate of the triode 296 is connected by a lead 306 to the power supply 272 through a resistor R308, and also by way of a parallel connection of resistor R310 and capacitor C312 to the grid of the second triode 298. The grid of 298 is connected to a resistor R314 leading to ground. The plate of the second triode 298 is connected to an output lead 316 and also by way of a resistor R318 to the power supply lead 272.

In this circuit, with triode 298 conducting and triode 296 cut off, the grid potential of the triode 298 is determined by the resistors R308, R310, and R314 and is such as to cause current to flow through triode 298, R305, and R318. The potential thus developed across R305 is sufficient to cut off triode 296. When the potential of the grid of triode 296 is increased positively, it causes this tube to conduct. The change in plate potential of triode 296 thus produced is fed to the grid of triode 298 through C312, causing triode 298 to cease conducting. The potential across resistor R318 decreases, giving a positive going output into the lead 316. The action continues (the circuit has regenerative action due to the common cathode resistor R305) until 298 is cut off and triode 296 fully conducts. Upon a decrease in grid potential at the triode 296, the action is reversed, producing a negative going signal across the plate of triode 298. Hence, a train of 601 pulses is passed to the lead 316 whenever 600 pulses plus the D.C. transient are received from the linear gate. These output pulses are of appropriate shape and amplitude to operate the decimal counting units indicated generally at 320.

The counting unit or counter indicated generally at 320 needs no special description, since circuits for this purpose are well understood. Complete units as packages are available for this purpose from several manufacturers and it is usually much more economical to use these packages than to devise special circuits. Those further interested in counting circuits are referred to the "Radiation Laboratory Series," vol. 19, "Waveforms," published by McGraw-Hill Book Company, Inc., 1949 ed., chapter 17.

In general, the counting unit 320 comprises three separate counters. The first of these 320a receives pulses through the line 316 and counts to nine and then resets to zero upon the arrival of the tenth pulse. As it resets to zero it also supplies a pulse to a second decimal counting unit 320b, which likewise counts to nine and then resets to zero at the tenth pulse. The second counting unit also supplies an output pulse when it resets to zero, and one of these output pulses, therefore, will be supplied for each 100 pulses occurring in the line 316. The output pulses from the second counter are fed to a third counter 320c which counts to five and then resets to zero at the sixth count. As it resets to zero it also supplies a pulse to an output lead indicated at 322. Thus, there is an output pulse in the lead 322 for each 600 pulses supplied to the counter by the lead 316. The counter 320 also has a push button 324 which can be manually depressed to reset all of the counting units to zero at the start of a run and each of the three counting elements displays visually in a well known manner the count stored therein by means of neon lights.

As previously explained, during the first half of each frame no pulses will be fed through the line 316 to the counting unit. When the frame is exactly half over, the pulses start to flow through the line 316 and always total a signal from a comparator circuit to be described 601 pulses for each frame, the last of which just passes into the next succeeding frame.

If it is assumed therefore, that the counting units have all been reset to zero at the start of a run, and that the run is then started, the following takes place. Beginning at the middle of the first frame, the counting units will start to count and will count to 600 and then reset to zero, at which point an output pulse is supplied to the line 322. This output pulse it will be seen is coincident with the end of the first frame. The counter, however, continues for one more count and then comes to rest, since it resets to zero at 600, and 601 pulses are supplied. At the middle of the second frame, pulses will again be fed to the counter and this time an output pulse will be supplied to the line 322 when exactly 599 additional pulses have been supplied through the lead 316. The output pulse, therefore, occurs slightly earlier in time with respect to the beginning of the next succeeding frame than in the first instance. The counter continues for two more counts before resting. It will be apparent, therefore, that with each successive frame during the test run, the output pulse in the lead 322 will occur slightly earlier than in the last previous frame, up to a total of 599 frames at which point the output pulse will occur just after the middle of the frame. Thus it will be seen that the time interval between the pulse signal in the line 322 and the beginning of the next frame is proportional to the serial number of the next frame.

*Frame control circuit*

The output from the counter represented by the line 322 is imposed upon the frame control circuit which forms the subject matter of Fig. 11. The other signal inputs to this circuit are pulses at the rate of either one per second or ten per second, represented by the lead 263, and the oscillator signal at 12 kc., which is introduced through the line 330. This line may be considered as being connected to line 174, previously mentioned. The circuit also is supplied through line 332 with 250 volts D.C. from the power supply unit. Also the power supply is connected to line 334 and maintains this line at a potential of minus 150 volts.

The signals in the lines 322 and 263 are brought into the circuit through a mixing network comprised as follows. Three resistors R336, R337 and R338 are connected in series from the power supply line 332 to ground. The junction between resistors R336 and R337, represented by the line 340, is connected to the line 322 by way of a germanium diode 342 and a capacitor C344 in series. The junction between resistors R337 and R338 is connected to the lead 263 by way of two capacitors being connected to ground through another germanium diode 350.

The line 340 bearing the mixed signal is connected through a resistor R352 to the grid of a triode 354. The plate of this triode is connected by a line 356 to the grid of a second triode 358, which has its plate directly connected to the power supply line 332. A voltage divider extends from the power supply line 332 to ground and is made up of four resistors connected in series as follows. Beginning at the power supply line 332, they are, R360, R362, R363, and R364. The cathode of triode 354 is connected to the junction of resistors R364 and R363. The plate of this triode is connected by way of a resistor R366 to the junction between resistor R363 and R362, and the cathode of triode 358 is connected to the junction between resistors R362 and R360. This last junction is also connected by a resistor R368 to the grid of a gating triode 370 and to the plate of a diode 372. Although the tube 372 is illustrated as a triode in the diagram, since it is one half of an available double triode, it will be appreciated that it functions as a diode inasmuch as the plate and grid are connected together. The plate of the diode 372 is also connected to the minus 150 volt power supply lead 334 through a resistor R374. The cathode of the diode 272 is connected to the center of a voltage divider made up of resistors R376 and R378, the former of which extends to the line 334 while the other leads to ground.

The 12 kc. signal in the line 330 is connected directly to the cathode of triode 370, and the plate of this tube is connected by way of a resistor R380 through the primary 382 of an output transformer 384 and thence to the power supply lead 332. The secondary 386 of this transformer is connected by leads 388 and 390 to the terminals of the previously mentioned four recording heads for the frame number traces. This output signal to the recording heads is shaped to substantially sine wave form by a capacitor C392 connected across the output leads. The outgoing signal of this unit is monitored from a terminal 394 connected through a capacitor C396 to the junction of resistor R380 and the primary 382 of the output transformer.

This circuit operates as follows. The signal from the counter, entering by way of line 322, is differentiated by capacitor C344 and germanium diode 342 so as to pass the negative going signal while attenuating the positive portion thereof. The frame end signal from the time chassis, that is, the signal in the lead 263, is differentiated by the capacitor C348 and diode 350 so as to pass the positive portion of the signal and attenuate the negative going portion thereof. This mixed signal is then imposed upon the grid of triode 354 by way of resistor R352.

The triodes 354 and 358 form a latching gate in which the negative pulses from the counter inhibit current flow through triode 354 and allow triode 358 to conduct. The circuit latches in this condition. On the other hand, a positive pulse from the frame signal circuit, that is, a pulse from the lead 263, causes triode 354 to conduct and turns off triode 358. Again the circuit latches until a negative pulse is received. The change in the D.C. potential on the cathode of triode 358 thus produced is passed through resistor R368 to the grid of the valving triode 370.

It may be noted that the valving circuit comprising the triode 370 and transformer 384 is substantially identical to the arrangement used for the output of the converters previously described. The circuit is such that whenever triode 358 is cut off, its cathode potential is low, thereby causing the grid of triode 370 to be negative so as to cut off current flow through this tube. When triode 358 becomes conducting, its cathode is at a high potential, thereby causing diode 372 to conduct so as to fix the bias of triode 370 at a conducting value. During this conducting period, the oscillator signal at 12 kc. is fed through the triode 370 to the output transformer 384. Thus it will be seen that the triode 370 will begin to conduct the 12 kc. signal to the recording heads when a pulse arrives from the counter by way of the lead 322. The flow of the 12 kc. signal to the recording heads will be interrupted when a subsequent pulse is received through the lead 263 at the end of the frame. The result is that the recording heads connected to the leads 388 and 390 will impress the 12 kc. signal upon the recording tape with the last cycle of the signal always coincident with the end of the frame and with the number of cycles so imposed equivalent to the serial number of the frame. Thus for instance, frame 268, will be coded with 2680 cycles, frame 269 will have 2690 cycles, etc.

*Calibration and monitoring circuit*

The circuit for calibrating and monitoring the converters is illustrated in Fig. 12. The power to this circuit other than the filament supplies comprises leads 400 and 402 maintained at potentials of 300 volts and minus 150 volts respectively. The circuit also receives the square wave frame signal at a rate of one or 10 p.p.s. This signal is brought into the circuit by a lead 263 cathode coupled as at 265 (Fig. 10) to lead 262 previously mentioned. The signal to be monitored is brought into the circuit through a rotary tap switch indicated generally at 404. This switch has a movable element 406 which is adapted to make contact with any one of twenty-one terminals which are so arranged that the terminals from 1 to 20 for instance are connected one each to one of the converters at the converter output leads 194. The remaining terminal of the switch is similarly connected to the monitoring lead 394 of the frame control circuit indicated in Fig. 11. Thus by operation of the tap switch 404 any one of the twenty converters or the frame control circuit can be monitored.

The output of the calibration circuit is represented by a lead 408 which is connected to each of the converter attenuator input terminals 118 previously mentioned, so that when the switch blade 114 of Fig. 7 of any one of the converters is thrown against its terminal 118, the input of that particular converter is connected to the output of the calibration circuit of Fig. 12.

The calibration circuit comprises a pentode tube 410 with its cathode and suppressor connected to ground by way of leads 412 and 414, respectively. The plate of this tube is connected by a lead 416 to the two grids of a double triode 418 and by way of a resistor R420 to the 300 volt lead 400. The two plates of the triode 418 are also connected to the 300 volt lead 400 while the two cathodes thereof are connected together and by way of a lead 422 to the screen of the pentode 410. This cathode lead 422 is also connected to a lead 424 which extends from the movable contact 426 of a tap switch indicated generally by the numeral 428 through a resistor R430 to the control grid of the pentode 410. The pentode control grid is also connected to the minus 150 volt lead 402 through a pair of resistors R432 and R434, the center point between the resistors R432 and R434 being grounded through a capacitor C436.

The swinging member 426 of the tap switch 428 is adapted to be brought against any one of three contacts 438, 440 and 442. The first of these, 438, is connected by way of a resistor R444 to ground and also to ground by way of a pair of resistors R446 and R448 in series. The center point between resistors R446 and R448 is connected to the second switch terminal 440 by a lead 450 which is also connected through a resistor R452 to the third switch terminal 442. This last switch terminal is also connected to ground through the resistor element R454 of a potentiometer 455. The slider of this potentiometer is connected to the output lead 408 previously mentioned.

In this circuit, resistors R434, R432 and R430 establish the grid potential of the pentode 410. They act as an error measuring circuit between the negative supply potential which is used for the reference and the potentials of the cathodes of the triode 418. Any pulse variations in the negative supply are bypassed to ground by resistor R434 and capacitor C436. The error signal is amplified by the pentode 410 and fed to the grid of the triode 418 which in turn adjusts the cathode potential to minimize the error. The D.C. output from the cathode of the triode 418 is fed to the movable switch member 426 and through a portion of the resistance network connected to the three fixed switch terminals to the resistor element 454 of the potentiometer 455. The resistance network is such that the load on the triode 418 is substantially constant at all positions of the switch blade 426 and is such that when the swinging switch member 426 is in contact with terminal 438 the potential across the potentiometer resistor 454 is substantially two volts. With the swinging member 426 against the terminal 440 the voltage across potentiometer resistor element R454 is ten times this or 20 volts. Similarly, when the swinging member 426 is against switch terminal 442, two hundred volts is across the potentiometer resistor 454. Switch terminals 438, 440 and 442 therefore serve as times 2, times 20, and times 200, positions respectively of this switch.

This standardizing circuit will hold the potential at the potentiometer output lead 408 to one part in 1000 for a length of time which is sufficient for calibration purposes. With this circuit any voltage up to 200 volts can be impressed upon the attenuator of any particular converter. Thus, for instance, a converter attenuator can be adjusted to the position it is to take for the range of input voltages to be expected from a particular transducer. Then by adjustment of the potentiometer slider 408, with the tap switch in the times 200 position, a voltage of suitable range (substantially full scale for instance) can be impressed across the attenuator and converter. Then by movement of the tap switch, the voltage input to the converter can be reduced in steps to 1/10 and 1/100 of the original voltage. As will be explained presently, the output of the converter under these test circumstances will be fed to the monitor circuit so that any malfunctioning will be apparent to the operator.

In the monitoring portion of the circuit, the input signal selected by the tap switch 404 is fed to the grid of a triode 460 by way of a capacitor C462 and line 464. This line is also connected through a resistor R466 to the 300 volt line 400 and through a resistor R468 to ground. The cathodes of triode 460 and a second triode 470 are connected together and to ground by way of a common resistor R472. The plate of triode 460 is connected to the high voltage line 400 through a resistor R474 and by way of a resistor R478 and capacitor C480 in parallel to the grid of the second triode 470. This grid is also connected to ground through a resistor R482. The plate of the second triode 470 is connected to the 300 volt line 400 through a resistor R484 and to a signal output line 486.

Upon comparison it will be recognized that the monitoring circuit just described is substantially identical to the trigger circuit of the frame number circuit illustrated in Fig. 10, that is, the circuit which includes triodes 296 and 298. As with this previously described circuit, the input signal is converted into pulses which are fed to a counting unit.

In the trigger circuit which comprises the triodes 460 and 470, the input thereto is the substantially sine wave output from a selected converter. This oscillatory signal is thus converted into pulses which appear in the output lead 486 previously mentioned.

The output lead 486 is conected to the movable contact 488 of a single pole double throw switch having output terminals 490 and 492. The switch blade 488 is associated with output terminal 490 when the monitoring circuit is used with one of the converters operating at a frame speed of 10 frames a second. The switch output terminal 492 is used when the frame speed is one frame per second.

The monitoring circuit includes four decimal counters of standard design, like those forming a portion of Fig. 10. They are indicated by the numerals 494, 496, 498 and 500. Each of these counters in order is arranged to count to 10 and then produce an output signal going to the next in line, thus producing one count of the next succeeding decimal counter. The counters are reset by a pulse signal in a reset line 502 which is provided in a manner to be described presently. This impulse is conveyed to each of the decimal counters and resets counters 494 and 496 to zero, but resets counters 498 and 500 to 9. The reason for not resetting the last two counters to zero will appear presently.

A lead 504 connects the switch output terminal 490 to the input of the second decimal counter 496, while the switch output terminal 492 is connected to the input of the first counter 494. Thus whenever pulses are received from the input line 486 at a frame speed of one frame per second, these pulses will be fed to the first counter 494 and the number thereof will be divided by 10 before actuating the second counter 496. On the other hand, when the frame speed is at a rate of ten frames per second the count is fed directly to the second counter 496. A single pole single throw switch 506 is interposed between the output of the first counter 494 and the input line 504 to the second counter 496 and will be closed whenever the pulse signal in the line 486 is being fed through switch terminal 492 to the first counter 494. Whenever the input signal passes directly to the second counter 496, switch 506 will be opened so as to disconnect the first counter. The count of the last three counting units 496, 498 and 500 is displayed where it can be observed by the operator.

The characteristics of the converter circuits used in this system are such that the circuits operate more reliably if there is some threshold signal even when the input to the converters is at zero volts. In the present embodiment, converters are so adjusted that when the input voltage is at zero, or in other words, when the converter input terminal is grounded, the converters will produce an output of 100 cycles. The output signal of the converters, therefore, is a number of cycles which is proportional to the input voltage plus the threshold of 100 cycles.

When the signal from the converter being monitored is fed into the first decimal counting unit 494, the count will be divided by 10 and the output supplied to counter 496. Therefore, if the converter being tested or adjusted is arranged with its input at zero volts, and if this converter is operating properly, the count of 100 supplied by the converter will be divided by 10 so that ten pulses will be supplied through the line 504 to the second decimal counting unit 496. This second unit therefore counts to 10 and supplies an output pulse to the third counter 498. Since this third counter was reset to 9, the pulse suplied thereto returns the third counter to zero and supplies a pulse which returns the last counter 500 to zero. A zero reading when the input to the converter is zero volts, therefore, indicates that the converter is operating properly. If a higher voltage is applied to the input of the converter by means of the calibration circuit just described, whatever voltage is so applied will produce a proportional count which is added to the threshold count of 100 and the number of counts so produced will be displayed by the monitor after automatically subtracting the initial 100 threshold.

The re-set line 502 is energized by a trigger circuit including triodes 510 and 512. The grid of the first of these triodes, that is, 510, is connected by way of a capacitor C514 to the line 262 which supplies the square wave frame signal at a rate of either one p.p.s. or ten p.p.s. The grid of tube 510 is also connected to the 300 volt line 400 by way of a resistor R516 and to ground through resistor R518. The cathodes of triodes 510 and 512 are connected together and to ground through a common resistor R520. The plate of triode 510 is connected to the 300 volt line 400 through a resistor R522 and by way of resistor R524 and capacitor C526 in parallel to the grid of the second triode 512. This grid is also connected to ground through resistor R528. The plate of the second triode 512 is connected by way of resistor R530 to the 300 volt line 400 and also by way of a capacitor C532 to the previously mentioned reset line 502. The potential on the reset line is ordinarily maintained at zero by conduction through a double diode 534 having its plates connected to ground and the cathodes thereof connected to the reset line 502 and to the minus 150 volt lead 402 by way of a resistor R536.

This trigger circuit operates in the same fashion as the other trigger circuits which have been described, for instance the one comprised of triodes 460 and 470, with the result that the frame speed signal in the line 262 causes the trigger to produce a positive going output pulse for each frame. When this occurs, the potential of the reset line is raised for a period of five pulses—this time interval is determined by the values of C532, R536, C514, R518 and R516—thereby resetting the counters, as previously described, at the beginning of each frame so that counting units 494 and 496 are returned to zero, whereas counters 498 and 500 are returned to nine.

The apparatus described above comprises one of the two principal units of the data reduction system which forms the subject matter of this invention. This equipment is used at the test site and is adapted to accept twenty input variable voltages supplied by twenty transducers. From each of these twenty input voltages an interrupted oscillatory signal is produced (at a frequency of 12 kc. in the present instance) these signals being recorded upon a magnetic tape in side by side relationship in groups or frames. The recording arrangement is such that the number of cycles so recorded in each frame bears a definite relationship to the particular input voltage and is in fact proportional to the input voltage plus a constant threshold figure. The frames may be taken, according to the setting of the mechanism, at a rate of one frame per second or at a rate of ten frames per second. It will be appreciated that other frame lengths could be established if desired by minor modifications to the circuits.

Along with the recording of these twenty tracks which bear a definite relationship to the several input voltages, there is also a sound track upon which speech information may be recorded by the test supervisor. In addition, recordings are made on four separate channels in the same tape to designate the serial numbers of the frames being recorded. This information is utilized in a manner to be explained presently to prevent the read out apparatus from printing errors. This coding also serves to identify the various bits of printed digital information and to correlate them as to their relative time sequence.

The apparatus just described in detail also contains equipment for calibrating and monitoring any of the several converters either prior to a test run or, so far as the monitoring operation is concerned, during the course of a run.

The mechanical apparatus for handling the magnetic tape may be of standard type which is adapted for use with a tape one inch wide. Ordinarily such equipment will use multiple recording heads having up to thirteen units. As has been explained two of these heads have been used in tandem, slightly staggered relation to provide twenty-five channels.

This converting and recording unit also continuously displays during the course of a test run the serial number of the frame being recorded.

At the conclusion of a test run, the spool of magnetic tape is removed from the recording apparatus described above, and at any time thereafter it may be run through the read-out translator so as to take the information from the tape and put it in permanent record form, such as in the form of punched cards for instance.

*Digital read out translator*

The digital read out translator has been briefly described in connection with the description of Fig. 1. In this apparatus the magnetic tape is handled by tape advancing and rewinding mechanism which may be conventional with the tape in contact with twenty-five pickup heads arranged as in the recording unit in two sets in tandem. One of these heads, the one for channel No. 1 for instance, picks up the audio signal and feeds this to a conventional audio amplifier and speaker as is indicated at 84. Inasmuch as suitable audio equipment is well known, no additional description is required.

The pickup heads indicated at 80, for channels 2 to 21, are the counterparts of the recording heads 66 for the same channels. Thus, each of the heads 80 is capable of picking up the signal on one of the channels 2 to 21 and feeding its signal to a channel selector which selects the signal to be fed to the record coder indicated at 86.

The remaining four heads, indicated at 82, pick up the frame number information from channels 22 to 25 and feed this information as two separate signals (one from channels 22 and 24 in parallel and the other from channels 23 and 25 in parallel) to the frame coder indicated at 90.

In Fig. 14, one of the twenty pickup heads, used for transducing digital informtaion from the magnetic tape, is indicated at 80. The coil of this particular head is shown with one side connected to a line 602 leading to one side of an input transformer primary 604, while the other side of this primary is connected by a lead 606 to the movable contact member 608 of a rotary tap switch indicated generally at 610. This tap switch in the present instance has twenty fixed contacts with any one of which the movable member 608 can be associated. One of these contacts is connected to the other side of the pickup coil 80. Each of the coils for the other pickups will have one side connected in common to the lead 602, whereas the other side of each of these coils will be connected in order to one of the several fixed contact points of the rotary tap switch 610. Thus by shifting the movable contact member 606, any of these pickup coils can be connected across the primary 604 of the input transformer.

The secondary 612 of the input transformer is connected at one side to ground as represented by the lead 614, while the other side is connected through a coupling capacitor C616 to the grid of a triode 618. This tube 618 and a second triode 620 are connected to operate as a simple two-stage alternating current amplifier which needs no special description since this portion of the circuit can be conventional. The output of the second amplifier stage is represented by the lead 622 and it carries a signal that is the amplified counterpart of the signal taken from the tape by the pickup head 80.

This amplified substantially sine wave signal is applied through a capacitor C624 to a trigger circuit indicated generally at 626. In this circuit the capacitor C624 is connected to the grid of a triode 628, this grid also being connected through a resistor R630 to a 300 volt line 632 leading from a power supply of conventional construction. The grid is also connected to ground through a resistor R632.

The cathode of triode 628 and the cathode of a second triode 634 are connected together and to ground through a common resistor R636. The plate of the first triode 628 is connected to the high voltage line 632 through a resistor R638 and also to the grid of the second triode 634 by way of a capacitor C640 and resistor R642 in parallel. This grid of the second triode 634 is also connected to ground by a resistor R644. The output of this trigger circuit appears in a line 646 connected to the plate of the second triode 634, this plate also being connected to the high voltage line 632 through a resistor R648.

It will be recognized that the trigger circuit 626 just described is substantially identical to the trigger circuit represented by the triodes 460 and 470 of the monitoring circuit previously described. The operation of the circuit, therefore, needs no special description and it will be understood that a pulse will appear in the line 646 for each cycle picked off the tape by the head 80.

To the right of the trigger circuit just described it will be seen that there is a decimal counting system made up of four decimal counter units 650, 652, 654 and 656. These units may be considered as identical to the counters 494, 496, 498 and 500 previously described in connection with the monitoring circuit and are connected together in the same manner. Thus, when the input signal in the lead 646 is applied through a single pole double throw switch 658 to a terminal 660 leading to the first counting unit 650, this unit will count to 10 and then supply a pulse to the second unit 652 so as to cause the latter unit to count once. On the other hand, when switch 658 is shifted so that the input signal in the lead 646 is supplied to a second output switch terminal 662, this signal will appear directly at the input of the second counting unit 652. As in the previous example, when the signal is supplied directly to the second counting unit 652, a single pole, single throw switch 664 is opened to disconnect the output of the first counting unit 650 from the input of the second counting unit 652. If the system is operating from a tape which was recorded at a rate of one frame a second, the output of the trigger circuit will be supplied to the input of the first counting unit 650 so that this counting unit will divide the pulses by 10 before supplying the signal to the second counting unit 652. If the system is operating from a tape recorded at a rate of ten frames per second, the switch 658 will be shifted so as to apply the incoming signal directly to the switch treminal 662 so that the counting units 652, 654 and 656 count all of the pulses.

As in the previous example, the counters are all reset by a pulse supplied through a lead indicated in the present circuit by the line 670, this pulse being supplied at an appropriate point in each frame in a manner to be described presently. When a pulse does appear in the lead 670 it resets counters 650 and 652 to zero and resets counters 654 and 656 to nine. This is done for the same reason that the identical arrangement is used in the monitoring circuit and is for the purpose of subtracting the threshold count of 100 from the incoming signal so that the number stored in the counting units 652, 654 and 656 is proportional to the voltages supplied by the original test transducers.

Through the operation of this circuit, the count of the cycles in a frame will be stored in the counting units 652, 654 and 656 until this count has been canceled by a pulse in the reset line 670 and the total count will be displayed where the operator can see it.

Each of the counting units is of conventional type using binary counters and is comprised of four tubes as previously mentioned. The pattern of the voltages at the plates (the outputs) of these four tubes, therefore, is always peculiar to the number stored in the individual decimal counter. Leads are therefore brought out from the outputs of the individual tubes and are indicated at 672, 674, 676 and 678 for the second counting unit 652. Depending upon the count stored in the counting unit 652 at any particular time, each one of these four leads will either be at a voltage indicating conduction through its tube or else at a different voltage which will indicate no conduction through that particular tube. The particular combination, therefore, of high or low voltages in these four leads is representative of the number of counts stored in the counting units. Output leads for the third counting unit 654 which are the counterparts of leads 672, 674, 676 and 678 for the second unit are 680, 682, 684, and 648, respectively. Those for the fourth counting unit 656 are, respectively 688, 690, 692 and 694.

As the trigger circuit 626 and the counting units connected thereto are operating to build up a count, the twelve output leads just described will in effect, therefore, have a voltage source rapidly switched on and off in a changing pattern which at any instant is peculiar to the count at that time. When the counters have finished the count for a particular frame, the twelve leads from 672 to 694 will then in effect individually remain either connected to a source of potential or be disconnected therefrom, and the particular combination of such connections will have a pattern which is peculiar to the total count of the particular frame just concluded.

*Record relay matrix*

By tracing one of these leads, 672 for instance, it will be seen that it is connected to ground through a capacitor C696 and to a minus 150 volt line 700, by way of a resistor R702. The line 700 is kept at a constant potential of minus 150 volts by a suitable power supply which may be conventional. The point between the capacitor C696 and the resistor R702 is connected through a resistor R704 to the grid of a triode 706 and also to ground through a capacitor C708. The voltage fluctuations in the line 672 therefore appear at this grid.

The cathode of triode 706 is directly connected to a line 710 and the plate thereof is connected through the normally closed contact 712 of a make-before break relay 714. The movable contact 716 of this relay is connected to one end of the relay coil 718, the other end of which is connected to a line 720. The coil 718 is in parallel with a rectifier cell 722.

When the relay coil 718 is energized it moves contact 716 against contact 724 and then disconnects from contact 712. Contact 724 is connected through a current limiting resistor R726 to a line 728.

The lines 710, 728, and 720 are connected to energizing circuits through several switches so that the voltages thereon can be controlled by the operation of these switches. This will be discussed presently. For the present, however, it can be assumed that the voltages on the lines 720 and 710 are such that the tube 706 will conduct when the grid thereof is at one of the two potentials which may prevail in the lead 672, whereas the tube will not conduct if the other voltage prevails.

As will be explained in greater detail presently, the voltage prevailing in the cathode lead 710, during the time the counters are operating to store a count therein (while a frame is being scanned) is such that the tube 706 cannot conduct. Therefore, although the voltage fluctuates rapidly at the grid of the tube 706 during the course of the count, there will be no current in the plate circuit thereof. As soon as the count is finished, the lead 710 is momentarily energized at a proper voltage to cause the tube 706 to conduct if the voltage at the grid thereof is proper. Thus, if the grid is at a certain level, current will flow in the plate circuit through the relay coil 718 thereby shifting relay contact 716 away from contact 712 and against contact 724. This establishes a holding circuit for the relay inasmuch as lead 728 is maintained at a voltage such that the relay coil 718 will remain sufficiently energized to hold the contact 716 against contact 724. On the other hand, if the voltage at the grid of the tube 706 at the end of a count is not at the proper level, the relay 714 will not operate when the cathode lead 710 is energized.

Once the relay 714 has operated and the holding circuit has been established by way of the resistor R726 and lead 728, conduction through the tube 706 can be cut off by disconnecting the lead 710 without affecting the relay position.

Each of the other eleven counter leads from 674 to 694 are connected to circuits which are identical to the one just described so that all together there are twelve triode and relay circuits which operate as just described to store the pattern set up in the twelve leads from 762 to 794 at the end of a count. In the interest of convenience, these eleven additional triodes are indicated in order by the numerals 730, 732, 734, 736, 738, 740, 742, 744, 746, 748 and 750. The relays in order for these same tubes are 752, 754, 756, 758, 760, 762, 764, 766, 768, 770 and 772. Note that in these circuits all of the cathodes are connected to lead 710, all of the holding circuits depend upon energization of the lead 728, and all of the relay coils are connected at one side to lead 720.

From the above it will be seen that during the course of a count, none of the triodes in the relay circuits will conduct and therefore none of the relays will operate. At the conclusion of the count in a manner to be described presently, the lead 710 is energized at the proper voltage to cause all of the triodes to conduct if the voltages at their grids are proper. This voltage change in the lead 710 is of comparatively short duration, but during this momentary energization, certain of the relays in the several plate circuits will operate and will hold in the operated position, whereas other relays will not operate, thereby storing the count in the record coder relay matrix.

Inasmuch as the relays which do operate lock in the operated position, and since the lead 710 is immediately deenergized after the operation of the relays, the counters 650 to 656 can start storing a new count from the next frame, since the voltage variations at the grids of the triodes 706 and from 730 to 750 will not influence the relays connected in their plate circuits. As will be pointed out presently, before the completion of the storage of a new count in the decimal counters 650 to 656, other sets of contacts operated by the relays 718 and 752 will have completed the task of passing on the information stored in the matrix to the read-out mechanism, whereupon, as will be explained presently, all of these relays are reset to the original positions so that they are ready to accept the count of the next frame from the triodes 706 and 730 to 750.

The line 670, which carries the pulse for resetting the counters 650 to 656, is energized as follows: A positive pulse signal, the source of which will be described presently, arrives by way of a line indicated at 780 at the completion of a frame count. This pulse is fed through a capacitor C782 to the grid of a triode 784, this grid also being connected to ground through a resistor R786 and to the 300-volt line 632 by way of a resistor R790. The cathode of the triode 784 and the cathode of a second triode 792 are connected together and to ground through a common resistor R794. The plate of the triode 784 is connected to the 300-volt lead 632 by way of a resistor R796 and to the grid of the second triode 792 through a capacitor C798 and a resistor R800 in parallel. The grid of triode 792 is connected to ground through a resistor R802. The plate of the second triode 792 is coupled to the reset line 670 through a capacitor C804 and is connected to the 300-volt line through a resistor R806. The reset line 670 is normally maintained at zero volts by a branch 808 which leads to the cathodes of a double diode 810, the plates of which are grounded. The branch 808 is also connected to the minus 150-volt line 700 through a resistor R812.

The circuit which includes the triodes 784 and 792 operates as a trigger in the same manner as the other trigger circuits previously described, for example the circuit made up of the triodes 628 and 634. It therefore needs no special description. This circuit functions such that whenever a positive impulse is received through the line 780 a positive going sharply peaked pulse is sent to the reset line 670 and resets the counter 650 to 656 in the manner previously described.

End of count

A line 820 connected to the input 646 of the counters 650–656 carries the pulse train sent to the counting units. This pulse train is fed through a capacitor C822 to the cathode of a diode 824 and to the anode of a second diode 826. The cathode of diode 826 is grounded while the anode of diode 824 is connected by a lead 828 to the control grid of a pentode 830. Lead 828 has any A.C. component therein removed by a capacitor C832 connected to ground. The grid of pentode 830 is also connected to ground through resistor R834.

The diodes 824 and 826 act to rectify the pulse train in lead 820 so that a minus D.C. potential sufficient to cut off pentode 830 is continuously applied to the pentode grid so long as a count is going. When the count is finished, the grid potential of pentode 830 will be restored to zero by leakage through resistor R834.

The cathode of pentode 830 is connected to ground through two sets of relay contacts in parallel. These contacts are actuated by separate relays and one set indicated at 840a is normally closed while the other set 842a is normally open. The cathode is tied to the suppressor grid while the screen of this pentode is connected to the 300 volt line 632 through a resistor R844. The plate of this tube is connected through relay coils 842 and 840 in series to a plus 150 v. line 846 energized from the power supply.

A small diode cell 848 is connected across relay coil 840 and is so oriented that when current flows through the pentode 830 and coil 840 there is no current through the diode 848. When the relay coil 840 is deenergized, however, the diode 848 prevents a voltage rise which would otherwise accompany the collapsing field of the coil 840. This expedient is used in connection with several other relays in the circuits for this same purpose and therefore these diodes will not be specifically mentioned in each location. In the diagrams, however, the diodes are shown whenever they have been found to be worth while.

Relay coil 840 is the actuator of contacts 840a as well as other contacts to be mentioned presently, all of which will be identified by the numeral 840 plus an additional individual letter designation.

This relay is comparatively heavy in construction in order to handle a gang of contacts and therefore there is a slight delay in its action when it is deenergized. Relay coil 842, which actuates only contacts 842a on the other hand is of the fast acting type and will open contacts 842a within about 1 millisecond after it is deenergized.

This circuit operates as follows: Tube 830 is cut off as long as a count is proceeding as previously explained. When the count is finished, tube 830 conducts (by way of normally closed contacts 840a) thereby energizing relay coils 842 and 840. Coil 842 therefore closes contacts 842a so as to maintain tube 830 conducting before the slower acting coil 840 has had time to interrupt the circuit by opening contacts 840a. Relay coil 840 therefore remains energized until the start of the next count.

As soon as the next count starts, tube 830 will be cut off, thereby deenergizing coil 842 and opening contacts 842a. Thereafter, the tube 830 will remain inactive until relay 840 has had time to reclose the normally closed contacts 840a, even though the count is extremely short. When the count is at the low number end of the scale, it will be appreciated that if it were not for the fast acting relay coil 842 and contacts 842a, it might happen that the time interval between the start of a count and the end thereof (the period of deenergization of relay coil 840) would not be long enough to permit the heavy multiple contact relay 840 to release. Circuits connected to the several contacts of relay 840 under these circumstances would act as though there were no count at all. The fast acting relay, therefore, acts to prevent the heavy relay from making a mistake under conditions where the count is of short duration.

Each of the twelve relays 718 and 752 to 772 has a normally open contact set, all of which are wired in parallel, so that a circuit is established whenever any one of these relays is energized. In order to avoid confusion this multiple set of twelve contacts is represented by a single set indicated at 718a. These contacts in parallel are connected between the line 728 and a resistor R850 which in turn is connected through relay coil 852 to the line 720. Thus, whenever the group of relays 718 and 752 to 777 is energized together (which ones are energized being determined by the number stored in the counters 650 to 656 as has been explained), the first one to close will energize relay coil 852. Relay 852 is comparatively heavy and its action is slow enough to cover the tolerance range of relays 718 and 752 to 772. Thus, although the first of the group of relays to act will energize relay 852, all of these relays will have acted before relay coil 852 has shifted its contacts.

Relay coil 852 actuates a set of normally closed contacts 852a which are connected between ground and the common lead 710 to all of the cathodes of the triodes 706 and 730 to 750. When these contacts open, the cathode circuits will be opened, thus cutting off the current through all of these tubes. This arrangement permits the group of triodes 706 and 730 to 750 to energize the appropriate relays 718 and 752 to 772 and then immediately return to the nonconducting condition ready to receive a new count with the actuated relays 718 and 752 to 772 remaining energized under the influence of their holding contacts 716–724.

The relay line 720 is connected to the 150 v. line 846 through relay contacts 860 and 862 in series and also through relay contacts 840b in parallel therewith. Of these, contacts 862 and 840b are normally open while contacts 860 are normally closed. In this group of contacts, switch 840b is closed when relay 840 is energized at the end of a count as previously mentioned and remains closed until a new count starts. Switch 862 is closed by presently which indicates that a count is ready to be passed on to the readout device. After the readout device has accepted a count from the relay matrix 718 and 752 to 772, that is when the matrix has served its function as to one count and is ready for the next, switch 860 is opened.

When this portion of the circuit is at rest, therefore, switch 860 is closed, switch 862 is open and switch 840b is open during the following count. As soon as the count is completed, switch 840b is closed as previously described and establishes the 150 v. connection to the coils in the relay matrix. The appropriate tubes 706 and 730 to 750 therefore conduct and actuate the proper relay in the matrix to their holding circuits. Immediately thereafter the tubes are again cut off by actuation of the relay coil 852 and contacts 852a.

When the comparator immediately thereafter indicates that the count is ready for printing, switch 862 is closed so as to establish a separate 150 v. connection to the coils in the relay matrix and thus subsequent opening of switch 840b will not deenergize these relays. A new count can therefore proceed without the old count being dropped from the matrix.

After the count has been taken from the matrix by the readout device, switch 860 is opened thereby deenergizing the relays in the matrix and resetting them to the at rest position. Subsequently, switch 862 is opened so that reclosure of switch 860 will not energize the relay matrix. The relay matrix is therefore cleared and conditioned to accept a new count upon its completion by closure of contacts 840b.

*Frame coder and comparator*

The general function of this circuit, which forms the subject matter of Fig. 15, is to control the entire read out translator, that is, the operation of the various relays, the transport mechanism for the magnetic tape, and so on. This circuit operates upon the basis of the frame number signal which, as mentioned previously, is recorded upon four of the channels of the magnetic tape. In addition to this input signal information, the circuit is connected to the power supply which provides the following D.C. voltages: Plus 300 volts at line 900; plus 150 volts at line 902; and minus 150 volts supplied to line 904.

Toward the upper left hand corner of the drawing the pickup heads, four in number, for the frame number signal, are indicated at 82 and are connected in groups of two as previously described, so that one set of these heads can be used to receive the frame number signal when the digital information is being taken from one of the even number traces on the magnetic tape. The other set of heads 82 is used when an odd number trace is being monitored. These two groups, represented by the leads 906 and 908 on the one hand, and 910 and 912 on the other, are connected through a single pole, double throw switch 914 to the primary 916 of an input transformer 918. When the switch 914 is positioned so as to connect leads 906 and 908 to the transformer primary 916, it will be assumed that the system is conditioned for operation from one of the odd numbered traces on the magnetic tape, and when the switch 914 connects the transformer primary to the leads 910 and 912, the pickup heads connected to the input of the transformer are those which receive the number information from the channel heads having even numbers.

The output of the transformer 916 is fed to an amplifier 920 and then passes to a trigger circuit 922. Neither of these circuits needs description since they may be identical to the amplifier and trigger circuit in this location in the circuit of Fig. 14. Their function, as in the circuit of Fig. 14, is to receive the sine wave number signal from the magnetic tape and supply corresponding numbers of pulses to a decimal counter directly to the right. This counter is like that previously described in Fig. 14 with minor differences which will appear.

The output pulses from the circuit 922 are fed through a single pole, double throw, switch 924 to four decimal counting units indicated by the numerals 926, 928, 930 and 932 connected substantially as in Fig. 14. When the movable contact 934 of switch 924 is connected to a lead 936, the output of the pulse circuit 922 is fed directly to the second counting unit 928. This connection skips the counting unit 926 and is used when the tape being monitored was recorded at a speed of ten frames per second. If the tape was recorded at a rate of one frame per second, switch contact 924 is connected to lead 938 which feeds the signal to the first counting unit 926.

In the previously described circuit, Fig. 14, the first counting unit 650, the counterpart of counter 926 in the present diagram, had its output represented by the terminal 4 connected through a switch 664 to the line 660 leading to the input terminal number 7 of the second counting unit. In the present instance this connection is made between terminal 4 of the first counter 926 to the input line 936 of the second counter by way of a switch 940 and diode 942 in series. The purpose of the diode 942, the only dissimilar element, is to permit a pulse to travel from the output of the first counter 926 to the input of the second counter 928 by way of the line 936, but to prevent a pulse traveling in the reverse direction. For a similar reason a second diode indicated at 944 is connected in series between the output of the second counting unit 928 and the input of the third counting unit 930. These diodes are used because, as will appear presently, at a certain point in the cycle of operation, an additional pulse is supplied either to the input of the second counting unit 928 or to the input of the third counting unit 930 and the diodes prevent this additional pulse from reacting respectively upon the circuit of the first counting unit 926 or, alternatively, that of the second unit 928.

Lead 936, which is connected to the input of the second counting unit 928, has a branch 946 connected to one of the terminals 948 of a single pole, double throw switch indicated generally by the numeral 950. The movable member of this switch, 952, is connected through two capacitors C954 and C956 in series to ground. The central point between these capacitors is connected to the common point between a pair of voltage divider resistors, one of which, R958, leads to ground while the other, R960, is connected to the 300 volt line 900. The common point between these resistors is also connected through a rectifier 962 to a line 964 connected to the output of a circuit to be described presently. For the moment it is sufficient to understand that, for a portion of the cycle, the line 964 carries a fluctuating voltage which is prevented by the diode 962 from reacting upon its output circuit. Periodically, however, the fluctuating voltage in the line 964 drops to zero, thereby permitting current to be conducted through the diode by way of switch 950, with the result that if switch blade 952 is connected to terminal 948, an additional pulse will be supplied to the lead 936 and thence to the input of the second counting unit 928. On the other hand, if switch blade 952 is connected to a second output terminal indicated at 966, which is connected to lead 968 extending between the output of the second counting unit 928 and the input of the third counting unit 930, the additional pulse will be added to the input of the third counting unit 930. In either case, as previously mentioned, the added pulse is prevented by the diode 942 or 944 from reacting upon the circuit of the counter ahead of the one to which the pulse is added.

*End of count and related circuits*

The output pulses from the trigger circuit at 922 are also fed through a line 970 and capacitor C972 to the cathode and anode, respectively, of a pair of diodes 974 and 976. A voltage divider comprised of resistors R978 and R980 in series is connected from the 300 volt line 900 to ground and the common point is connected to the cathode of diode 976 which is also connected to ground through capacitor C982. The cathode of tube 976 is grounded through a series connection consisting of a resistor R984, a normally open set of relay contacts 986a and another normally open set of relay contacts indicated at 988a. The anode of diode 974 is connected to the cathode of diode 976 through a resistor R990 and capacitor C992 in parallel and to the grid of a triode 994.

The diodes 974 and 976 act to demodulate the counting pulses in the line 970. They therefore act like the demodulating tubes 824 and 826 in the circuit of Fig. 14. The triode 994 and a second triode 996 comprise a binary flipflop circuit which unlike some of the flipflop circuits previously used is not for the purpose of dividing an input signal by two, but is for providing a positive potential to the line 780 previously mentioned as conveying the reset signal to the circuit of Fig. 14. As will appear presently, this positive going signal passes into the line 780 and to the circuit of Fig. 14 whenever the counting stops. Simultaneously, the binary circuit also supplies a negative signal, for a purpose to be described presently from the plate of the first triode 994.

The cathodes of the triodes 994 and 996 are connected together and to ground through a resistor R998. The plate of triode 994 is connected through a resistor R1000 and capacitor C1002 in parallel to the grid of the second triode 996 and to ground through a resistor R1004. The plate of the first triode 994 is also connected through a resistor 1006 and relay coil 988 in series to the 300 volt line at 900. This relay coil closes contacts 988a previously mentioned when energized at the end of a count when the triode 994 becomes conducting. The plate of the second triode 996 is connected to the line 780 previously mentioned.

From consideration of this circuit it will be appreciated that so long as a count is going, a D.C. potential will be supplied by the rectifying diodes 974 and 976 which will cut off current through the first triode 994. As soon as the count stops, this tube becomes conducting and therefore energizes the relay coil 988 at the end of a count. Simultaneously, the second triode 996 will be cut off, with the result that the second relay coil 986 is deenergized and the potential of the line 780 rises thereby sending a positive pulse to the circuit of Fig. 14.

When the count for the next frame starts, the first triode 994 will be cut off thereby deenergizing the relay coil 988 and bringing about conduction through the second triode 996. The result of this is that relay coil 986 is energized at the start of a count and remains energized for the duration of the count, and that during this period, that is, the duration of the count, the polarity in the line 780 drops to a low value.

Under conditions where the count is low, relay 988 might not be deenergized long enough to permit its contacts to be actuated to the at rest position. Contacts 986a are therefore provided and are operated by coil 986, this combination forming a fast acting relay. Whenever no count is proceeding, contacts 988b are closed by the current through tube 994 and relay coil 988, and contacts 986a are open, since tube 996 is turned off. As soon as a count starts, coil 986 is energized and closes fast acting contacts 986a which establish a low resistance path to ground for the cathode of diode 976 providing contacts 988a have not had time to open. This cathode potential therefore is reduced sufficiently to hold off triode 994 until contacts 988a have time to open even though the count may terminate in less time. As soon as contacts 988a have been opened, diode 976 resumes normal operation and relay 988—988a will reclose or not depending upon whether or not the count has terminated meanwhile. Whenever the count terminates, fast acting contacts 986a will be opened before contacts 988a have time to reclose and the low resistance path to ground for the cathode of tube 976 therefore remains open.

*Counter reset circuit*

To the right of the circuit just described are a pair of triodes indicated at 1010 and 1012 which are included in a circuit for resetting the counters 926 to 932 at an appropriate time. The minus 150 volt line 904 is connected to a lead 1016 through a group of contacts which will be described presently, but for the moment will simply be indicated generally by the numeral 1014. This lead is in turn connected to one end of a voltage divider comprised of resistors R1018 and R1020 in series, the other end of which is connected to the plus 300 volt line 900. The common point between these resistors is connected to the 300 volt line 900 by a capacitor C1022 and to the grid of triode 1010 through a resistor R1024.

During most of the cycle of operation the arrangement of the contacts 1014 will be such that a connection to the minus 150 volt line will be established thereby maintaining the grid of tube 1010 at a low enough potential to cut off this triode. At an appropriate time, the circuits through the contacts 1014 will be opened, thereby causing the grid potential of tube 1010 to rise due to discharge of the capacitor C1022, thereby establishing a conducting condition through triode 1010.

The cathodes of triodes 1010 and 1012 are connected together and to ground through a common resistor R1026. The plate of the first triode 1010 is connected to the 300 volt line 900 through a resistor R1028 and to the grid of the second triode 1012 through a resistor R1030 and capacitor C1032 in parallel. This grid is also connected to ground through resistor R1034.

The plate of the first triode 1010 is connected through a capacitor C1036 to a negative reset line 1038 while the plate of the second triode 1012 is connected to a positive reset line 1040 through a capacitor C1042.

This circuit functions such that when the circuit through the contacts 1014 is opened, tube 1010 conducts and cuts off tube 1012. This simultaneously causes a negative pulse to be sent into the negative reset line 1038 and a positive pulse to be sent into the positive reset line 1040. Between pulses, the potentials of the reset lines are held at ground by diodes 1042 and 1046. They are arranged with the anode of diode 1046 connected to the negative reset line and the cathode thereof being grounded while the diode 1042 is connected between the positive reset line and ground in the reverse direction. The at rest potential of the positive pulse reset line 1040 is determined by a resistor R1048 connected between this line and the minus 150 volt line 904 and another resistor R1050 which is connected in parallel with resistor R1048 when a single pole single throw switch 1052 in series with resistor R1050 is closed. Switch 1052 is normally open and is manually actuated as will appear presently.

The plus reset line 1040 is connected to the reset terminals of the first, third and fourth counters 926, 930 and 932 and resets all of these counters to zero whenever a positive pulse is sent over the line. The reset terminal to the second counter 928 is connected to a movable contact 1054 of a single pole, double throw switch 1056 which can be positioned to connect this counter to a terminal 1058 connected to the positive reset line 1040, in which event this counter is also reset to zero, or the switch can be moved to its other contact 1060 so as to connect the counter 928 to the negative reset line 1038 in which event counter 928 will be reset to nine.

The switches indicated at 924, 940, 950, 1052 and 1056 are ganged together and are positioned such that when information is being taken from a tape recorded at a rate of one frame per second, switch 940 is closed, switch 924 connects the input signal to lead 938, switch 950 connects terminals 952 and 948, switch 1052 is open and switch 1056 connects terminals 1054 and 1060 so that counter 928 is reset to nine. Conversely, when operating at a speed of ten frames per second, switch 924 sends the input signal to line 936, switch 940 is open, switch 950 connects terminals 952 and 966, switch 1052 is closed in a manner to be discussed presently and the reset line for the second counter 928 is connected through switch 1056 to terminal 1058 and thence to the positive reset line so that this counter is reset to zero.

*Frame coder matrix*

The count storage relay matrix is quite similar in its circuits to that shown in Fig. 14. It includes a group of eleven triodes indicated at 1066, 1068, 1070, 1072, 1074, 1076, 1078, 1080, 1082, 1084, and 1086. The circuits for these are substantially identical and therefore only one needs to be described in detail.

Referring more particularly to triode 1066 which has connections typical of the others in the group, its cathode is connected along with the others to a common cathode line 1088. The plate is connected through a normally closed set of contacts 1090a of a single pole, double throw relay and through the coil 1090 of this relay to a common relay line 1092. The normally open contracts in this set are indicated at 1090b and are connected so that when relay coil 1090 is energized, its lower end is connected to ground through a resistor R1094 instead of to the plate of tube 1066. Upon energization of coil 1090, contacts 1090b make before contacts 1090a break. The contacts 1090b and resistor R1094 therefore act as a holding circuit for relay coil 1090 as in the similar circuit of Fig. 14.

The plate of triode 1066 is also connected through a diode 1096 and a set of contacts 1098a to a line indicated at 1100.

Each of the triodes in this group has the same circuit with the several relay coils, beginning with the second triode 1068, being indicated in order by the numerals 1102, 1104, 1106, 1108, 1110, 1112, 1114, 1116, 1118 and 1120. The contacts of these relays are designated by the same number with the addition *a* or *b*, as in the first instance. Switch contacts which are the counterparts of contacts 1098a are indicated, for a reason to appear presently, as 1098b, 1098c, and 1098d for triodes 1068, 1070 and 1072, respectively. For triodes 1074, 1076, 1078 and 1080 they are respectively 1122a, 1122b, 1122c and 1122d. For triodes 1082, 1084 and 1086 they are respectively 1124a, 1124b and 1124c.

These switches are ganged together in groups, such that the four having the number 1098 with a following letter are operated by one knob given the number 1098. By movement of this knob to different positions, these contacts are opened or closed in different patterns so that the relays 1090, 1102, 1104, and 1106 can be actuated manually in the same manner from the common line 1100, when this line is grounded as will be explained, as if a certain count pattern was impressed upon the grids of the triodes 1066, 1068, 1070 and 1072. The relays in this units column group can therefore be preset to any number from 0 to 9 by properly positioning the switch knob 1098.

Switches 1122a, 1122b, 1122c and 1122d operated from knob 1122 serve the same function with respect to their relays so that these relays can be preset from 0 to 9 in the tens column. Similarly, a knob 1124 sets the pattern of contacts 1124a, 1124b and 1124c to any indication of 0 to 6 in the hundreds column. The diode at 1096 or the counterparts thereof at 1126, 1128, 1130, 1132, 1134, 1136, 1138, 1140, 1142 and 1144 are for the purpose of preventing current flow through any of the triodes from affecting any of the relays other than its own by way of the common connections through the line 1100.

As with the circuit of Fig. 14, the grids of the group of triodes are connected to the binary output number terminals of the counters 926, 928, 930 and 932 so that the triodes can conduct or not depending upon the count stored in these counting units at the time the power circuit is connected between the common relay line 1092 and the common cathode line 1088.

The binary leads connecting the counters to the triode grids are indicated in order at 1146, 1148, 1150 and 1152 between the second counter 928 and the units triodes 1066, 1068, 1070 and 1072; leads 1154, 1156, 1158 and 1160 between the third counter 930 and the tens triodes 1074, 1076, 1078 and 1080 and leads 1162, 1164 and 1166 between the fourth counter 932 and the hundreds triodes 1082, 1084 and 1086. Each of these leads is connected to its grid by one of the resistors indicated at R1168 and to ground through a capacitor C1170. The grid is also connected to ground through another capacitor C1172 and the lead 1146 or its counterpart is connected to the minus 150 volt line 904 through a resistor R1174.

A three position manually actuated knob 1180 operates two switches 1180a and 1180b. 1180a is normally open and is connected between the relay setting line 1100 and ground. It is closed when the knob 1180 is moved to "store" position. Switch 1180b is normally closed and is opened when the knob is moved to "erase" position. This switch is connected between the 150 volt line 902 and the relay energizing line 1092. In the intermediate or "off" position switch 1180a is open and 1180b closed. Thus, a number can be manually preselected by operation of the knobs 1098, 1122 and 1124, the old number erased from the matrix by movement of the knob 1180 to erase position, and the new number stored by moving knob 1180 to store position. Knob 1180 is then returned to the "off" position, leaving the preselected number stored in the matrix and the system conditioned for automatic operation.

Comparator

Directly above the amplifier and relay circuit just described are a group of eleven double triodes with substantially identical circuits. For convenience they are numbered from the right as follows: 1184, 1186, 1188, 1190, 1192, 1194, 1196, 1198, 1200, 1202 and 1204. The left hand set of triode elements in each tube has been given the letter "a" and the right hand set the designation "b." In each case (for instance tube 1200) the a and b cathodes are connected together and to the minus 150 volt line 904 through a common resistor R1206. The 1200b plate is connected to the 300 volt line 900 while the a plate is connected to this line through a resistor R1208. The 1200a grid is connected to the binary output line 1150 by an attenuator comprised of a resistor R1210 between the binary line and the grid and another resistor R1212 from the grid to ground. There is also a connection from this grid to the minus 150 volt line 904 through a series connection of a resistor R1214 and a set of normally open relay contacts 1104c operated by the relay coil 1104 served by the same binary line.

The grid of 1200b triode is connected to the adjustable contact of a potentiometer R1216, one end of which is connected through resistor R1218 to the minus line 904 while the other end is connected through resistor R1220 to the anode of a diode 1222. This anode is connected through another resistor R1224 to the cathode of a second diode 1226, this cathode also being connected to the 300 volt line 900 through a resistor R1228.

The anode of diode 1226 and the cathode of diode 1222 are connected together and to the plate of triode 1198a, which it will be appreciated is in the next a triode in the double triode to the right of triode 1200. Thus, the output of the plates of the a triodes have an influence through the two diodes upon the next successive b grids to the left.

This circuit arrangement operates as follows: Each of the binary leads has a connection through a resistor and switch, for instance the switch 1104c to the minus 150 volt line 904. Thus, when this switch is closed, the potential at the a grid connected thereto, for instance grid 1200a, tends to be low. On the other hand, if the lead is energized from the binary counter, the potential of grid 1200a tends to be high. Thus, three conditions can arise: A high a grid potential prevails when the lead is energized from the binary counter and switch 1140c is open. The a grid is at a low potential when the lead is not energized from the binary counter and switch 1140c is closed, while there is an intermediate grid potential which prevails when the lead is energized from the binary counter and switch 1140c is closed, or when switch 1140c is open and the binary lead is deenergized. Under these three conditions the potentials in the plate circuit of the a triode will be about as follows respectively: less than say 100 v., over 250 v., and about 175 v.

The b grid, for instance 1200b, is under the influence of the double diodes at 1222 and 1226 which in turn are controlled by the a grid of the next double triode to the right, for instance 1198a. The circuit values are such that when the potential at the 1222 cathode and 1226 anode is between about 150 v. and 195 v. neither conducts and the potential on the grid of 1200b is determined by the voltage divider R1218, R1216, R1220, R1224, and R1228 between the minus 150 v. line 904 and the plus 300 v. line 900. If the control voltage of the diodes 1222—1226 is over about 195 v., then the top diode 1226 conducts and raises the potential at the b grid, whereas if the control voltage drops below about 150 v. the lower diode 1222 conducts and lowers the b grid potential.

If either of the diodes 1222—1226 conducts, the signal impressed upon the 1200b grid by this action causes the potential of the b cathode and the a cathode connected thereto to swing so far that the 1200a triode will conduct or not depending entirely upon this cathode potential. Thus, the a grid in any of the triodes is effective as a control only if the binary line connected to the a grid of the next a triode to the right is energized by its binary counter, and also switch 1104c, or its equivalent, connected to the same lead is closed, or if this switch is open and its binary lead is deenergized.

The circuit just described would produce some A.C. gain from stage to stage which eventually could produce an oscillating condition. To prevent this, capacitors C1230 are connected across the plate resistors, R1208 for example.

Considering the above circuit as a whole, whenever a certain binary lead, say 1150 is energized by its counter, this will coincide with its relay coil 1104 being energized if the number in the relay matrix is the same as that in the counters. If these numbers match, relay contacts 1104c will be closed, thereby bringing about the intermediate potential on the grid of triode 1200a. The result is that neither diode in its output circuit conducts and therefore the next a triode to the left is able to make a free choice, depending upon the potential at its grid. Similarly, if the binary lead 1150 is not energized by its counter, and the counter and matrix numbers match, relay coil 1104 will be deenergized and contacts 1104c will be open, thereby also applying the intermediate potential to the grid of 1200a with the same effect upon the next triode to the left in the series.

It will be appreciated that the above two situations represent normal functioning and that any condition where the binary lead say 1150 is energized, but its relay coil 1104 is not energized, due to the counters having a higher count than the relays, or the reverse where relay coil 1104 is energized, but binary lead 1150 is not energized (a low counter indication) is abnormal.

This circuit, therefore, beginning at the extreme right with binary lead 1166 compares the binary lead indication with the condition of its relay 1120 which controls the readout mechanism to see if the relay is in the proper position. If this relay is in the right position, the circuit checks the next binary lead to the left to see if its relay is properly positioned and so on, stage by stage until all binary leads have been checked. If all relays are properly positioned, the potential on the last a plate, that is 1204a will be at the intermediate value and neither of the diodes, indicated at 1236 and 1238 in this plate circuit will conduct. The result is that the circuit just described has no influence upon the grid of an output triode 1240 connected to the output of these diodes in the same manner that 1200b grid is connected to be controlled by diodes 1222 and 1226 for instance.

Suppose, however, that as the positions of the relays, beginning at the right, are being checked by the above circuit, it is found that one of the relays is not properly positioned. Under these conditions there will be a low control voltage passed to the diodes controlling the next triode stage if the binary lead is energized but the relay is not closed, or a high control voltage if the relay is energized and the binary lead is not energized. This high or low voltage then acts to overrule in succession all the following stages. The result is that a high or low voltage, as soon as it is encountered beginning from the right or hundreds end, is passed along and impressed upon the grid of triode 1240.

High, low and even trinary circuit

The triode 1240 and a companion triode 1242 are connected as follows to form a phase inverter circuit. The cathodes of both triodes are connected together and to the minus 150 v. line 904 through a common resistor R1244. The grid of triode 1240 is connected to the center of the potentiometer R1246 which forms a portion of the voltage divider which is under the influence of diodes 1236 and 1238 as previously mentioned. The 1240 plate is connected to the 300 v. line 900 through a resistor R1248 while 1242 plate is connected to this 300 v. line through a similar resistor R1250. The 1242 grid is connected to the tap of a potentiometer R1252, one end of which is grounded while the other end is connected through resistor R1254 to the minus 150 v. line 904.

This phase inverter circuit functions in such fashion that when the grid 1240 is at an intermediate potential (neither diode 1236—1238 conducting) the voltages in the plate circuits of both 1240 and 1242 will be substantially equal. If the voltage at 1240 grid is high, its plate potential will be low and the potential of 1242 plate circuit will be high. Conversely, if grid of 1240 is low, its plate circuit will be at a high potential while the voltage at 1242 plate will be low. Connections to these two plates, 1240 and 1242 are used to control a trinary circuit shown generally at 1260.

This trinary circuit is comprised of three triodes, 1262, 1264, and 1266. All three cathodes are connected together and to ground through a common resistor R1268. The grid 1262 is connected to the 1242 plate, while the grid of 1264 is connected to the plate of triode 1240. The grid of the third triode 1266 in the trinary circuit is connected to ground through a resistor R1270, to the plate of the second triode 1264 through resistor R1272 and to the plate of the first triode 1262 through resistor R1274.

The plate of the first triode 1262 is also connected through a resistor R1276 and relay coil 1278 in series to the 300 v. line 900. The plate of the second triode 1264 is connected to the 300 v. line through a resistor R1280 and relay coil 1282 in series. A tap between relay coil 1282 and resistor R1280 leads through another resistor R1284 to a line 1286 which has further connections to be discussed presently. The plate of the third triode 1266 is connected through a set of normally closed relay contacts 1290a and thence through two relay coils 1288 and 1290 in series to the 300 v. line 900.

The two relay coils 1288 and 1290 act as one relay. Two relays are used simply because the number of contacts to be actuated is comparatively large and this is more easily accomplished by the use of two relays than by one. When these relay coils are energized, the contacts 1290a are broken and a normally open set 1290b is closed, thereby connecting the lower end of relay coil 1288 to ground through a resistor R1292 and a set of normally closed contacts 1294a. Contacts 1290b close before contacts 1290a are opened and the circuit through contacts 1290b therefore acts to hold relay coils 1288 and 1290 energized so long as relay contacts 1294a remain closed. The actuator for contacts 1294a will be discussed presently.

The plate of the third triode 1266 is also connected through a set of normally open relay contacts 1290c and a resistor R1296 to the 300 v. line 900. Contacts 1290c are closed when coil 1290 is energized.

The trinary circuit just described functions as follows: If the potential at grid 1240 is at an intermediate level, indicating that the count stored in the counters matches that stored in the relay matrix, since there is no conduction through either of the diodes 1236 and 1238, the potential at the grids of triodes 1262 and 1264 will be the same. At this intermediate level both of these tubes will conduct. The potentials at their plates, which is imposed upon the grids of the first and second triodes 1262 and 1264 is low enough to cut off these tubes with the result that the third triode 1266 conducts, thereby energizing relay coils 1288 and 1290 and shifting them to the holding circuit. Also contacts 1290c are closed so that tube 1266 has about the same resistance in the plate circuit as before, since R1296 has about the same value as coils 1288 and 1290 in series.

If the first triode a grid, beginning from the right, to be out of balance is low, this low indication is passed along to the last a triode to the left and thus puts a high voltage on the diodes 1236 and 1238. Diode 1238 therefore conducts and causes the potential of grid 1240 to rise sufficiently to cause 1240 to conduct more and to cut off 1242. This action cuts off the second triode 1264 and causes the first triode 1262 to conduct. The drop in potential in the plate circuit of 1262 acts to cut off the third triode 1266 and the conduction through 1262 energizes relay coil 1278 in the plate circuit thereof.

If a high comparator a grid voltage places a low potential on the diodes 1236 and 1238, diode 1236 conducts. This cuts off triode 1240 and turns on triode 1242. The first triode 1262 in the trinary circuit is therefore cut off and the second triode 1264 conducts. The decrease in potential in the plate circuit of the second triode 1264 therefore acts to lower the grid of the third tube 1266 so that it is cut off. Simultaneously relay coil 1282 is energized by conduction through triode 1264.

The circuit is, therefore, such that an even indication from the comparator circuit energizes relay coils 1288 and 1290 and deenergizes relay coils 1282 and 1278. A lower indication in the counters than in the relays energizes relay coil 1278 and deenergizes coils 1282, 1288 and 1290, while a higher number in the counters than in the relays energizes relay coil 1282 and deenergizes coils 1278, 1288 and 1290. For convenience, therefore, relay 1288—1290 will be referred to as the "even" relay, relay 1282 as the "high" relay, and relay 1278 as the "low" relay, "high" and "low" referring to the number in the counters 926, 928, 930 and 932 as compared with the number in the read out comparator relays.

As will be explained presently, energization of the high relay 1282 causes the motor transport to rewind a portion of the tape and to close a holding circuit which will keep relay 1282 energized for a period of two to five seconds even though reverse operation of the tape will immediately cause the low relay circuit 1262 to operate because of the resetting of the counter units. Relay coil 1282 is of relatively low resistance so that current can be pulled through the coil by a holding circuit connected to the line 1286 without disturbing the potential at the plate of the second triode 1264.

*Tape transport motor circuit*

The motor transport circuit indicated generally by the numeral 1300 exercises control over the motor for the tape transport mechanism. The transport motor is not shown since it may be essentially conventional, it being assumed for the purpose of this explanation that when a relay coil indicated at 1302 is energized it will operate appropriate contacts to energize the motor to advance the tape at slow speed and that when a relay coil indicated at 1052 is energized, the motor will operate the transport to advance the tape at high speed. If a third relay coil 1306 is energized, the motor will operate the transport in the reverse direction to rewind the tape.

The line 1286, previously mentioned as being connected to the lower end of the high relay coil 1282, is connected through two normally open contact sets 1052b and 1302a in parallel to a common lead 1308. These contacts are closed upon the energization of relay coils 1052 and 1302 respectively. The lead 1308 is connected through a normally open contact set 1282b (operated by coil 1282) and thence through a normally closed set of relay contacts 1290f (operated by coil 1290) to ground.

The lead 1286 is also connected through a set of normally closed relay contacts 1306a (operated by relay coil 1306) to one end of this coil 1306. The other end of the coil 1306 is connected to the 150 v. line 902. This line is also connected through a set of normally closed relay contacts 1306d (operated by coil 1306) to one end each of relay coils 1052 and 1302. The other end of coil 1052 is connected to one of the fixed contacts 1310 of a mutually actuated single pole double throw switch 1312 while the other fixed contact 1314 of this switch is similarly connected to coil 1302. The movable contact 1316 of switch 1312 is connected to ground through two sets of normally open relay contacts 1278a and 1290g in parallel operated by the low relay coil 1278 and the even relay 1290 respectively.

The manually actuated switch 1312 is positioned with contacts 1316 and 1314 together when operating at slow speed, or with contacts 1316 and 1310 together for operation at the high speed.

The end of relay coil 1306 connected to the line 1286 by the normally closed contacts 1306a is also connected to ground through a set of normally open relay contacts 1306b and a timing circuit comprised of resistor R1320 and capacitor C1322 in parallel. Thus, whenever relay coil 1306 is energized through lead 1286 and opens its energizing contacts 1306a, it simultaneously closes a timed holding circuit to ground through contacts 1306b. Contacts 1306a and b are a make before break set. The relay coil 1306 therefore remains energized for a short period which appropriately can be from say two to five seconds.

Briefly the motor control circuit operates as follows. Ordinarily the transport will be operating in the forward direction at either the fast or slow speed depending upon the position of switch 1312. This is accomplished by energization of the even relay coil 1290 which closes contacts 1290g. This establishes a circuit from the 150 v. line 902, through contacts 1306b and coil 1302 or 1052—depending upon the position of switch 1312—through switch 1312 and through contacts 1290g to ground.

If the counters 926 to 932 give a high reading at any time as compared with the read-out control relays, coil 1282 will be energized. This closes contacts 1282b and contacts 1290f, since coil 1290 is deenergized, and energizes relay coil 1306 from the 150 volt line by way of contacts 1306a, contacts 1052b or 1302a, and contacts 1282b and 1290f to ground. This closes holding contacts 1306b before contacts 1052b or 1302a open, thereby energizing relay coil 1306 through the timed holding circuit for a period of two to five seconds. Meanwhile, energization of coil 1306 opens contacts 1306d and cuts off coils 1302 and 1052. Both coils 1302 and 1052 controlling forward movement of the transport are therefore deenergized. This causes both sets of contacts 1052b and 1302a to be open.

For the duration of the time the relay coil 1306 is energized (two to five seconds) the tape transport operates in the reverse direction. At the end of this interval, coil 1306 is deenergized. Contacts 1306d therefore reclose and energize one of the forward motion coils 1302 or 1052 through contacts 1278a, since a low condition now exists due to the resetting of the counters to zero as will be explained presently. Energization through low contacts 1278a causes the transport to operate in the forward direction until an even condition prevails, whereupon contacts 1290g close and contacts 1278a open. Thereafter, coil 1302 or 1052 continues energized by way of contacts 1290g. If after the counters have counted for one frame a high condition is again apparent, the cycle repeats so as to reverse the transport for another interval of two to five seconds, and so on.

*End of print and coordinating circuits*

Whenever information has been printed or otherwise has been taken care of by the readout device, a signal is sent from the read-out mechanism to the circuit indicated generally by the numeral 1324 by way of line 1326. This line is connected through a resistor R1328 and capacitor C1329 in parallel and through normally closed contacts 1294b and thence through relay coil 1294 to the 150 v. line 902. A normally open set of contacts 1294c, also operated by coil 1294 establishes a holding circuit from the lower end of coil 1294 to ground through a lead 1330 and a resistor R1332 after relay 1294 has once been energized by the signal from the readout device. The normally closed contact 1294b connected to resistor R1328 is also connected to the 150 v. line 902 by way of normally open relay contacts 1294d and a resistor R1334 so that when relay 1294 is shifted to its holding circuit, the capacitor at C1329 will retain its charge.

The lead 1326 from the printer or other readout device is also connected through a normally open manually actuated switch 1336 and thence through a set of normally closed relay contacts 1338a to ground. Switch 1336 is placed in the open position whenever a readout device is being operated and is closed only for checking the system herein described.

The lead 1330 from relay contacts 1294c is connected through a resistor R1340 to one end of a group of twelve sets of normally closed relay contacts in series. These contacts are indicated as a group by the numeral 1342. Each contact set in this group is actuated by one of the relay coils 718 and 752 to 772 in the readout circuit of Fig. 14. Thus, if any one of these relays is actuated, the circuit through contacts 1342 is broken. The opposite end of the contact set 1342 is connected to the 150 v. line 902 through a normally closed manually actuated switch 1344 and through normally closed relay contacts 1290e in parallel therewith. Switch 1344 is closed whenever a readout device is being operated and is opened only for checking the system. It therefore may conveniently be ganged to operate with switch 1336 previously mentioned. The uppermost contact in the set 1342 is also connected to ground through a capacitor C1346 and resistor R1348 in series.

When relay coil 1290 is energized so as to open contacts 1290e, a set of normally open contacts 1290d is closed and this connects the topmost contact in the group 1342 with one end of a relay coil 1338. The other end of this coil is connected through a resistor R1350 and thence to ground through normally open relay contacts 988b and 1338b in parallel.

Each of the relay coils 1090 and 1102 to 1120 has a set of normally closed contacts and all of these contacts are connected in series so that if any one of these coils is energized the circuit through these contacts is broken. In the diagram these contacts are indicated as a group at 1090x. They are connected at one end to the 150 v. line 902 and at the other end to ground through a pair of resistors R1352 and R1354 in series. The common point between resistors R1352 and R1354 is connected through a set of normally open relay contacts 1356a to the lower end of a relay coil 1356, the upper end of which is connected to the 150 v. line 902.

Relay coil 1356 also actuates a normally closed set of contacts 1356b which connects the lower end of this coil 1356 with the previously mentioned common cathode lead 1088 for the amplifier tubes by way of a resistor R1358 and capacitor C1360 in parallel. This common cathode lead 1088 is also connected to ground through normally open contacts 1290f and normally closed contacts 1362a in series. The junction between normally closed relay contacts 1356b and resistor R1358 is connected to the 150 v. line through a set of normally open relay contacts 1356c and a resistor R1364 in series so that when relay coil 1356 is energized and contacts 1356b are broken, there will be a connection established to the 150 v. line 902 to hold the charge on the capacitor C1360.

Earlier in this description it was mentioned that there is a set of normally closed relay contacts in series with manual switch contacts 1180b between the 150 v. line 902 and relay line 1092. These contacts are indicated at 1356d and are operated by relay coil 1356.

One end of a relay coil 1362 is connected to the 150 v. line 902 and has its other end connected to the plate of a triode 1366. The cathode of this tube is grounded and the grid thereof is connected through a resistor R1368 and capacitor C1370 in parallel to the 300 v. line 900. The grid is also connected through a resistor R1372 to a lead 1374 which is connected in turn through a set of normally closed relay contacts 1288a to the minus 150 v. line 904. The lead 1374 is also connected through normally open relay contacts 1356e to a line 1376. This line is connected to the minus 150 v. line 904 through normally open relay contacts 1288b and by way of normally closed relay contacts 1362b to the lead 1016 mentioned earlier in this description. Lead 1016 is connected in turn through normally closed relay contacts 988a to the minus 150 v. line 904.

In each instance, as was previously indicated, where relay contacts are indicated by a numeral followed by a letter, these contacts are operated by a relay coil having the same numeral.

*Frame coder, comparator operation*

The above described portion of the circuit operates as follows. Assuming that some number is stored in the bank of relays 1090 and 1102 to 1120, it will be appreciated that three conditions can exist. The number to be counted by the counters 926 to 932 will be lower, the same, or higher than that in the relay matrix.

If the number in the counters never reaches that stored in the relays, the low relay coil 1278 remains energized as previously explained. Under these conditions, when the "End of count" circuit energizes relay coil 988, contacts 988a are opened. This allows the grid of tube 1010 to go positive and the reset signals thus produced reset the counters to the starting condition.

If the number counted by the counters would be higher than that stored in the reference relays, the high relay 1282 will be energized as soon as the count in the counters passes that in the relays as has been explained. Energization of relay 1282 closes contacts 1282b in the motor transport circuit and reverses the motor for two to five seconds. Also the end of count circuit, comprised of the tubes 994 and 996, resets the counters to their starting level.

Under the third condition, where the counters complete the count and this number matches that in the reference relays, the following occurs. The even relays 1290 and 1288 are energized. With these relays held by their holding circuits, contacts 1290e are closed and this grounds line 1088 which adds a pulse through line 964 to the decimal counting units as previously mentioned so as to cause the counters to advance one count. The same action grounds the cathodes of the tubes connected to the common line 1088. Erase coil 1356 is also energized and shifted to its holding circuit. This opens contacts 1356d which deenergizes all of the relays in the number matrix. The relay matrix, therefore, has the old number erased therefrom.

After all of the relays have been deenergized, all of contacts in the bank 1090x will be closed. This deenergizes the erase coil 1356 and closes contacts 1356d which conditions the relay matrix for the storage of a new number. The new number is therefore stored and this is the number counted from the magnetic tape plus one added through the line 964. It is therefore one higher than the last number so stored and is the number of the next frame to come.

Meanwhile the grid of tube 1010 in the resetting circuit has been connected to the minus 150 v. line 904 through contacts 988b. At the end of count these contacts open, but contacts 1288b are closed by the even relay to establish a parallel path, and during the erase operation contacts 1356e are closed so as to maintain the minus 150 v. connection for the grid of triode 1366. Both tubes 1010 and 1366 therefore continue to be held off until the end of the erase operation.

At the end of the erase period when relay 1356 is deenergized, contacts 1356e open and allow the potential of the grid of triode 1366 to rise. This energizes relay 1362 and opens contacts 1362a which cuts off the common cathode line 1088. This action, as previously explained, cuts off the triodes 1066 to 1086 and freezes the number storage relays 1090 and 1102 to 1120 with the new number stored therein.

Energization of relay 1362 also opens contacts 1362b which disconnects line 1016 from the minus 150 v. line, raises the potential of this line and of the grid of triode 1010 connected thereto. Tube 1010 therefore conducts and initiates the resetting operation by sending resetting pulses into the lines 1040 and 1038 as previously described.

Thus, the new number is stored in the relay matrix, the counters have been reset to the starting point, and the counters are free to count without influencing the relay matrix.

During this period another operation takes place which proceeds as follows. When the even relay coil 1290 is energized it closes contacts 1290d and at the same time the end of count relay 988 closes contacts 988b. This establishes a circuit from the 150 v. line 902 to ground through relay coil 1338. This relay coil 1338 closes a set of contacts which signal the read out mechanism (a card punch for instance) that it is time to print. The read out mechanism therefore prints the information stored in the relay matrix of Fig. 14 (the test information) and the number stored in the relay matrix of Fig. 15 (the frame number).

This information in both instances is conveyed to the read out mechanism by appropriate contacts operated by each relay in each matrix. The particular contact arrangement used depends upon what the input circuit of the read out device comprises. Probably the simplest arrangement is to use one contact set on each relay and to connect these sets directly to the appropriate terminals of a quasibinary input system in the read out device. In any event, the selection of an appropriate contact arrangement for control of any read out device is well within the capability of anyone skilled in this art.

When a command signal is received from the read out device by way of line 1326 (which is an indication that the printing operation has been concluded and that the printer or other read out device is ready to accept further information) the end of print relay 1294 is energized and shifts to its holding circuit. This holding circuit prevents deenergization of relay 1294 until all of the relay contacts in the group 1342 have closed so as to establish a circuit therethrough. Since these contacts are normally closed, relay 1294 is energized until all of the relays 1090 and 1102 to 1120 have released. Also, energization of relay coil 1294 opens contacts 1294a which causes the even relay coils 1290 and 1288 to be deenergized. This opens contacts 1290d which deenergizes relay coil 1338 and removes the print signal from the read out device so as to ready this circuit for the next command to print signal for the next frame to come.

Energization of the end of print relay 1294 also opens the normally closed contacts 860 in Fig. 14 and thereby causes deenergization of all of the relays in the information coder matrix of that figure. The number stored in that matrix is therefore erased.

The above action reestablishes the circuit in its original condition with the new frame number stored in the relay matrix of Fig. 15 and with the number erased from the relay matrix of Fig. 14 and with new numbers being counted in the decimal counting units of Figs. 14 and 15.

It should be noted that the read out device, a printer for instance, is not called upon to print a set of numbers from any frame until the printer has signaled its ability to print through the line 1326. The read out translator just described therefore cannot get ahead of the read out device which it feeds. Furthermore, no frame can be read out of the translator unless the comparator mechanism finds that the frame is the one which logically follows the last one read out. The output to the printer or other read out device therefore is in proper frame sequence. No frames are missed and no frames are printed twice.

In fact if at any time the transport is stopped and arbitrarily shifted to a new tape position and restarted, the transport will run forward or backward as necessary and find the place where it left off. It then will con inue reading out the information without breaking the sequence.

By properly positioning the knobs 1098, 1122 and 1124 any desired frame member can be set into the relay matrix 1090 and 1102 to 1120 in the manner previously described. The tape can then be set at any position and the transport started. As described above, the transport then will run forwardly or backwardly as necessary until it finds the frame having this number. It then will start reading out the information in sequence beginning with this preselected frame.

If it is wished to test the translator without a connection to a read out device, contacts 1344 are opened and contacts 1336 are closed. Now with the even relays 1288—1290 deenergized, capacitor C1346 is charged through contacts 1290e. When the even relays are energized, contacts 1290e open and 1290d close. The capacitor 1346 therefore discharges through relay coil 1338 and holds this coil energized for about one second. When the charge on the capacitor runs down and relay 1338 becomes deenergized, it closes contacts 1338a and grounds the lead 1326 which simulates the end of print signal to the relay 1294. From then on the operation is the same as if the usual end of print signal had been received from a read out mechanism. The mechanism therefore continues to advance the tape and to go through its various cycles on the assumption that the information being read out is being accepted by some read out device.

In the specific embodiment described above, the read out translator can be operated in the forward direction at two different tape speeds. More speeds could of course be provided, but two give a good range for practical operation. These speeds can have any appropriate ratio and in the embodiment illustrated the high speed is ten times the low speed rate.

In general, if the information is originally sampled at a rate of one frame per second at a certain tape speed, this same speed can be used in the translator. Under these conditions the translator will feed information to the read out device at the rate of one frame per second. If on the other hand, the information is originally accepted at the rate of ten frames per second and recorded at the same tape speed as in the first example, then by operating the translator tape transport at one tenth this speed, the information is still read out at the rate of one frame per second.

Usually the rate at which the read out device will accept information is the controlling factor in the information processing and thus by having a choice of tape speeds in the translator and/or in the recorder, information can be sampled at various rates and still can be read out at a rate the read out device will accept.

It is of course possible to have single fixed tape speeds in the recorder and translator and still accept information at different rates by re-recording or dubbing. For instance, assume that the recorder and translator have the same tape speed and that information was recorded at a rate of ten frames per second. The tape from the recorder can then be dubbed on to a second tape running at ten times its speed. When this second tape is put into the translator, the information will be taken off and fed to the read out device at the rate of one frame per second. Since the information is in digital form, no fidelity will be lost in the dubbing process.

It should be noted that one of the big advantages of this system is its extreme fidelity as compared with usual systems wherein an error of at least 10% can be expected. This is accomplished in part by the fact that the analogue voltages are immediately converted to digital values. With minor exceptions, any small error that may be present at this point in the processing cannot thereafter be multiplied or otherwise influenced by further handling. Customary processing systems which repeat, multiply or otherwise handle analogue values several times therefore cannot achieve this same degree of accuracy.

The error introduced by the described embodiment of the invention ordinarily will be no more than 1% of full scale when information is recorded at a rate of ten frames per second. At this speed the converters operate to apply from zero to one thousand pulses, plus the threshold value to the tape for each frame. If the threshold value is neglected (it may be, since it is subsequently subtracted in the translator), the value 600 for instance, if full scale is 1000, at a tape speed of ten frames per second is represented by 600 pulses. The only error that can be introduced by the system would result in either 601 or 599 pulses being recorded and this, in view of the fidelity of the input amplifier, the attenuator and the converters is not likely. If the value is say 600.4 this would be recorded by 600 pulses, but 600.5 could be either 600 or 601.

A hole in the tape could cause the loss of a cycle or so and could cause a low reading, but several cycles would need to be lost before the result would be changed by as much as 1% of full scale. For instance, 600.4 would be recorded as 600 cycles. If five cycles became lost, the translator would receive and read out 595 which is 5.4 parts low, or an error of slightly over ½ of 1% of full scale. It is not likely that errors introduced in the recording plus holes in the tape will combine to introduce an error much greater than this. Accuracy of at least 99% of full scale therefore can be assumed at a sampling rate of ten frames per second.

When the recorder is operated at a speed of one frame per second, the value 600, again assuming 1000 as full scale, will be represented by 6000 recorded pulses and the value 699 by 6990 pulses. Now assume that there is a hole in the tape large enough to cause the improbable loss of as much as say 5 cycles and that there is also a loss of 4 cycles in the converter system, making a total loss of 9 cycles. Under these conditions the translator woudl pick up 5991 pulses for the original value of 600 and 6981 pulses for the value of 699.

In the first stage of the record decimal counters of the translator under these conditions (that is at a frame rate of one per second), the last decimal place is cancelled and the translator therefore would read out 599 for 600 and 698 for 699, an error of one part in the scale of one thousand in both instances, or 1/10 of 1% of full scale. Because of this feature of using up to 10,000 cycles per frame in recording the information and then throwing away the last decimal place in the read out translator, an accuracy of 99.9% of full scale from transducer input voltage to punched cards for instance can be depended upon at a frame rate of one per second.

The read out device to which the system of the present invention feeds information of course need not be a card punch nor any of the other devices specifically mentioned above. Rather, the system of this invention is capable of supplying simultaneous digital information through the medium of electrical circuits to any mechanism capable of using digital information when provided in this form. Most of such devices can accept information in quasibinary form (binary as to each digit), and for this, as was previously explained, it is necessary merely to have one contact on each of the relays of the record matrix and the frame number matrix. True binary, decimal, or other number systems will require different contact arrangements, but their use is well understood and requires no explanation here, it being sufficient to note that any number system for which the read out device may be designed can be matched by the present device without the necessity for additional relays.

In the interest of avoiding confusion, the tape transport control has been shown and described above on such a basis that it will automatically take the information from one trace, after which the tape is rewound and shifted manually to the next trace. This can be accomplished automatically, however, as will be pointed out presently in connection with the description of alternative forms of the invention.

Most of the subcircuits used in the present embodiment of the invention will be familiar to those skilled in this art, but in some instances the circuits used may not be familiar and in a few cases special circuits have been devised by us which are believed to be new. We are, therefore, giving below the values of the constants used by us in those circuits which are believed to be either new or generally unfamiliar.

| | |
|---|---|
| R136 | 39K |
| R142 | 100K |
| R143 | 50K |
| R144 | 5K |
| R148 | 10M |
| C150 mf | .22 |
| R151 | 1M |
| R152 | 27K |
| R154 ohm | 2950 |
| R156 | 10K |
| C162 mf | .001 |
| R166 | 1K |
| R168 | 1M |
| R169 | .68M |
| R176 | 10K |
| R182 | 120K |
| R183 | 5.6K |
| C222 mmf | 50 |
| C223 mf | .001 |
| R230 | 2.2K |
| R232 | 220K |
| C234 mf | .001 |
| R238 | 22K |
| R242 | 15K |
| R244 | 100K |
| R245 | 50K |
| R246 | 150K |
| R248 | 10M |

The similar circuit at 203 which divides the frequency by 6 has the above values excepting that the equivalents of C222, C223, C234 and R248 are respectively 200 mmf., .005 mf., .005 mf. and 8.2M.

In the circuit at 205 which divides by 5 the values are the same as at 203 excepting for the last two which are respectively .05 mf. and 6.8K.

| | |
|---|---|
| R336 | 390K |
| R337 | 18K |
| R338 | 18K |
| C344 mmf | 500 |
| C346 mmf | 500 |
| C348 mmf | 500 |
| R352 | 47K |
| R360 | 56K |
| R362 | 330K |
| R363 | 15K |
| R364 | 6.8K |
| R366 | 10K |
| R368 | 560K |
| R786 | 470K |
| R790 | 2.2M |
| R794 | 22K |
| R796 | 47K |
| C798 mmf | 50 |
| R800 | 470K |
| R802 | 180K |
| C804 mmf | 5000 |
| R806 | 47K |
| R812 | 33K |
| C822 mmf | 50 |
| C832 mmf | 50 |
| R834 | 10M |
| 840 mil. sec | 50 |
| 842 mil. sec | 1 |
| R844 | 47K |
| R1168 | .47M |
| C1170 mmf | 250 |
| C1172 mmf | 250 |
| R1174 | 1.5M |
| R1206 | 22K |
| R1208 | 47K |
| R1210 | 4.7K |
| R1212 | 1.2M |
| R1214 | 18M |
| R1216 | .5M |
| R1218 | 1.2M |
| R1220 | 1.2M |
| R1224 | .39M |
| R1228 | 1M |
| C1230 mf | .02 |
| R1244 | 150K |
| R1248 | 470K |
| R1250 | 470K |
| R1252 | .5M |
| R1254 | 3.3M |
| R1268 | 22K |
| R1270 | 180K |
| R1272 | .47M |
| R1274 | .47M |
| R1276 | 18K |
| R1280 | 27K |
| R1284 | 100K |
| R1292 | 39K |
| R1296 | 25K |

It will be appreciated that the specific mechanism above described is illustrative only and is subject to many modifications and refinements in addition to those discussed. It will also be understood that various supplementary circuits and devices can be provided to accomplish specialized data processing and control operations without departing from the scope of the invention which is more general in character. In the following section certain variations which may be incorporated in the basic system to accomplish special results are discussed. In general, these variations will add something to the cost of the equipment, but they will enable the system to perform special operations which will in most applications justify their inclusion.

ALTERNATIVES

*Converters and related circuits*

The converter circuit illustrated in Fig. 7 is satisfactory for some purposes but, inasmuch as the triode 172 plate current is turned on and off for each group of cycles, there will be a D.C. transient accompanying each group. This transient is at a lower voltage level than the 12 kc. signal and therefore, with proper adjustment of the circuit, it does not introduce any error. However, in order to make the converters more stable and less sensitive to adjustment, the circuit of Fig. 18 is to be preferred. It is of course somewhat more complex, and therefore more expensive.

Referring now to Fig. 18: It will be appreciated that much of this circuit is substantially identical to that of Fig. 7 and needs no further description, and for convenience in reference the same numerals have been used where appropriate.

The resistor R140 and gas tube 138 of Fig. 7, which maintain the reference voltage on line 134, however, have been replaced by the circuit which includes triode 1500 and pentode 1502 which exercise a more precise voltage control function.

The cathode of triode 1500 is connected to line 134 and to the screen of pentode 1502. The plate of pentode 1502 is connected to the triode grid and through a resistor R1504 to the B+ line 132. The triode plate is directly connected to line 132. The pentode 1502 suppressor and cathode are both grounded, and the control grid thereof is connected to line 134 by a capacitor C1506 and by a resistor R1508 to the central point of a voltage divider made up of resistor R1510 connected to line 134 and resistor R1512 leading to a —150 v. reference line 1514. Typical values for this circuit portion are: tubes 1500 and 1502, the elements of a 6U8; capacitor C1506, .05 mf.; resistors R1504 and R1508, 470K; R1510, 175K; and R1512, 250K.

This circuit operates substantially identically to the voltage control circuit of the monitor which is illustrated in Fig. 12. In that figure it is comprised of the triode 418 and pentode 410.

The output gate circuit for the phantastron pentode 130 of Fig. 7 between the pentode 130 screen and the transformer primary 178 is replaced in Fig. 18 by a new gate or valving circuit made up as follows: A voltage divider comprised of three resistors in series is connected between B+ line 132 and the —150 v. line 1514. These resistors beginning at line 132 are: R1520, R1522 and R1524. The screen of pentode 130 is connected between R1520 and R1522, and the junction of resistors R1522 and R1524 is connected to the cathode of a diode 1526, the plate of which is grounded. This cathode of the diode 1526 is also connected through a capacitor C1528 to the input terminal 174 which receives the 12 kc. oscillatory signal and by way of a capacitor C1530 to the grid of the valving triode 1532. This triode grid is also connected to ground through a resistor R1534. The cathode of triode 1532 is connected to ground through resistor R1536 and capacitor C1538 in parallel. The plate of triode 1532 is connected through a resistor R1540 to the lower end of transformer primary 178 and through the capcaitor C196 to the monitoring terminal 194 as in the example of Fig. 7.

The values in this gate circuit are typically as follows: Triode 1532 is one-half of a 12AT7 and diode 1526 is half of a 5726. Capacitors 1528, 1530 and 1538 are, respectively, 200 mmf., 100 mmf. and .02 mf. Resistors are as follows: R1520, 27K; R1522, 680K; R1524, 430K; R1534, 220K; R1536, 1.8K; and R1540, 22K.

This circuit operates as follows: The values are such that the triode 1532 always conducts, also the cathode of the diode 1526 is sufficiently negative so that this tube conducts. The 12 kc. oscillatory signal introduced through capacitor C1528, therefore, is grounded through the diode 1526 and does not influence the grid of the gate triode 1532. When a positive gating pulse is applied from the screen of the phantastron pentode 130 through resistor R1522 to the cathode of diode 1526, the potential of this cathode is raised sufficiently to cut off diode 1526. The 12 kc. signal under these conditions is no longer grounded and is applied through the capacitor C1530 to the grid of triode 1532 where it is amplified and appears in the plate circuit and, therefore, at the monitoring terminal 194 and in the primary 178 of transformer 179.

Since there is a continuous D.C. current through triode 1533, the segment of the 12 kc. signal, which is applied to this triode, produces an amplified counterpart in the plate circuit without any accompanying D.C. transient. There is, therefore, no necessity for precise adjustment for the purpose of keeping such transient from producing an error in the tape recording.

The two improvements just described cause the circuit of Fig. 18 to be somewhat more expensive than that of Fig. 7, but, because of its extreme stability and reliability of performance, the Fig. 18 circuit will, we believe, usually be preferred.

As previously mentioned in connection with the description of the frame control circuit of Fig. 11, the output valving portion of this circuit comprising the triodes 370 and 372 and associated connections is substantially identical to the valving portion of Fig. 7. The modification illustrated in Fig. 18 as a substitute for the valving portion of Fig. 7 is also applicable to the Fig. 11 circuit. It is of course substituted between the cathode of triode 358 and the connection to the lower end of transformer primary 382 instead of between the screen of pentode 130 and the transformer primary 178 as shown in Fig. 18. In the frame control circuit this modification will have the advantages pointed out above.

Time and related circuits

On occasion, in the recording of information from a transducer it may not be desirable to record frames at predetermined time intervals of say one per second or ten per second, for instance. Instead, it may be convenient to record a few frames at will with long or uneven intervals in between under the influence of some exterior automatic or manual control. Under these circumstances the tape transport and the timing circuit should preferably be of a type which can be triggered when recording starts. As an example of this problem, the circuit of Fig. 8 operates continuously and, if it were desired to record a single frame at a selected time, it might be necessary to wait for almost a full second before the start of a frame which depends upon getting the next pulse from the sixth dividing stage 206, since pulses occur in this line once per second.

The time circuit of Figs. 19 and 20 goes into operation instantly and fulfills these requirements, as will appear, and also has some additional advantages.

The basic device of this circuit is a multiple cathode tube of the cold cathode gas filled type. A suitable tube for the purpose is the GS10C type and the circuit described and illustrated assumes the use of this device.

Essentially, tubes of this type have a single anode and several cathodes (in the GS10C there are ten cathodes arranged in a circle). Between each set of adjacent cathodes there is a pair of members usually referred to as guides. Alternate guides are connected together and a pair of leads are brought out, one for each set. By applying pulses of the proper phase and potential to these guides the glow discharge can be shifted from one cathode to another.

Thus, incoming pulses can be used to cause the multiple cathode tube to shift its discharge from one cathode to the next for each arriving pulse. With a ten cathode tube, one complete circuit will be made for each ten input pulses. A positive output potential can be taken from any of the ten cathodes when the discharge involves that cathode, with the result that a positive pulse will appear in an output circuit connected to any one of the cathodes for each ten input pulses.

Circuits for operating such tubes in the above fashion and for resetting the tube at any point to any certain cathode are known but are limited in their use so far as we are aware, by a time lag between the application of an input pulse and the shift of the discharge to the next catnode. The circuits to be described, however, operate almost instantaneously and make such tubes useful for additional purposes.

Referring now to Fig. 20, negative pulses are shown as being supplied to the line indicated at 1550. This line is connected through a capacitor C1552 to the grid of a triode 1554. This grid is also connected to the center of a voltage divider made up of resistors R1556 and R1558 connected, respectively, to the B+ line 1560 maintained at about 300 v., and to ground.

The grid of triode 1554 is also connected through a capacitor C1562 to the plate of a second triode 1564 which is also connected to the B+ line 1560 through a resistor R1566. The plate of the first triode 1554 is connected to the B+ line through a resistor R1568 and by way of a capacitor C1570 to the grid of the second triode 1564, this grid also being connected to ground through a resistor R1572. The cathodes of both triodes 1554 and 1564 are tied together and grounded through a common resistor R1574.

The portion of the circuit described above comprises a one shot multivibrator and constitutes the driver 1575 for the multiple cathode tube indicated at 1576.

The tube 1576 has a pair of guides 1578 and 1580 which are connected, respectively, through capacitors C1582 and 1584 to the plates of the first and second triodes 1554 and 1564. Each of the guides is connected to ground through a resistor indicated, respectively, at R1586 and R1588. The anode of tube 1576 is connected to the B+ line 1560 through a resistor R1590.

Ten cathodes 1592a, b, c, d, e, f, g, h, i and j are provided in this tube and, as shown, one of these, 1592a in this instance, is connected through a resistor R1594a to the anode of a diode 1596, the cathode of which is grounded. This cathode 1592a is the one to which the glow discharge is reset when desired either manually or through the operation of a resetting circuit to be described.

Each of the other cathodes to be used is connected to ground through its resistor indicated at 1594b, c, d, e, f, g, h, i and j. As described so far, operation of the driver will cause the discharge to shift from one cathode, 1592a for instance, to b, and then to c and so on and from j back to a. The tube 1576 thus divides by ten. If it is wished to divide by a lesser number, eight for instance, any two cathodes are left unconnected or grounded. For convenience, this dividing portion of the circuit is indicated generally by the numeral 1595.

The circuit as shown ordinarily divides by ten but through operation of the resetting circuit as 1600 will divide by six.

This resetting circuit which consists of a binary flip-flop is energized by a positive pulse in a lead 1602 shown as being connected to cathode 1592f. Such positive pulse occurs whenever the discharge is between cathode 1592f and the anode. Lead 1602 is connected through a resistor R1604 to the grid of a triode 1606 which is also connected by a resistor R1608 and capacitor C1610 in parallel to the plate of a second triode 1612. This second triode plate is also connected to the B+ lead 1560 through a resistor R1614 and by way of a capacitor C1616 to a reset line 1618.

The plate of the first triode 1606 is connected to the grid of the second triode 1612 through a capacitor C1620 and by way of a resistor R1622 to the B+ line 1560. The grid of the second triode 1612 is also connected by a resistor R1624 to the plate of the first triode 1606 and to ground through a second resistor R1626. The cathodes of both triodes 1606 and 1612 are connected to ground through a common resistor R1628.

The reset line 1618 previously mentioned is connected between resistor R1594a and the anode of diode 1596.

The values used in the above circuit which may be considered typical are as follows.

Tubes:
| | |
|---|---|
| 1554 and 1564 | 12AX7 |
| 1596 | 6AL5 |
| 1576 | GS10C |
| 1606 and 1612 | 5963 |

Capacitors and resistors in the driver 1575 are:
| | | |
|---|---|---|
| C1552, C1562, C1570 | mmf | 50 |
| C1584 | mmf | 1000 |
| C1582 | mmf | 200 |
| R1556 | | 4.7M |
| R1558 and R1572 | | 470K |
| R1566 and R1568 | | 100K |
| R1574 | | 10K |

Resistors in the divider 1595 are:
| | |
|---|---|
| R1586, R1588 and R1590 | 270K |
| R1594a to j | 47K |

Capacitors and resistors in the reset 1600 are:
| | | |
|---|---|---|
| C1610 and C1620 | mmf | 50 |
| C1616 | mmf | 500 |
| R1604 | | 150K |
| R1614 and R1622 | | 47K |
| R1608 and R1624 | | 1.2M |
| R1626 | | 180K |
| R1628 | | 6.8K |

In general the above circuit operates as follows: The multivibrator in the driver is of the one shot type and is stable with tube 1554 conducting and tube 1564 turned off. When a negative pulse arrives in the line 1550, tube 1554 is turned off because of its lowered grid potential and the rise in potential in its plate circuit is applied to the grid of triode 1564 so as to cause this tube to conduct. This drops the potential in the plate circuit of tube 1564 and this change is applied to the grid of the first triode 1554 further cutting off current through this tube. The tube remains in this state until the capacitor C1570 recharges, causing tube 1564 to conduct less. Its plate potential therefore rises causing triode 1554 to conduct. The action is regenerative and continues until triode 1554 is fully conducting and tube 1564 is off, the original condition.

During this cycle of operation of the driver 1575 the polarity of the guides 1578 and 1580 will change so that, as between the two, 1578 will at the beginning be the more negative, then 1580 will become more negative, and finally both return to ground potential.

This cycle of polarity changes, shifts the discharge from one of the cathodes 1592 to the next in line, say from 1592d to 1592e, thereby counting four from the beginning at a. When the driver next cycles, the discharge will shift to cathode 1592f, thereby counting to five. At the next cycle the discharge shifts to cathode 1592g and causes a positive pulse to be produced in the lead 1602. This positive pulse applied to the grid of triode 1606 causes triode 1606 to conduct and turns off tube 1612. The flip-flop circuit thus goes through one-half cycle and applies a positive pulse from the 1612 plate to the reset line 1618 which is grounded through the diode 1596. When the next count occurs, the discharge shifts away from cathode 1592g and turns off the grid of triode 1606 and turns on tube 1612. The drop in potential at the plate of tube 1612 results in a strong negative pulse being applied to the line 1618.

The strong negative pulse in the line 1618 causes the cathode 1594a to be more strongly negative than any of the others and reestablishes the discharge at 1594a. The counter circuit is thereby reset to the beginning at the seventh count. If the flip-flop circuit at 1600 is disabled in any well known fashion, the counter circuit shown will of course count to ten before resetting.

From a consideration of the above described circuit, it will be appreciated that minor modifications will make the circuit count to ten or any less number, reset at any count (depending upon the cathode 1594 to which the line 1602 is connected), and reset to any certain cathode (depending upon the cathode circuit to which lead 1618 and diode 1596 are connected). Furthermore, simple switching arrangements can be used to connect any one of several cathodes to lead 1602 and also for connecting lead 1618 and diode 1596 to any of several cathodes, thereby enabling an operator manually to select the resetting point and the point reset to.

It will also be appreciated that several resetting circuits can be used, such that each is connected between a different set of cathodes. Then simply by disabling certain resetting circuits and enabling others, a counter system of this type can be used for performing various counting, dividing, time delay and similar functions as will appear presently.

Referring now to Fig. 19 which shows the time circuit in block form, the same numerals are used as in Fig. 8 to indicate elements which are common to the two embodiments. As in the previously described system, a master oscillator operating to provide a frequency of 12 kc. and pulses at the rate of 12,000 p.p.s. is shown at 200. The oscillator which operates continuously feeds pulses through a gate 1630 of any suitable type to a standard decimal counting unit, such as those in Fig. 10 for instance, at 1632 which divides the count by ten, thereby providing an output at the rate of 1200 p.p.s. The gate 1630 is actuated by a line 1634 and is closed when a positive potential is applied thereto. It is open whenever this positive potential is removed.

The output at 1200 p.p.s. of the decimal counter 1632 is fed to the input of a second divider stage 1636 which also divides by ten so as to provide an output at 120 p.p.s. This second stage divider 1636 is constructed according to the circuit of Fig. 20, but without the automatic resetting provision, since it simply divides by ten and then recycles.

The reason for using a standard decimal counter at 1630 is that this stage must accept pulses at a rate of 12,000 p.p.s. which is faster than the circuit of Fig. 20 will reliably operate. The novel circuit of Fig. 20 will, however, operate at an input rate well above 1200 p.p.s. and, therefore, can be used for the second and following stages.

The third stage indicated at 1638 is fed from the second stage and is identical thereto excepting that it is reset at the end of six counts. This circuit, therefore, divides by six and provides an output at 20 p.p.s.

The fourth stage at 1640 uses the circuit of Fig. 20 and is arranged to divide by 10 or by 1, depending upon the position of switch 1642. This can be accomplished by using a resetting circuit such as shown in Fig. 20 connected to the 1592a cathode, so that with each count the discharge shifts away from the a cathode and then back again. When the switch 1642 is shifted to the divide by 10 position, the resetting circuit is simply disabled as previously described.

The last stage at 1644, therefore, receives pulses at the rate of either 2 p.p.s. or 20 p.p.s. This last stage uses the circuit of Fig. 20 with two separate resetting circuit portions being located at 1646 and 1648. Each of these reset circuits is connected to the swinging member of separate four-position switches. These switches are ganged together and are indicated at 1650 and 1652, respectively.

The divider stage 1644 has two input resetting terminals such that if a resetting pulse is supplied to one terminal, 1654, the counter tube is reset to the minus one position. This, in the circuit of Fig. 20, could be the 1592a cathode, for instance. If the resetting pulse is supplied to terminal 1656, the counter is reset to 1 for instance, to cathode 1592b.

Observing switches 1650 and 1652 it will be seen that, in the first position to the left, resetting circuit 1648 will reset counter 1644 to the minus one position. In the second switch position circuit 1648 will reset counter 1644 to the one position. The third position is off, while in the fourth switch position the other resetting circuit at 1646 will reset the counter 1644 to the one position.

Leads are brought out from counter tube cathodes 1594b, c, and d and are connected in order to terminals 1658, 1660, and 1662 which, for convenience in the drawing, have been labeled 1, 2 and 3 since a positive pulse is provided by terminal 1658 at the start of a frame, as will appear presently, at 1660 one count later and at 1662 after one more count.

Terminal 1658 is connected through a suitable coupling stage 1664 to the line 160 of the converters of Fig. 7 or of course the alternative converters of Fig. 18. Terminal 1660 is connected through a coupling stage 1666 to line 262 of the frame number circuit of Fig. 10, the cathode coupling and switching portion of Fig. 10 which couple pulses to this line being omitted. It will be appreciated that the coupling stages 1664 and 1666 may be similar to those which are no longer needed in Fig. 10 when the time circuit of Fig. 19 is used. Terminal 1660 is also connected to the input of the resetting circuit at 1646.

Terminal 1662, which receives a pulse one count later than 1660, is connected to the input of the resetting circuit at 1648 and to the lead 1634 which controls the gate at 1630. This lead 1634 is also connected through a switch 1669 to control another gate circuit at 1668; this second gate has a power input at 1667 and an output lead represented at 1670 which is connected to the tape transport.

The reset circuit at 1648 also has an external command at 1672 which can be used by an operator or some automatic external control mechanism to supply a negative pulse to activate circuit 1648 in the same way that this circuit is put through its last half operation by a negative pulse from the terminal 1662 as will appear presently.

An analysis of this circuit generally will show that when switches 1652 and 1650 are in the fourth position (with the output of resetting circuit 1646 connected to terminal 1656, the "reset to one" terminal) and with switch 1642 in the divide by ten position, the circuit will function automatically to control the recorder at a frame speed of one per second. This operation is as follows: Divider stage 1640 receives pulses at a rate of twenty per second and divides this number by ten. Stage 1644, therefore, has an input rate of two p.p.s.

At the first input pulse, lead 160 receives a pulse from terminal 1658, thereby starting the converter into operation. At the second input pulse to stage 1644, lead 262 receives a pulse from terminal 1660 thereby starting the frame number circuit into operation one-half second after the start of the converters. This pulse from terminal 1660 also activates resetting circuit 1646 through one-half cycle. At the next input pulse to 1644, the positive potential is removed from terminal 1660, thereby resetting counter circuit 1644 to the one position so as again to supply a pulse to terminal 1658 and lead 160. The converter circuits and the frame number circuit are, therefore, operated at a rate of once per second with the frame number circuits going into action at the middle of each frame.

By shifting switch 1642 to the divide by one position, the operation is the same excepting that since counter 1644 receives input pulses at a rate of twenty per second, rather than two per second, frames will be recorded at a rate of ten per second rather than one per second. Since switch 209 is shifted with switch 1642, lead 212 will receive pulses at a rate of 1200 per second at a frame rate of one per second, and 12,000 per second at a rate of ten frames per second.

The system is adapted for external control under two different conditions. One of these occurs when it is desired to record frames instantaneously upon command or at a comparatively rapid rate, so that it is necessary to keep the tape transport in operation. Under the other condition, frames are taken at a slow or uneven rate with a delay between frames sufficient to make it advisable to stop the transport between frames so as to have more time available on the spool of tape. In either case it will be appreciated that using a full second to record a frame will be appropriate procedure.

To record instantaneously under external control with the tape transport in continuous operation, switch 1642 is placed in the divide by 10 position, and switches 1652 and 1650 are placed in the second position with the output of reset circuit 1648 connected to the "reset to one" position. The switch shown at 1669 between line 1634 and gate 1668 is opened so that gate 1668 remains open regardless of changes in potential in the line 1634.

As thus conditioned, the counter circuit 1644 will come to rest with the cathode discharge at the third position (terminal 1662) as will appear presently. The positive potential in line 1634 thus produced causes gate 1630 to be closed and the reset circuit at 1648 to have passed through the first half of its cycle. The transport is in operation through the open gate 1668 as in the first instance.

When it is desired to record a frame, the external command is actuated to supply a negative pulse to the reset mechanism at 1648 which causes it to pass through the second half of its cycle of operation. This supplies a negative pulse to switch 1652 and thus to the "reset to one" terminal 1656. This resets the circuit of 1644 to its starting position and supplies a pulse to terminal 1658 and lead 160 so as to start the converters. Simultaneously, the gate at 1630 is opened when the positive potential at terminal 1662 is removed by resetting counter 1644. Opening this gate permits oscillations at 12,000 p.p.s. to enter divider 1632 and thus one-half second later counter 1640 will receive a pulse from divider 1638 and will shift the cathode discharge to terminal 1660 thereby starting the frame number circuit into operation. After another half second, a second pulse is received by counter 1644 which shifts the cathode discharge to terminal 1662.

The positive pulse thus produced in line 1634 closes the gate at 1630 and operates the reset circuit at 1648 through its first half cycle of operation, thereby conditioning the system for the next external command to record a frame. From the above it will be appreciated that the frequency of the external commands can be anything desired so long as it is no more frequent than once per second. It can be as frequent as ten per second if switch 1642 is placed in the divide by 1 position. Also the circuit responds instantly to a command to record.

If it is desired to record frames at intervals with the transport out of operation between frames, the system is conditioned as above excepting that the gate at 1668 is activated as by closing switch 1669, and switches 1654 and 1656 are shifted to the first position with the output of the resetting mechanism 1648 connected to the "reset to —1" terminal 1654.

As in the previous case, the system is at rest with the cathode discharge in circuit 1644 applying a positive potential to the third terminal 1662 and line 1634. Gates 1630 and 1668 are held closed by this positive potential and reset circuit 1648 has passed through its first half cycle of operation. The tape transport is, therefore, de-energized and no pulses are being fed to divider 1632.

When it is desired to record a frame, external command 1672 supplies a negative pulse to reset circuit 1648. This resets counter 1644 to the minus one position and opens both gates.

Opening of the gate 1668 starts the tape transport into operation while opening gate 1630 supplies pulses at 12,000 p.p.s. to divider 1632. One-half second later the first input pulse appears at counter 1644. This produces a shift in the cathode discharge to the number one terminal or, in other words, the usual starting position, thereby supplying a positive pulse to terminal 1658 and lead 160 which starts the converters into operation. From this point on the operation is the same as that last described above excepting that when the discharge shifts so as to apply a positive potential to terminal 1662, both gates 1630 and 1668 are closed, thereby cutting off the flow of pulses to divider 1632 and also deenergizing the tape transport. It can also apply a brake to the transport in well known fashion if desired.

As thus conditioned, the system upon command starts the tape transport, gives it one-half second to come up to speed, records one frame, and then stops the transport and places the system in condition to receive a new external command. These commands can be at any desired regular or irregular intervals so long as they are at least one and one-half seconds apart, and so long as a one-half second delay between the command and the recording is of no consequence.

Previously it was described how the system could be preconditioned by setting the knobs 1098, 1122 and 1124 so that the read out translator would automatically start reading out information at a certain preselected frame on one of the manually selected traces. It would of course be a convenience to be able in advance to precondition to read out translator so that it would automatically select the traces from which information is to be taken as well as the starting frame on a particular trace and the last frame thereof to be translated. With such an arrangement, for instance, it would be possible to preset the translator to read out the information between say frames 147 and 236 on traces numbered 3, 5, 6, 7 and 9. The read out translator circuit previously described does not lend itself well to such control, for one reason because the reproduce heads are in two groups which are staggered with respect to each other, thus making it necessary to have two entirely separate sets of frame coding traces which are staggered longitudinally of the tape with respect to each other in the same way that the information traces are staggered.

In order to simplify the control system functioning and to gain other advantages which will appear presently, several changes are suggested. One of these involves the record number transfer system of Fig. 14 which is modified as shown in Fig. 21. In this figure the elements of Fig. 14 which are substantially unchanged are given the same numbers as in Fig. 14 and need no additional description. From an inspection of Fig. 21 it will be seen that the pentode 830 is connected substantially as shown in Fig. 14 excepting that its plate circuit has only a fast acting relay 840, the coil of relay 842 being replaced by a current limiting resistor indicated at R1700. As in the circuit of Fig. 14, current through the pentode 830 is cut off while a count is proceeding in the counter unit at 650 to 656. At the end of the count the relay 840 is energized.

Relay coil 852 is connected between the +150 volt line 846 of Fig. 14 and ground by way of two sets of normally open relay contacts in parallel. One of these sets of relay contacts is indicated at 718a of Fig. 14, a parallel connection of twelve contact sets, one of each of these sets being actuated by each of the relays 718 and 752 to 772. Thus, contacts 718a establish a circuit as soon as any one of these relays is energized. In parallel with the group of contacts 718a is a second set of normally open relay contacts 1702a which are operated by a relay coil 1702 connected between the control line 720 and ground by way of a current limiting resistor and a set of twelve normally closed contacts in series indicated at 718c. Each of these contacts is actuated by one of the relay coils 718 and 752 to 772, so that the circuit through coil 1702 can be established only when all of the relays 718 and 752 to 772 are deenergized.

The relay matrix control line 720 in Fig. 14 is connected to the 150 v. line 846 by way of several contact paths. One of these consists of normally closed contacts 852b which are opened whenever relay 852 is energized. A second set, 1704a, is normally open and is closed whenever relay coil 1704 is energized. This relay coil is connected at one end to ground through a current limiting resistor R1706, the other end being connected through a normally open contact set 840a and thence through another normally closed set of contacts 1288d in series therewith to the control line 720. Contacts 840a are made when relay coil 840 is energized (at the end of count) and contacts 1288d are separated when the "even" relay coil 1288 of Fig. 15A is energized.

When relay coil 1288 is energized so as to open contacts 1288d it also closes contacts 1288e which completes a third path from the relay line 720 to the 150 v. line 846. A fourth path between lines 846 and 720 is completed when contacts 1288d are closed (relay 1288 deenergized) and contacts 840b in series therewith are also closed. Contacts 840b are normally closed and are opened when relay coil 840 is energized.

Thus, line 720 is energized whenever coil 852 is deenergized, or coil 1704 is energized, or coil 1288 is energized or when coil 1288 is deenergized and coil 840 is deenergized. Furthermore coil 1704 is energized only when coils 1288 and 852 are all deenergized and coil 840 is energized. After energization of coil 1704, however, coil 852 may be energized and the circuit will be held through contacts 1704a in a parallel with contacts 852b.

Referring now to Fig. 22 of the drawings where a revision of the frame matrix of Fig. 15 is shown, it will be apparent that the changes are not extensive. In this figure the numbers are the same as in Fig. 15 where the circuits are substantially identical. As in Fig. 15, the matrix operating triode 1066 (and others in this group which are not shown since the circuits are identical) has its cathode connected to a common cathode line 1088. Its plate is connected through its relay coil 1090 to a common relay line 1092. Also there is the holding circuit comprising the normally open relay contacts 1090b and resistor R1094 between the lower end of coil 1090 and ground. Similarly also the diode 1096 and manually actuated switch 1098a can form a circuit between the lower end of coil 1090 and a presetting line 1100 such that by setting a desired starting frame number pattern into the contacts 1098a–b–c and so on, the desired relay coils 1090, 1102, 1104 and so on can be energized. As in Fig. 15, the line 1100 can be connected to ground by manually closing the switch 1180a.

In Fig. 22, a second normally open switch 1750 is shown in parallel with switch 1180a. This switch, 1750, may be of any suitable type and is arranged to be closed whenever the magnetic tape has been rewound to its starting point. Conveniently this can be accomplished by sticking a piece of metal foil at the beginning of the tape and so arranging a pair of contacting members that they are shorted by the foil when the tape is rewound. A similar scheme can be used as previously mentioned for operating a circuit when the tape is fully advanced.

In Fig. 15, relay line 1092 is energized from power line 902 by way of normally closed contacts 1180b and 1356d in series. In Fig. 22, an additional set of contacts 1752a is inserted into this series connection. Contacts 1752a are normally open and are closed whenever a relay coil 1752 is energized.

Relay coil 1752 is connected at one end to the power lead 902 and at its other end to a line 1754. This line is connected through eleven sets of contacts 1756 in parallel. Four of these sets are shown. Each of these sets is in turn connected through a separate set of contacts 1090z to ground. Thus, coil 1752 is energized whenever any one of the contacts 1756 is closed providing the contact 1090z to which the closed contact 1756 is connected is also closed.

Each one of the frame number matrix relay coils 1090 and 1102 to 1120 actuates one set of the contacts 1090z so as to open its set when energized. The contacts 1756 are preset in a pattern by knobs used much like those illustrated at 1124, 1122 and 1098 in Fig. 16, so as manually to set up these contacts in a pattern which corresponds to the frame number at which it is desired to stop translating information to the read out device. Thus, each time the relays in the frame number matrix are actuated, certain of the contacts 1090z will remain closed. So long as any one of the contacts 1756 which is a companion to a closed contact 1090z is also closed, relay coil 1752 will be energized and the frame will be printed and the cycle repeated. If, however, every one of the closed contacts 1090z is connected to an open contact 1756, this will be because the frame number in the relays will be the same as that preset into contacts 1756. Under these conditions relay coil 1752 will be deenergized, thus opening contacts 1752a and deenergizing all of the relays connected to line 1092.

As previously described the system is such that the decimal counting units of the record coder which appear in Fig. 14 count the number of pulsees fed thereto and hold the total momentarily before being reset to receive a new count. It is an operating advantage as will appear to have these units hold the total count until the beginning of the count for the next frame. This and other advantages are accomplished by changing the Fig. 14 circuit to incorporate the subject matter of Fig. 23.

In Fig. 23 the record input pulse amplifier, trigger and decimal counter unit are shown in block form, since no change is involved. The output lead of the trigger is indicated at 646 and the counter unit reset line at 670 as in Fig. 14. The counters are connected to reset when a negative pulse is applied to line 670. As in Fig. 14, lead 646 has a branch 820 conveying the train of pulses at 12,000 p.p.s. through a capacitor C822 to a peak to peak rectifier comprised of diodes 824 and 826 and capacitor C832, all similar to Fig. 14. The output lead 828 from the rectifier provides a straight front negative pulse coincident with the first pulse of the group introduced into the line 646. This negative polarity in the lead 828 is maintained during the count and decays shortly after the last counting pulse is received by line 820.

A group of three resistors in series is connected between the lead 828 and the +300 volt lead 846. These resistors are, beginning at lead 828, R1800, R1802 and R1804. Resistor R1800 is bridged by a capacitor C1806, and capacitor C1808 is similarly connected across resistor R1802.

A pair of triodes 1810 and 1812 have their cathodes connected together and to ground through a common resistor R1814. The grid of triode 1810 is connected to the junction between resistors R1800 and R1802 while the plate of triode 1812 is connected to the junction between resistors R1802 and R1804 and to the reset line 846 through capacitor C1816. The reset line is also connected to the anode of a diode 1818, the cathode of which is grounded.

A second voltage divider made up of three resistors is connected between ground and the B+ line 846. These resistors beginning at ground are R1820, R1822 and R1824. The junction between resistors R1820 and R1822 is connected to the grid of triode 1812 while the plate of triode 1810 is connected to the junction between resistors R1822 and R1824. A capacitor C1826 is connected between the plate 1810 and the grid of 1812.

In this circuit the diodes may be type 6AL5 and the triodes type 5963. Typical values for the resistors and capacitors are:

| | |
|---|---:|
| R1800 | 470K |
| R1802 and R1822 | 1.2M |
| R1804 and R1824 | 47K |
| R1814 | 6.8K |
| R1820 | 180K |
| C1806 | mmf__ 100 |
| C1808 and C1826 | mmf__ 50 |
| C1816 | mmf__ 100,000 |

In this circuit, the 12,000 p.p.s. signal in line 820 is rectified by the diodes 824—826 and the negative component is applied to the flip flop circuit comprised of triodes 1810 and 1812. Lowering the potential of the 1810 grid cuts off this tube and causes 1812 to conduct, thus applying a negative pulse to the reset line 670 which resets the counters. At the end of the count, conduction through tube 1810 is restored and 1812 is cut off, thus conditioning the resetting circuit for the next cycle. The counter units are therefore reset at the instant of the first counting pulse in a record group, rather than at a predetermined time interval after the last pulse in the former frame number group is received.

Note that because resetting of the record counters is brought about by the train of pulses in the record group, this function is accomplished without reliance upon the frame coder pulses. Because of this it is unnecessary to have two staggered sets of recording and pickup heads for the frame number information even though half of the record traces are staggered slightly on the tape with respect to the other record traces. Two of the four positions on the tape previously used for frame number information can therefore be used for additional record information. Furthermore, the record input of the read out translator can be switched from one trace to another and the same frame number trace can be used throughout, without regard to whether the record trace being translated has an odd or even number. This will appear more fully presently.

The circuits with the variations of Figs. 21 and 22 operate generally as follows:

As a starting point, assume that there is a number stored in the record matrix represented in Fig. 21 by relay coil 718 and that the next count is proceeding. Under these conditions coil 852 will be energized by way of contacts 718a inasmuch as one of the matrix coils, such as 718, will be energized. Since the count is proceeding, tube 830 is cut off and coil 840 deenergized.

As soon as the record number is read out of the matrix and the end of print signal is received from the read out device, coil 1288 is deenergized, thereby opening contacts 1288e and deenergizing the relay line 720 and closing contacts 1288d. This removes the number from the relay matrix. As soon as all of these relays have been actuated, contacts 718a open and deenergize coil 852. Contacts 852b therefore close and reenergize the common relay line 720 and relay coil 1704. Also contacts 852a in the common cathode line of the energizing tubes 718 for the relay matrix are closed so that these tubes can again function to insert the new number in the relay matrix. Energization of coil 1704 closes contacts 1704a and forms a holding circuit around contacts 852b.

With the storing of the new number in the relay matrix, contacts 718a are closed. This energizes coil 852 and opens contacts 852a in the cathode circuit of the matrix operating tubes so as to cut off the current through these tubes. Also opened are contacts 852b.

Now that the new number is stored in the matrix, the beginning of the count for the next frame cuts off tube 830 and deenergizes coil 840. This closes contacts 840b and opens contacts 840a. Coil 1704 is therefore deenergized and opens contacts 1704a, but the relays in the matrix are still held by contacts 840b which close before 1704a opens.

The number is therefore held in the matrix during the progress of the next count. While this count is proceeding, the frame number system will determine whether the frame being processed is in proper order, in the manner previously described, and if so will energize the "even" relay 1288 so as to open contacts 1288d and close contacts 1288e, thus forming an additional relay matrix energizing path. The circuit is thus conditioned as at the beginning. If the even relay is not actuated, contacts 1288e are not closed and the system functions as previously described without printing so as to correct the mistake.

In the circuit of Fig. 22, assume that a pattern has been set up by closing certain of the contacts 1093a so as to establish the number of the first frame to be translated and that a pattern has also been set for the last frame to be translated by closing appropriate switches at 1756. Manual erase switch 1180b is then momentarily opened so as to deenergize all the matrix relays at 1090 as an example. Next, the beginning frame number is entered into the frame number matrix by closing switch 1180a in the manner previously described.

The system then operates as previously described, beginning to translate at the first frame selected, until the frame number in the relay matrix is the same as the ending frame selected by setting the switches 1756. During the counting of previous frame numbers certain of the contacts 1090z will be opened in an appropriate pattern at the end of each frame count, but only when the right frame is reached will all of the closed contacts at 1756 be connected to open contacts at 1090z. Relay 1752 then becomes deenergized and opens contacts 1752a thereby erasing the number from the relay matrix. This relay also reverses the transport and rewinds the tape as described and as will be seen presently, automatically shifts the input of the translator to the next trace to be translated.

When the tape is all rewound and starts forward again, contact 1750 is closed, as mentioned earlier, thereby resetting the relays in the frame number matrix to the pattern of the starting number preset into the contacts 1098a.

*Program selector*

Fig. 24 illustrates a program selecting arrangement adapted for use as a portion of the previously described translator. It has already been described how the system is preset so as to automatically begin reading out information at a certain frame and to stop when a certain later frame is reached. The system of Fig. 24 enables an operator to preset into the mechanism the traces to be translated. Thus, if this programmer is preset to numbers 5, 7, 8, 9 and 12 it will automatically first translate the information from trace number five. As soon as this operation is finished it will automatically shift to trace number seven and then in order to traces number eight, nine, and twelve.

As will appear presently this programming is accomplished simply by positioning a single pole, double throw switch (one for each trace available for transcription) in one position if the trace is to be translated or in the other position if the trace is to be skipped. Thus, in the above example, if it is assumed that all of these switches originally are in the "skip" position, it is necessary merely to flick switches 5, 7, 8, 9 and 12 to the "translate" positions in order to set up the program.

In addition to the above, the program selector also is well adapted to give a remote indication of the trace being translated, at the translator proper for instance, even though the selection is made by an operator at a control panel remote therefrom.

As illustrated, the program selector of Fig. 24 is adapted for use with a read out translator capable of processing two traces simultaneously. If the translator can handle more traces simultaneously more units are simply added in parallel to the two shown. If the traces are to be processed one at a time, only one of the two parallel units is required.

Referring now to Fig. 24, a relay coil is indicated at 1900. One end of this coil is connected to a power lead 1902, the other end being connected to ground through a normally open set of contacts 1752b. These contacts are closed when relay coil 1752 of Fig. 22 is energized. As previously mentioned, this occurs when the information has been read out from the last frame which has been preselected by the frame programming selector. Coil 1752 when energized also operates a set of contacts which energize the reverse coil 1306 of Fig. 17 so as to rewind the tape to the beginning.

The bank of manually actuated switches for selecting a program of traces to be transcribed is indicated at 1904, 1906, 1908, 1910 and 1912. Although in the interest of avoiding confusion only five of these switches are shown, it will be appreciated that one is provided for each record trace on the magnetic tape. The movable contact of each of these switches is connected to one of the stationary contacts of a rotary stepping switch indicated generally at 1914. These stepping switch contacts are 1916, 1918, 1920, 1922 and 1924 in order for manual switches 1904, 1906, 1908, 1910 and 1912.

Connections to switch 1904 are such that when this switch is in the "skip" position, stepping switch contact 1916 is grounded, and when switch 1904 is in the "transcribe" position, contact 1916 is connected to line 1926. Similarly, the "transcribe" positions of switches 1906, 1908, 1910 and 1912 connect their stepping switch contacts to leads 1918, 1920, 1930, 1932 and 1934, whereas shifting switches 1906, 1908, 1910 and 1912 to the "skip" positions grounds contacts 1918, 1920, 1922 and 1924 in that order.

The stepping member of switch 1914 is indicated at 1936a and this member successively makes a connection to contacts 1916, 1918, 1920, 1922 and 1924 and then repeats, the shift from one contact to the next being accomplished each time a coil 1936 is energized and deenergized. This stepping switch can also be shifted manually.

Contact 1936a is connected to a lead 1938 which is connected through a relay coil 1940 to the power lead 1902. Lead 1938 is also connected through a relay coil 1942 and a normally open set of contacts 1942a to the power lead 1902. Contacts 1942a are closed when coil 1942 is energized.

The junction between contacts 1942a and coil 1942 is connected through normally closed contacts 1900a to the power lead and through normally open contacts 1900b to one end of relay coil 1936, the other end of which is connected through normally closed contacts 1936b to the lead 1938. When coil 1900 is energized (when the last frame is translated) contacts 1900a are opened and contacts 1900b closed. When coil 1936 is energized, it steps switch member 1936a from one of its contacts to the next (make before break) and then opens contacts 1936b so as to deenergize coil 1936. Immediately thereafter contacts 1936b reclose.

Each of the leads from 1926 to 1934 extends to a slave unit indicated generally at 1950. At the slave unit each of these leads is connected to one of the contacts of a stepping switch 1952 which may be identical to switch 1914. Thus, leads 1926, 1928, 1930, 1932 and 1934 are connected in order to contacts 1956, 1958, 1960, 1962 and 1964. The stepping contact at 1966a of switch 1952 is connected to ground and is shifted from one contact to the next by a coil 1966. One end of this coil is connected to ground through normally closed contacts 1966b while the other end is connected through normally closed contacts 1940a to the power lead 1902. Contacts 1940a are opened when coil 1940 is energized while energization of stepping coil 1966 opens contacts 1966b after the stepping contact 1966a has made one step.

A second programming circuit at 1968 is shown as being identical to the one just described. It has its bank of trace selecting switch contacts at 1970 connected in parallel as shown with those numbered from 1904 to 1912. More of these selecting circuits 1968 can be added as previously mentioned for selecting more traces to be translated simultaneously. How many are used depends upon the capacity of the translator proper. The coil 1900 and contacts 1752b need not be duplicated, however, since the contacts at 1900c and 1900d can simply be another set actuated by coil 1900 at the same time that contacts 1900a and 1900b are operated.

The rotary multiple contact switch shown at 610 in Fig. 14 for selecting the pickup heads to be connected to the translator input is mechanically connected so as to have its movable contact rotated by the shaft of either the stepping switch 914 or the switch shaft of the slave unit at 1952. Thus, each time these stepping switches move to a new position, the switch 610 is also moved to connect the pickup head for the proper trace to the amplifier input.

The programming system of Fig. 24 operates as follows:

At rest (while the translator is taking information from a trace) coil 1900 will be deenergized with switch 1900a closed and 1900b open. Coil 1940 will be energized by way of contacts 1936a, 1908 (as shown), lead 1930, contact 1960 (as shown) and contact 1966a. Thus, contacts 1940a will be open, thereby deenergizing coil 1966. Also coil 1942 will be energized in parallel with coil 1940 by way of contacts 1900a. Energization of coil 1942 also closes contacts 1942a. The circuit is therefore at rest with both stepping coils 1936 and 1966 deenergized and with stepping switches 1914 and 1952 in the same position.

When the last frame to be translated is reached, coil 1752 is energized, thereby rewinding the tape closing switch 1752b and energizing coil 1900. This closes contacts 1900b and energizes stepping coil 1936 and shifts contact 1936a to 1922. The circuit through the stepping coil is then broken by contacts 1936b thereby resetting the stepping mechanism. As soon as contacts 1936b reclose, coil 1936 is again energized, since contact 1922 is connected to ground through programming switch 1910. Contact 1936a therefore steps again to contact 1924 thereby opening the circuit through coil 1936 and preventing further stepping, since contact 1924 is connected to lead 1934 which is open at contact 1964. During the above cycling of the stepping coil 1936 it is energized by way of contacts 1942a and 1900b.

After coil 1936 is deenergized by contact 1936a reaching open contact 1924, coils 1940 and 1942 are also deenergized. Contacts 1942a are therefore opened and contacts 1940a closed, thereby energizing stepping coil 1966. Contact 1966a is therefore stepped to contact 1962, whereupon switch 1966b opens and then recloses so as to deenergizes coil 1966 and then reenergize it again. This causes contact 1966a to make a second step to contact 1964.

As soon as contacts 1966a and 1964 are together, lead 1934 is grounded, thereby reenergizing coil 1940 which opens contacts 1940a. This opens the circuit through coil 1966 and no more stepping of contact 1966a takes place.

The circuit therefore comes to rest with both stepping switches in the same position and with coil 1936 deenergized because of open contacts 1942a. As soon as switch 1952b reopens, the circuit is conditioned for a new cycle of operation.

If more than one programming circuit is used, such as the additional circuit at 1968, it will be understood that each of these circuits will have its own multiple contact switch at the input to the translator amplifier with each of these switches being operated by one of the master stepping switches as at 1914 or the slave stepping switches, such as 1952.

If for instance a double translator is translating from trace 10 under control of the first programmer, and trace 11 from the second at 1968, and assuming that the next switch in the "translate" position in the first unit is at number 12 while the next switch at "translate" in unit 1968 is at number 15, then at the next cycle of operation, switch 1936a will be stepped to position 12 while the similar switch in unit 1968 will be stepped to position 15.

Preferably, as mentioned, stepping switch contact 1936a can also be manually positioned so that the trace to be transcribed can be manually selected directly without the intervention of the entire programming system. The switch 1904 to 1912 for the trace selected should be in the open or ungrounded position. Those passed over in manually advancing contact 1936a can be in either position, however.

From the above description of this invention, including several modifications thereof, it will be apparent that this system is effective for the purposes set forth for it and that it is extremely flexible in its control and operation. It will be apparent also that many modifications and variations can be made in this system without departing from the scope of the invention and that the scope of this invention is to be measured by the scope of the following claims. It will be appreciated also that the specific nature of the foregoing description of a working embodiment of the invention and several variations thereof is for the purpose of illustration of the inventive features and should not be considered as limitative of the invention.

Having described our invention, what we claim as new and useful and desire to secure by Letters Patent of the United States is:

1. In an apparatus for operating a digital read out device from an analogue voltage: means for generating oscillations in a succession of groups in which the number of oscillations in successive groups is a threshold constant number of oscillations plus a number of oscillations which bears a direct numerical relationship to the analogue voltage at successive periods, temporary storage means for recording said groups of oscillations, means for recovering said groups of oscillations from said temporary record, means for subtracting a number of oscillations equal to said threshold constant number of oscillations from each of said recovered groups, a number storage device, means sensitive to every tenth oscillation in the remainder of each of said recovered groups for adding one into said number storage device, and means operating after all of the oscillations have been recovered from a single group for signaling to a read out device the total number recorded in said number storage device.

2. In a data processing mechanism, means for recording information in a succession of frames of equal time span, and means for coding said frames in sequence, the last said means comprising a counter mechanism adapted to advance one count each time a pulse is supplied thereto and to reset when its capacity is exceeded, means for supplying said counter mechanism with a group of pulses for each frame, said group being at least one more than the capacity of said counter mechanism, an oscillator having a frequency which is a multiple of the frequency of said pulses, a recorder, a gate circuit connected to supply said oscillations to said recorder when open and to cut off said oscillations when closed, means for opening said gate when said counter resets, and means to close said gate at the conclusion of each group of pulses.

3. In an apparatus for operating a digital read out device from an analogue variable: means for sampling said analogue at selected intervals, means for converting the values of the successive samples to successive frames of digital information, temporary storage means, means for recording said frames of digital information in said temporary storage means over an appreciable time interval for each frame, means for recovering said digital information from said temporary storage means over an appreciable time interval for each frame, means forming a second temporary storage means, means responsive to said recovering means to store one complete frame of recovered information in said second storage means over an appreciable time interval, said second storage means being adapted to release information stored therein substantially instantaneously to a read out device, means to prevent information from one frame being stored in said second storage means until the information stored therein from the last previous frame has been released therefrom, and means to prevent information from being released to a read out device from said second storage means unless the information in said second storage means is from a frame which logically follows the frame of information last stored in said second storage means.

4. In an apparatus for operating a digital read out device from an analogue variable: means for sampling said analogue at selected intervals, means for converting the value of the successive samples to successive frames of digital information, temporary storage means, means for recording said frames of information in said temporary storage means over an appreciable time interval for each frame, means for recovering said digital information from said temporary storage means over an appreciable time interval for each frame, means forming a second temporary storage means, means responsive to said recovering means to store one complete frame of recovered information in said second storage means over an appreciable time interval, said second storage means being adapted to release information stored therein substantially instantaneously to a read out device, and means to prevent information from being released to a read out device from said second storage means unless the information in said second storage means is from a frame which logically follows the frame of information last stored in said second storage means.

5. In an apparatus for operating a digital read out device from an analogue variable: means for sampling said analogue at selected intervals, means for converting the value of the samples to successive frames of digital information, temporary storage means, means for recording said frames of digital information in said temporary storage means over an appreciable time interval for each frame, means for recovering said digital information from said temporary storage means over an appreciable time interval for each frame, means forming a second temporary storage means, means responsive to said recovering means to store one complete frame of recovered information in said second storage means over an appreciable time interval, said second storage means being adapted to release information stored therein substantially instantaneously to a read out device, and means to prevent information from one frame being stored in said second storage means until the information stored therein from the last previous frame has been released therefrom.

6. In an apparatus for operating a digital read out device from a plurality of electrical analogues: means for sampling all of said analogues simultaneously at selected intervals, means for converting the values of the simultaneous samples to simultaneous frames of digital information, temporary storage means, means for recording said digital information from all samples taken simultaneously as simultaneous frames of multiple traces in said temporary storage means over an appreciable time interval for each frame, means for recovering the digital information from one of said frames at a time from said temporary storage means over an appreciable time interval for each frame, means forming a second temporary storage means, means responsive to said recovering means to store one complete frame of recovered information in said second storage means over an appreciable time interval, said second storage means being adapted to release information stored therein substantially instantaneously to a read out device, means to prevent information from any frame being stored in said second storage means until the information stored therein from the last previous frame has been released therefrom, said recovering means being adapted to recover information automatically from selected frames of one of said traces and then to shift automatically to recover information from selected frames of another of said traces, and presetting means to determine the traces and the frames to be automatically selected.

7. In an apparatus for operating a digital read out device from a plurality of electrical analogues: means for sampling all of said analogues simultaneously at selected intervals, means for converting the values of the simultaneous samples to simultaneous frames of digital information, temporary storage means, means for recording said digital information from all samples taken simultaneously in simultaneous relation in said temporary storage means over an appreciable time interval for each frame, means for recovering the digital information from one of said frames at a time from said temporary storage means over an appreciable time interval for each frame, means forming a second temporary storage means, means responsive to said recovering means to store one complete frame of recovered information in said second storage means over an appreciable time interval, said second storage means being adapted to release information stored therein substantially instantaneously to a read out device, and means to prevent information from any frame being stored in said second storage means until the information stored therein from the last previous frame has been released therefrom.

8. In an apparatus for translating information from a succession of serially numbered frames of information in which the successive frame serial numbers differ by a constant, first means for storing a frame serial number, means for inserting a frame serial number into said first storage means, second means for storing a frame serial number, means for inserting the serial number of the frame following the frame having the number stored in the first said storage means into said second storage means, means for adding said constant to the number stored in said first storage means, means active after said addition for comparing the number stored in said first storage means with the number stored in said second storage means; and means for signaling whether the number in said second storage means is smaller, larger or the same as the number in said first storage means.

9. In an apparatus for accepting and reading out information from a tape record having a succession of serially numbered frames of information in which the successive frame serial numbers differ by a constant, first means for storing a frame serial number, manually actuated means for inserting a selected serial number into said first storage means, second means for storing a frame serial number, means for automatically inserting the serial number of a frame from which information is being accepted into said second storage means, means for comparing the number stored in said first storage means with the number stored in said second storage means; means for signaling whether the number in said second storage means is smaller, larger or the same as the number in said first storage means; a tape transport for said record, means for operating said transport in the advance direction or the reverse direction, means for reading out information accepted from said tape to a read out device, means for operating said transport in the reverse direction if said second storage means number is signaled as larger and for operating said transport in the advance direction if said second storage means number is signaled as the same or smaller, and means for disabling said reading out means if said second storage means number is signaled as larger or smaller.

References Cited in the file of this patent
UNITED STATES PATENTS

| | | |
|---|---|---|
| 2,444,202 | McAlpine et al. | June 19, 1945 |
| 2,568,724 | Earp | Sept. 25, 1951 |
| 2,656,524 | Gridley | Oct. 20, 1953 |
| 2,674,727 | Spielberg | Apr. 6, 1954 |
| 2,679,636 | Hillyer | May 25, 1954 |
| 2,679,638 | Bensky | May 25, 1954 |
| 2,700,755 | Burkhart | Jan. 25, 1955 |
| 2,710,397 | Foster | June 7, 1955 |
| 2,719,285 | Greenfield | Sept. 27, 1955 |
| 2,759,784 | Burke | Aug. 21, 1956 |
| 2,771,596 | Bellamy | Nov. 20, 1956 |
| 2,796,596 | Kenosian | June 18, 1957 |

OTHER REFERENCES

"Publication," "High-Density Digital Data Recording," "Tele-Tech and Electronic Industries," July 1954 pp. 68, 69, 110, 111.

UNITED STATES PATENT OFFICE
CERTIFICATE OF CORRECTION

Patent No. 2,918,657

December 22, 1959

Gale W. Crampton et al.

It is hereby certified that error appears in the printed specification of the above numbered patent requiring correction and that the said Letters Patent should read as corrected below.

Column 12, line 25, strike out "a signal from a comparator circuit to be described"; column 20, line 2, for the numeral "648" read -- 686 --; column 21, line 74, for "counter" read -- counters --; column 23, line 40, after the words "closed by" and before "presently" in line 41, insert -- a signal from a comparator circuit to be described --; column 29, lines 46, 48, and 51, for "1140c", each occurrence, read -- 1104c --; column 31, line 73, for "thus" read -- this --; column 38, line 40, for "woudl" read -- would --.

Signed and sealed this 7th day of June 1960.

(SEAL)
Attest:

KARL H. AXLINE
Attesting Officer

ROBERT C. WATSON
Commissioner of Patents